(12) United States Patent  
Yasui et al.

(10) Patent No.: US 6,320,580 B1
(45) Date of Patent: Nov. 20, 2001

(54) IMAGE PROCESSING APPARATUS

(75) Inventors: Keisuke Yasui; Jun Okubo; Seisuke Morioka; Junichi Naoi, all of Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/184,240

(22) Filed: Nov. 2, 1998

(30) Foreign Application Priority Data

Mar. 24, 1998 (JP) .................................................. 10-076312
Nov. 7, 1998 (JP) .................................................. 9-305142

(51) Int. Cl.$^7$ .................................................. G06F 15/00
(52) U.S. Cl. .................................................. 345/421
(58) Field of Search .................................. 345/419, 420, 345/421, 422, 433, 435

(56) References Cited

U.S. PATENT DOCUMENTS 5,729,671 * 3/1998 Peterson et al. ..................... 395/123

FOREIGN PATENT DOCUMENTS

| 2259432 | 3/1993 | (GB) . |
| 2270243 | 3/1994 | (GB) . |
| 2275159 | 8/1994 | (GB) . |
| 2288523 | 10/1995 | (GB) . |

* cited by examiner

*Primary Examiner*—Phu K. Nguyen
(74) *Attorney, Agent, or Firm*—Dickstein Shapiro Morin & Oshinsky LLP

(57) ABSTRACT

Disclosed are an image processing apparatus and an image processing method, which can efficiently execute a hidden-surface process, a blending process on translucent polygons and a shading process by a light source all in a rendering process. An image processing method for generating image data for displaying a plurality of polygons comprises: a mask generation step of receiving polygon data including position data of the polygons in the display screen, generating first mask data indicating effective pixel areas of the polygons in a display screen and Z values indicating depths in the display screen for respective effective pixels from the polygon data, generating second mask data having, as an effective pixel area, a pixel area having a Z value in the foreground of a Z value of another processed polygon among the effective pixel areas of the first mask data, executing an exclusion operation to delete the effective pixel area of the generated second mask data from the effective pixel area of generated second mask data of another polygon to thereby generate trans mask data, and performing generation of the trans mask data polygon by polygon; and a rendering step of implementing a rendering process on each of the polygons with respect to the effective pixel area, indicated by trans mask data generated in the mask generation step.

45 Claims, 53 Drawing Sheets

MASK GENERATOR 50

POLYGON DATA

MASK RESISTER 60

RELATIONSHIP OF POLYGONS

DISPLAY SCREEN

OPAQUE POLYGON

POLYGON A

POLYGON B

POLYGON C

RELATIONSHIP OF POLYGONS

DISPLAY SCREEN (POLYGON D IS OPAQUE)

TRANSLUCENT POLYGON

FIG. 22
POLYGON G (First)
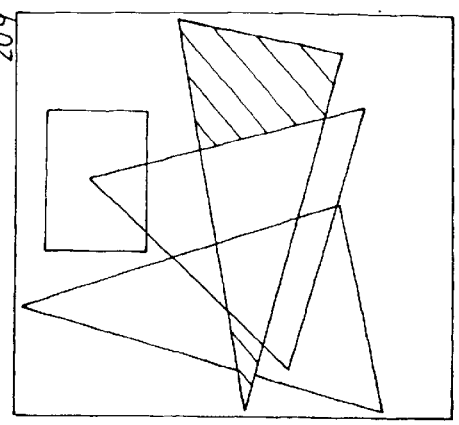
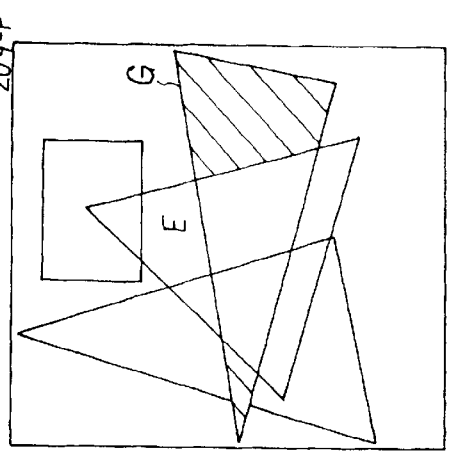
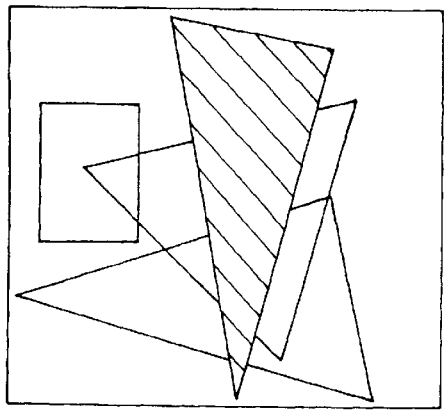
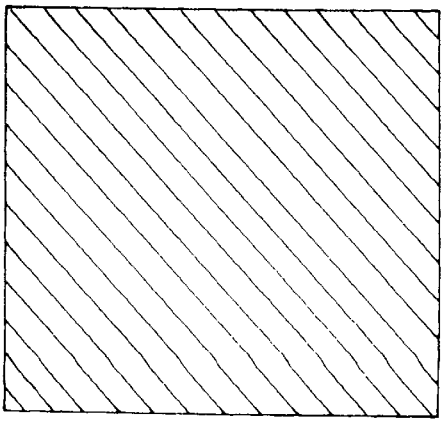

FIG. 23 POLYGON F (Second)

FIG. 25
POLYGON F (Third)
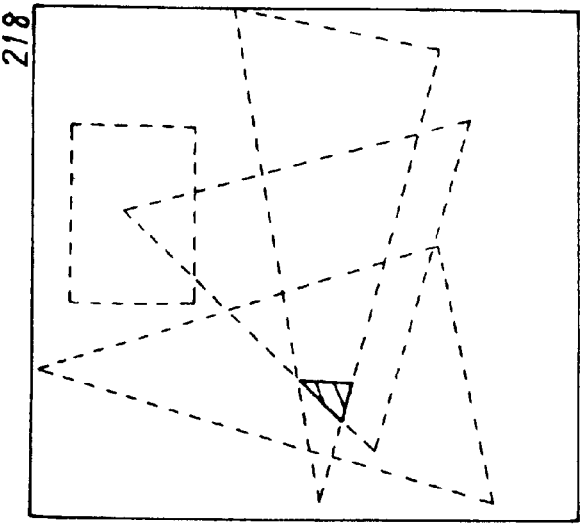
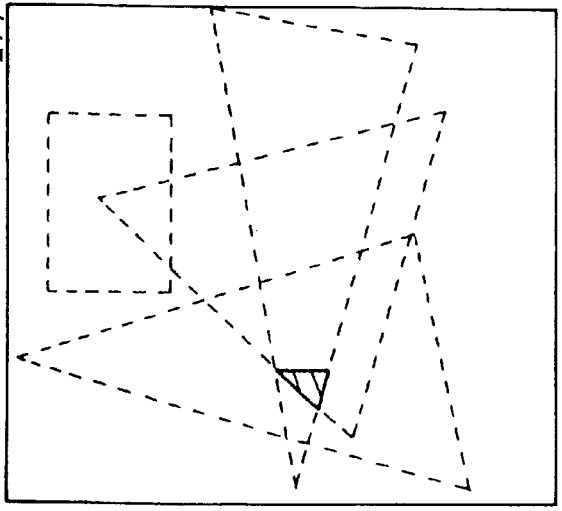
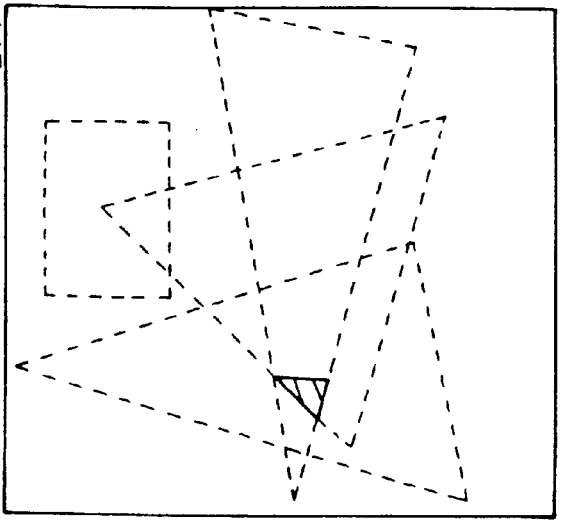

FIG. 26 POLYGON G (Third)
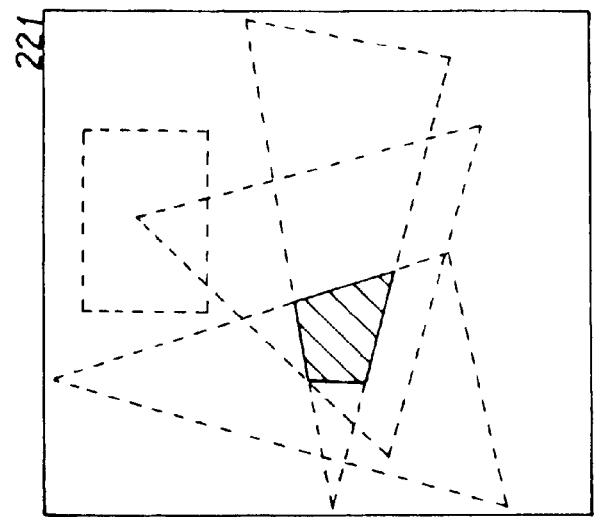
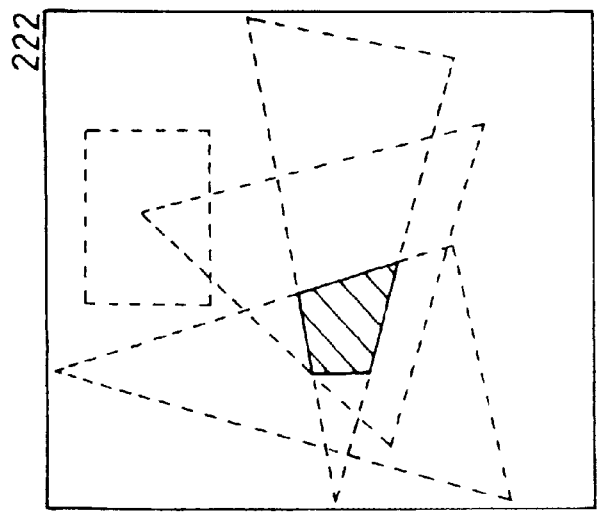
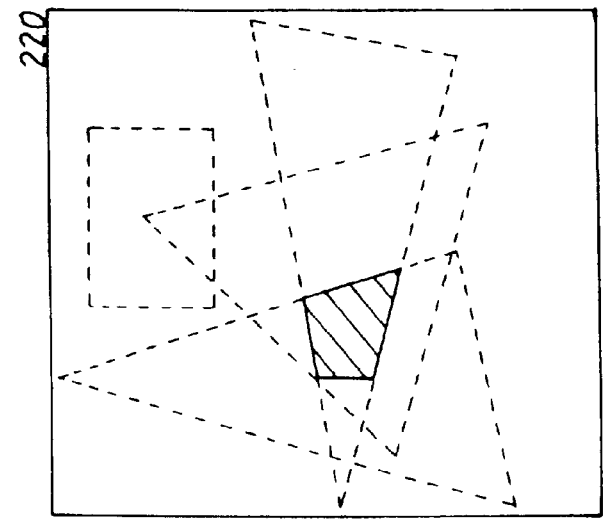

FIG. 27
|  | INPUT MASK | TRANS MASK (Second mask) | AREA MASK (First mask) |
|---|---|---|---|
| Most deepest E (FIG. 20) | 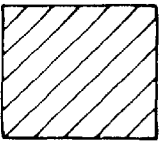 202 | 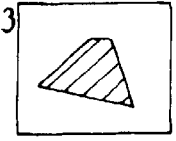 203 | 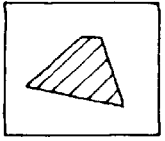 204 |
| F (FIG. 21) | 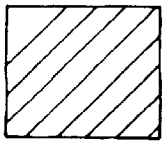 205 | 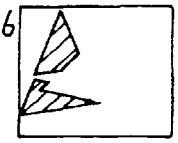 206 | 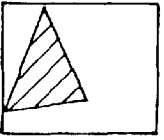 207 |
| G (FIG. 22) | 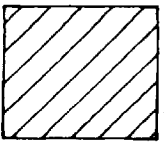 208 | 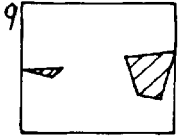 209 | 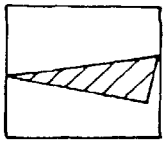 210 |
| Second deepest F (FIG. 23) | 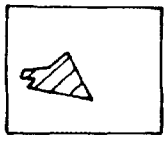 211 | 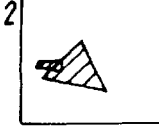 212 | 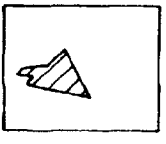 213 |
| G (FIG. 24) | 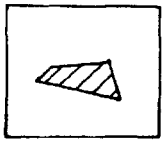 214 | 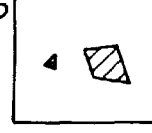 215 | 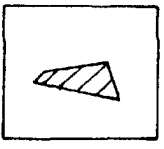 216 |
| Third deepest F (FIG. 25) |  217 | 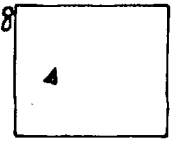 218 |  219 |
| G (FIG. 26) |  220 |  221 |  222 |

SHADING PROCESS

RELATIONSHIP OF SHADOW VOLUME POLYGON

DISPLAY SCREEN

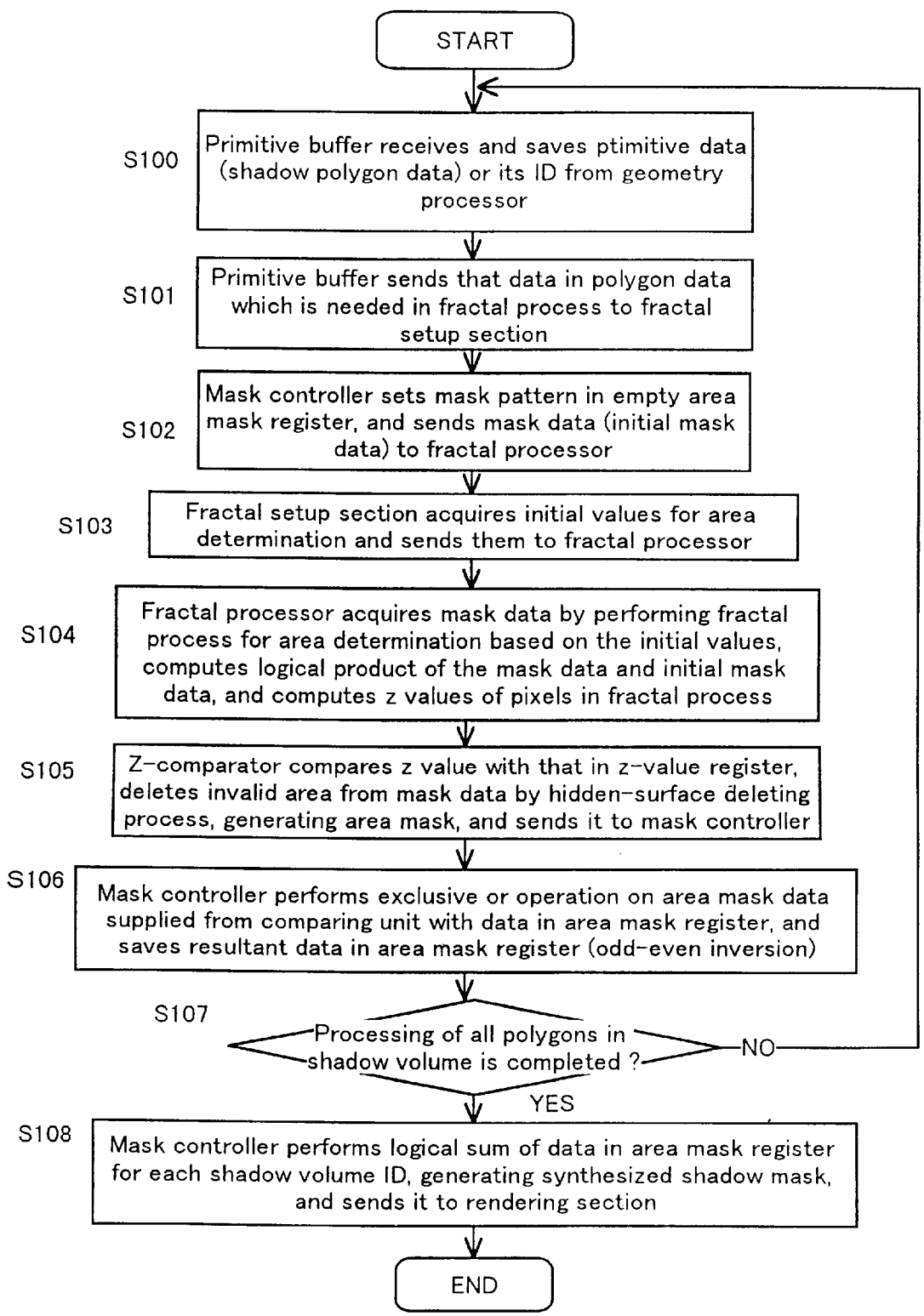

Synthesized shadow mask

OPAQUE POLYGON S50–S55

OPAQUE POLYGON S56

OPAQUE POLYGON S56 FOR OTHER TRANS MASK REGISTER

OPAQUE POLYGON S57

TRANSLUCENT POLYGON S50-S61

TRANSLUCENT POLYGON S62 (S72)

TRANSLUCENT POLYGON S62 (S72)
FOR OTHER TRANS MASK REGISTER

TRANSLUCENT POLYGON S63–S65 (S73–S75)

TRANSLUCENT POLYGON S66–S71

FIG. 43 SHADOWING PROCESS S100–105

SHADOWING PROCESS S106

SHADOWING PROCESS S108

GENERAL-PURPOSE COMPUTER

IMAGE PROCESSOR

IMAGE PROCESSOR USING GENERAL PURPOSE COMPUTER

IMAGE PROCESSING APPARATUS

BACKGROUND OF THE INVENTION

1. Field of the Invention

The present invention relates to a computer-aided image processing apparatus, and, more particularly, an image processing apparatus capable of efficiently performing a computation for processing of a plurality of polygons and a computation for a hidden-surface process in a rendering process with fewer hardware, an image processing method for the image processing apparatus, and a recording medium on which an image processing program for accomplishing the method is recorded.

2. Description of the Related Art

Computer-aided image processing apparatuses are widely used in game machines and simulation apparatuses. In such an image processing apparatus, a game program or a simulation program generates polygons which form an object to be displayed. This polygon data normally includes parameters for each vertex. The vertex parameters include, for example, the coordinates of each vertex in three-dimensional (3D) space, the texture coordinates of the vertex, a normal vector, an alpha value representing transparency and color related data.

First, polygons in the display screen are clipped based on the polygon data, and for the clipped polygons, the 3D coordinates of the vertexes are scan-converted to two-dimensional (2D) coordinates on the display screen and Z values indicating the depths in accordance with the view point. Then, image data of the pixels of polygons to be displayed in the display screen are acquired by a rendering process. This image data has color data of RGB, for example.

In the rendering process, computation of the parameters of the pixels in a polygon is normally carried out by specifying the pixel coordinates in the polygon by raster scanning and performing interpolation of the vertex parameters according to the pixel coordinates. That is, the internal ratio is acquired from the vertex coordinates and the pixel coordinates and interpolation of the vertex parameters is executed according to the internal ratio.

Further, the rendering process is implemented frame by frame. In the rendering process, a Z value indicating the depth of a pixel of a polygon is used in a hidden-surface process which determines a polygon to be displayed pixel by pixel. In a case of the minimum Z value (that of the foremost pixel in the display screen), found through comparison, the color data is stored in a frame buffer memory. Therefore, a Z-value buffer memory is used to store the pixel's Z value stored in the frame buffer memory.

The interpolation in the raster scanning scheme computes the coordinates and parameters of edge points on a line which connects vertexes and computes the coordinates and parameters of pixels lying between the edge points on both sides. This interpolation generally includes an division operation which places the greatest load on the computation circuitry of a computer. As interpolation involved in raster scanning is carried out frequently, the high-load operation should be avoided as much as possible.

In the rendering process on opaque polygons, comparison of Z values is executed to set valid the pixels of a foreground polygon in the display screen. In this computation, for example, the Z value of the foremost pixel is stored in the Z-value buffer memory and image data is stored in the frame buffer memory one after another. According to this scheme, generation of image data of a polygon positioned at a deeper location and a process of writing image data in the frame buffer memory become wasteful due to the existence of a polygon on a more foreground side which is executed later. This results in a lower processing efficiency.

As a scheme of avoiding the efficiency reduction, the ID of a polygon may be stored in the Z-value buffer memory pixel by pixel until all the pixels to be displayed are eventually determined. This scheme may likewise make writing of the polygon ID in the Z-value buffer memory wasted, resulting in a lower processing efficiency.

The rendering process for translucent polygons, which are neither opaque nor transparent, should blend the color of a polygon located deep on the display screen with the color of a polygon located in the foreground. In this case, after temporary sorting of translucent polygons according to their Z values, the blending process is carried in order from the deepest polygon. This sorting process however involves, for example, comparison of Z values, which reduces the processing efficiency.

In the image processing, a shadow portion which is formed by the light source should undergo a shadowing process (which casts a shadow) that does not involve such a process as to increase the luminance in accordance with the light from the light source. Various complex algorithms for such shadowing process have been proposed, but they all require complicated computation, thus resulting in a lower processing efficiency.

FIG. 53 is a diagram for explaining raster scanning of a polygon. In the example of FIG. 53, pixels inside a polygon 10 that is specified by vertexes L, M and N are raster-scanned. For instance, scanning is carried out in the lateral direction, starting with the vertex L, and the scan line is shifted along the Y axis. Assume that a given pixel P is positioned on the scan line that connects a point O of a side LM and a point Q of a side LN. To acquire the edge coordinates $(x_o, y_o)$ and $(x_q, y_q)$ of a scan line OQ from the coordinates of a scan line RS before the scan line OQ, therefore, the following computation should be performed.

$$dx_{LM}/dy_{LM}=(x_o-x_r)/(y_o-y_r)$$

$$dx_{LN}/dy_{LN}=(x_q-x_s)/(y_q-y_s).$$

Given that $y_o-y_r=1$ and $y_q-y_s=1$, then $$x_o=x_r+dx_{LM}/dy_{LM}$$

$$x_q=x_s+dx_{LN}/dy_{LN}.$$

As the above computation includes division operations including the inclinations of the lines LM and LN, the computation load on the computer become large. In a case of division, processing of a value below a decimal point takes time too. Those calculations are frequently required in raster-scanning of a polygon, and should be carried out for all the polygons.

Further, the aforementioned Z-value buffer memory with a capacity of one frame means that the image processing apparatus requires excessive hardware.

SUMMARY OF THE INVENTION

Accordingly, it is an object of the present invention to provide an image processing apparatus and an image processing method capable of implementing a highly efficient rendering process, and a recording medium on which an image processing program for accomplishing the method is recorded.

It is another object of this invention to provide an image processing apparatus and an image processing method capable of efficiently executing a rendering process on opaque polygons, and a recording medium on which an image processing program for accomplishing the method is recorded.

It is a different object of this invention to provide an image processing apparatus and an image processing method capable of efficiently executing a rendering process on translucent polygons, and a recording medium on which an image processing program for accomplishing the method is recorded.

It is a further object of this invention to provide an image processing apparatus and an image processing method capable of efficiently performing a shadowing process in a rendering process, and a recording medium on which an image processing program for accomplishing the method is recorded.

It is a still further object of this invention to provide an image processing apparatus and an image processing method, which employs a new computation scheme that involves simpler computation, instead of the pixel raster scanning scheme, and a recording medium on which an image processing program for accomplishing the method is recorded.

It is a yet further object of this invention to provide an image processing apparatus and an image processing method, which simplifies hardware by reducing the capacity of a Z-value buffer memory, thereby ensuring efficient image processing, and a recording medium on which an image processing program for accomplishing the method is recorded.

To achieve the objects, by effectively using a mask register for retaining binary mask data representing if a pixel is valid or invalid, or it is an odd number or an even number, this invention executes processes, such as an exclusion operation, an exclusive OR operation and an OR operation, on such mask data, thereby efficiently implementing a hidden-surface process on opaque polygons, a blending process on translucent polygons and a shadowing process to acquire a shadow area.

According to the first invention, an image processing method of generating image data for displaying a plurality of polygons, comprises:

a mask generation step of generating first mask data indicating effective pixel areas of the polygons in a display screen and Z values indicating depths in the display screen for the respective effective pixels from polygon data including position data of the polygons in the display screen, generating second mask data having, as an effective pixel area, a pixel area having a Z value in the foreground of a Z value of another processed polygon among the effective pixel areas of the first mask data, executing an exclusion operation to delete the effective pixel area of the generated second mask data from the effective pixel area of generated second mask data of another polygon to thereby generate new second mask data, and performing generation of the new second mask data polygon by polygon; and a rendering step of implementing a rendering process on each of the polygons, with respect to the effective pixel area indicated by said new second mask data generated in the mask generation step.

In implementing a hidden-surface process between opaque polygons, the first invention can efficiently acquire the effective area of each polygon as new second mask data by using an exclusion operation involving second mask data. This new second mask data is eventually used in the rendering process and is stored in a trans mask register in preferred embodiments which will be described shortly.

According to the second invention, an image processing method of generating image data for displaying a plurality of translucent polygons, comprises:

a mask generation step of generating first mask data indicating effective pixel areas of the translucent polygons in a display screen and translucent Z values indicating depths in the display screen for the respective effective pixels from polygon data including position data of the translucent polygons in the display screen, generating second mask data having, as an effective pixel area, a pixel area having a translucent Z value in the background of a translucent Z value of another processed translucent polygon among the effective pixel areas of the first mask data, executing an exclusion operation to delete the effective pixel area of the generated second mask data from the effective pixel area of generated second mask data of another translucent polygon to thereby generate new second mask data, and performing generation of the new second mask data, translucent polygon by translucent polygon; and a rendering step of implementing a rendering process on each of the polygons for generation of image data, with respect to the effective pixel area indicated by said new second mask data generated in the mask generation step, whereby the mask generation step further executes an exclusion operation to delete the effective pixel area of the new second mask data from the effective pixel area of the first mask data to thereby generate new first mask data, and generates next new second mask data based on the new first mask data, and the rendering step carries out the rendering process in accordance with the next new second mask data.

In the second invention, an area of a translucent polygon positioned deepest in the display screen can be acquired efficiently as new second mask data through an inverted hidden-surface process and an exclusion operation. This first mask data indicates an area to be processed, and is stored in an area mask register in the preferred embodiments which will be described shortly. The second mask data, which is eventually used in the rendering process, is stored in a trans mask register in the preferred embodiments that will be described shortly.

In the second invention, the generation of the next new second mask data is repeated until no further effective pixel area is found in the new first mask data. By simply repeating this step, blending of overlapping translucent polygons can be carried out efficiently.

According to the third invention, an image processing method of generating image data for displaying a shadow area on a target polygon to be drawn, comprises:

a mask generation step for generating first mask data indicating effective pixel areas of shadow polygons defining a shadow volume in a display screen and Z values indicating depths in the display screen for respective effective pixels, from shadow polygon data including position data of the shadow polygons in the display screen, generating second mask data having, as an effective pixel area, a pixel area having a Z value in the foreground of (or in the background of) a Z value of the target polygon among the effective pixel areas of the first mask data, performing odd-even inversion on odd-even data of shadow mask data, which represents the number of shadow polygons positioned in a direction of a line of sight and between the target polygon and a view point (or an infinite point), with respect to the effective pixel area of the second mask data, thereby generating new shadow mask data, and executing generation of the new shadow mask data for all shadow polygons that define the shadow volume; and a rendering step of implementing a rendering process in accordance with the new shadow mask data generated in the mask generation step.

The third invention can efficiently acquire a shadow area formed by a light source as shadow mask data. This shadow mask data indicates a shadow area on a target polygon to be drawn, and is stored in an area mask register in the preferred embodiments that will be described shortly.

According to the third invention, the generation of the shadow mask data is repeated by the number of shadow volumes, individual pieces of shadow mask data generated are eventually subjected to an OR operation, thereby generating synthesized shadow mask data, and a shadowing process is carried out in the rendering process in accordance with the synthesized shadow mask data.

To achieve the last two objects, while segmenting a predetermined display screen area into smaller similar areas in a self-similar (fractal) order, the fourth invention repeats computation of the coordinates and Z values of the segmented areas. And the coordinates and Z values of pixels or tiny areas segmented finally are computed and the parameters of color related data of the pixels are computed, so that the load of the computation on the computer becomes lighter. Further, the fourth invention does not implement a rendering process for the entire one frame at a time, but performs the computation on fragment areas, obtained by segmenting one frame, in the aforementioned fractal order. The rendering process for each fragment area is executed efficiently by determining whether or not the pixels in the fragment area lie inside the target polygon.

According to a modification of the fourth invention, the coordinate systems in the horizontal and vertical direction with respect to the conventional raster direction are converted to coordinate systems along the dividing direction of fractals, so that computation which is performed in the fractal order is made simpler.

According to the fourth invention, an image processing apparatus for generating image data by performing a rendering process on polygons, comprises:

a fractal processor for receiving polygon data including position data of the polygons in a display screen, and, while segmenting a predetermined display screen area into smaller similar tiny areas in a fractal sense, sequentially detecting if the segmented tiny areas are positioned inside the polygons in accordance with the position data, and generating identification (ID) data of the detected displayed polygon for each of the segmented tiny areas; and a rendering section for generating image data of the segmented tiny areas in accordance with the ID data of the segmented tiny areas generated by the fractal processor.

According to the fourth invention, an image processing method of generating image data by performing a rendering process on polygons, comprises:

a step of generating polygon data including position data of the polygons in a display screen;

a fractal step of, while segmenting a predetermined display screen area into smaller similar tiny areas in a fractal sense, sequentially detecting if the segmented tiny areas are positioned inside the polygons in accordance with the position data, and generating identification (ID) data of the detected displayed polygon for each of the segmented tiny areas; and a rendering step of generating image data of the segmented tiny areas in accordance with the ID data of the segmented tiny areas generated by the fractal step.

Further, an image processing program which is stored on a recording medium embodying this invention causes a computer to implement any of the above-described image processing methods.

BRIEF DESCRIPTION OF THE DRAWINGS

FIG. 22 is a diagram showing how the area mask and the trans mask change when the example in FIG. 17 is processed;

FIG. 25 is a diagram showing how the area mask and the trans mask change when the example in FIG. 17 is processed;

FIG. 26 is a diagram showing how the area mask and the trans mask change when the example in FIG. 17 is processed;

FIG. 27 is a diagram illustrating general changes in the area mask and the trans mask when the example in FIG. 17 is processed;

FIG. 30 is a flowchart of a second shading process;

DETAILED DESCRIPTION OF THE PREFERRED EMBODIMENTS

Preferred embodiments of the present invention will now be described referring to the accompanying drawings. It should be understood the scope of the invention is not to be limited to the details of the embodiments.

Figure 1:
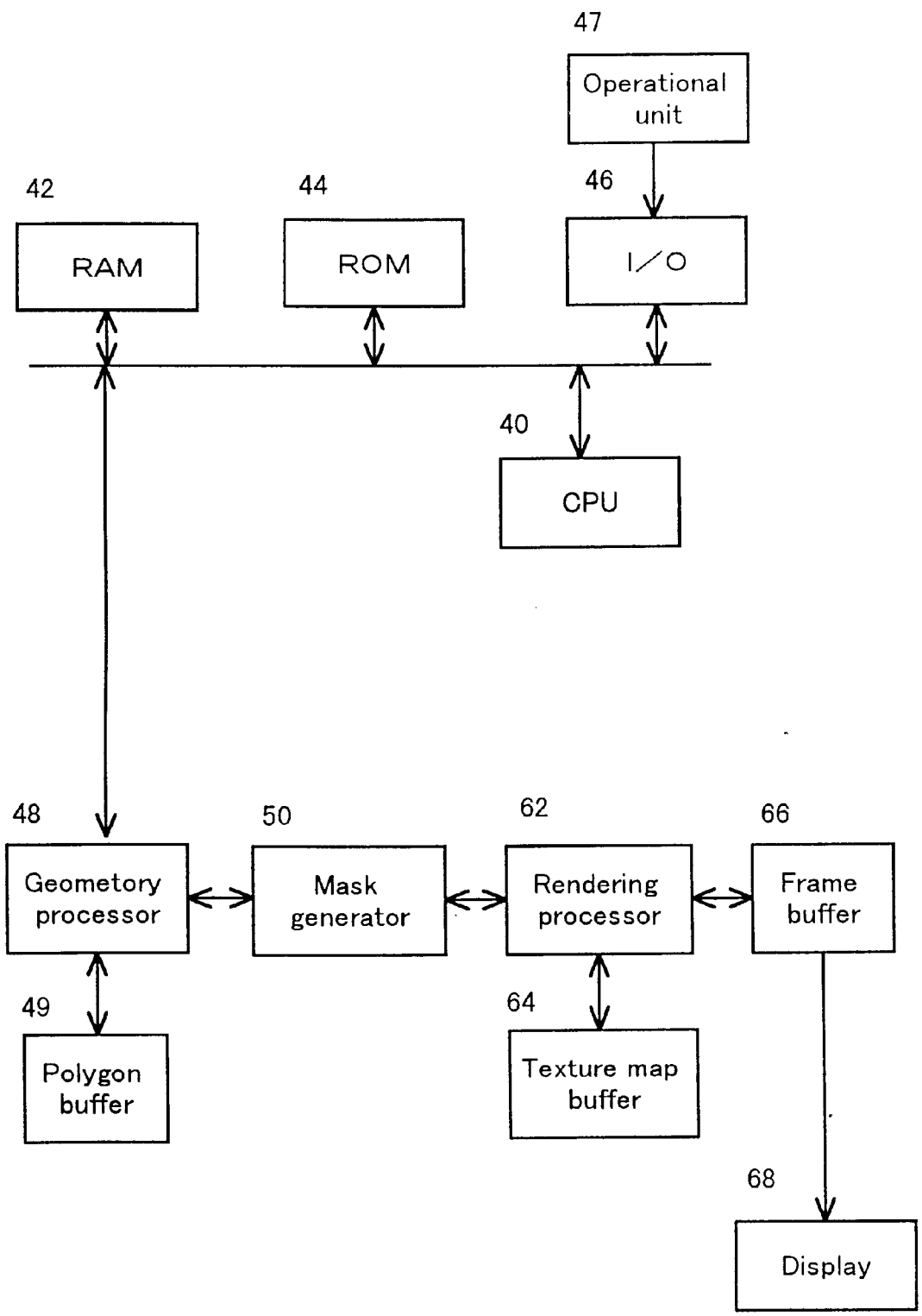
FIG. 1 is a diagram illustrating the general structure of an image processing apparatus according to one embodiment of this invention.

FIG. 1 is a diagram illustrating the general structure of an image processing apparatus according to one embodiment of this invention. The apparatus in FIG. 1 comprises a CPU 40, which generates polygon data and view point data according to a game program or simulation program, a geometry processor 48, which performs scan conversion to convert the three-dimensional (3D) coordinates of each vertex included in the polygon data to two-dimensional (2D) coordinates in a display screen of the associated polygon positioned inside the display screen, a mask generator 50, which generates various masks like a trans mask indicating a pixel of a polygon to be rendered in accordance with the polygon data that is generated by the geometry processor 48, a rendering section 62, which receives a trans mask or write mask generated by the mask generator 50 and generates image data of pixels, and a frame buffer memory 66 where the image data generated by the rendering section 62 is saved.

The trans mask will be understood more clearly by the following explanation of the embodiment. The trans mask includes plural bits data corresponding to pixels each of which indicates valid or invalid with respect to a certain purpose.

A RAM 42, a ROM 44 where a game program is stored, and an input buffer 46 which holds an operation signal from an operation section 47 manipulated by an operator are connected to the CPU 40 by, for example, a common bus, so that the CPU 40 can run the program. Connected to the geometry processor 48 is a polygon buffer 49 which stores polygon data. Connected to the rendering section 62 is a texture buffer memory 64 which stores texture data. Image data in the frame buffer memory 66 is supplied to a display unit 68 like a CRT.

Figure 2:
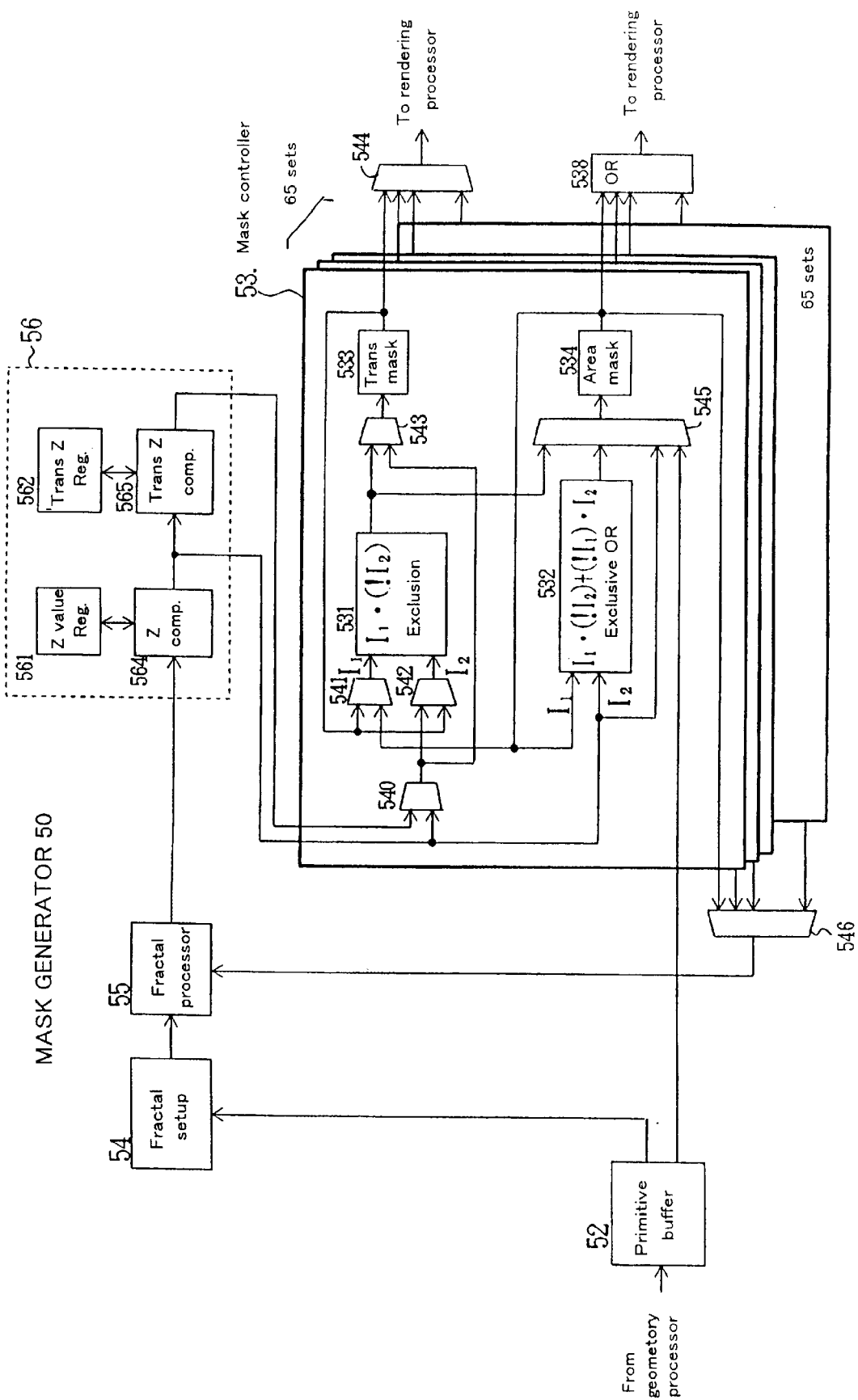
FIG. 2 is a diagram exemplifying the structure of a mask generator.

FIG. 2 is a diagram exemplifying the structure of the mask generator 50. The mask generator 50 in FIG. 2 has a primitive buffer 52 which receives and stores polygon data generated by the geometry processor 48. Besides polygon data, data of elements to be displayed, such as a line and a point, is also supplied to, and stored in, this primitive buffer 52. In a case of a line or a point too, the geometry processor 48 scan-converts the 3D data to 2D coordinates in the display screen.

A mask controller 53 has two kinds of mask registers, a trans mask register 533 and an area mask register 534, and further comprises at least an exclusion section 531 which performs an exclusion operation on bit data in the mask registers and an exclusive OR section 532 which carries out an exclusive OR operation on the bit data in the mask registers. Multiplexers 540 to 545 are provided on the input sides and output sides of those sections 531 and 532, so that input or output mask data to be processed can be selected by properly changing the connection of those multiplexers.

Those mask registers have bit data for all the pixels in a fragment area which is a segment of, for example, a frame. In a case where the fragment area has 8×8=64 pixels as will be discussed later, each mask register is a collection of 64-bit registers. That is, each mask register has 64 pieces of binary data, more specifically, 64 pieces of binary data of "1" and "0."

The trans mask register 533 stores, for example, finally generated mask data, which is in turn transferred to the rendering section 62. Alternatively, the trans mask register 533 stores data of the drawing position of a translucent polygon in the process of generating the final mask data. Therefore, the mask register 533 is named "trans mask register" in the present specification. The area mask register 534 stores data of, for example, a target area of a polygon to be drawn. Alternatively, the area mask register 534 temporarily stores data of an area of a shadow polygon in a shadowing process (shadow mask data).

The mask controller 53 has a total of 65 sets of trans mask registers and area mask registers in association with the aforementioned 64 pixels of a fragment area. In other words, the mask controller 53 is designed in such a manner that even if 64 pixels are all different polygons, the trans mask registers 533 and the area mask registers 534 can properly cope with the case.

In a case of storing shadow mask data, however, the number of the area mask registers 534 to be used equals the number of the shadow volumes. Those area mask registers 534 are subjected to an OR operation by an OR operation section 538, yielding synthesized shadow mask data which is in turn supplied to the rendering section 62.

Mask data stored in those mask registers are subjected to an exclusion operation, an exclusive OR operation or an OR operation with other mask data supplied or with one another. The processed mask data are saved again in predetermined mask registers, or supplied to the rendering section 62. The above operations are carried out in the exclusion section 531, the exclusive OR section 532 and the OR operation section 538, respectively.

The exclusion section 531 outputs $I_1 \cdot (!I_2)$ with respect to an input $I_1$, $I_2$ where $!I_2$ means the negative logic operation of $I_2$. The exclusive OR section 532 outputs $\{I_1 \cdot (!I_2)\} + \{!I_1 \cdot (I_2)\}$ with respect to the input $I_1$, $I_2$. The OR operation section 538 outputs $I_1 + I_2 + \ldots + I_{65}$ with an input $I_1, I_2 \ldots I_{65}$. The aforementioned logic operations on mask data which is binary data can be implemented by simple logic circuits.

The process in the mask generator 50 will now be described briefly. Polygon data generated in the geometry processor 48 is supplied to, and saved in, the primitive buffer 52. Polygon data which is needed in a fractal process is given to a fractal setup section 54. Area mask data in the area mask registers are supplied to a fractal processor 55 via a multiplexer 546.

By using the fractal processor 55 whose fractal process will be discussed in detail later, an operation of determining, from polygon data, in which polygon a pixel in a fragment area is positioned and an interpolation operation on polygon data, such as the Z value of each pixel, can be executed relatively easily and in a short period of time.

The mask data that is generated by the fractal processor 55 is subjected to a predetermined process in a comparison section 56 in accordance with a Z-value comparison process, and the resultant mask data is supplied again to the mask controller 53. For that task, the comparison section 56 is provided with a Z-comparator 564 and a trans Z-comparator 565. Those comparators 564 and 565 refer to a Z-value register 561, which stores the Z value of an opaque polygon, and a trans Z-value register 562, which stores the Z value or the like of a translucent polygon respectively.

The operation of the mask generator 50 shown in FIG. 2 will be readily appreciated by reference to the detailed description of mask generation that will be discussed later.

Figure 3:
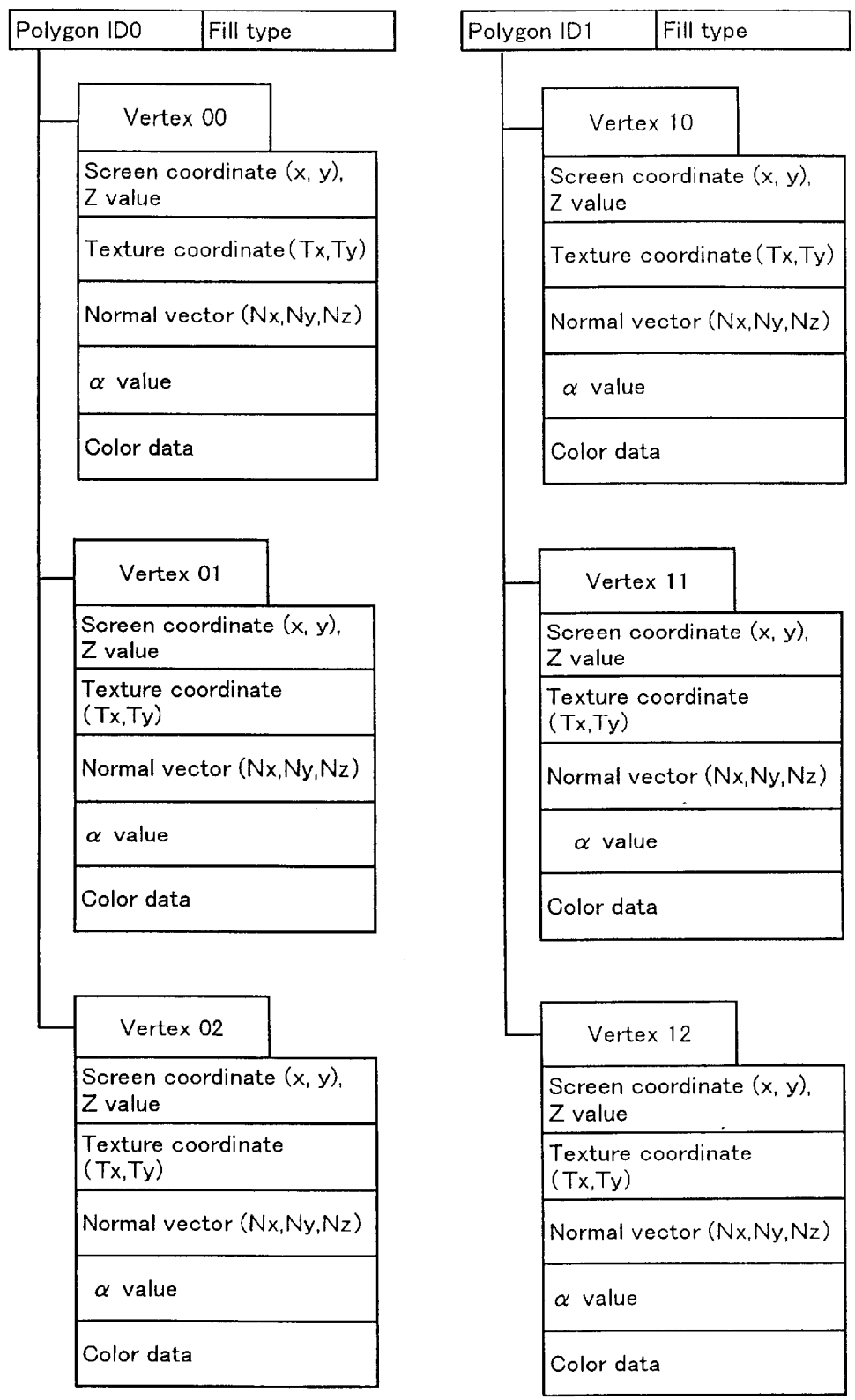
FIG. 3 is a diagram exemplifying polygon data which is generated by a geometry processor.

FIG. 3 is a diagram showing an example of polygon data which is generated by the geometry processor. FIG. 3 exemplifies data of two polygons ID0 and ID1. To simplify computation in the raster scanning scheme and interpolating scheme, a polygon is normally formed by triangles. Therefore, those polygons have vertexes 00, 01 and 02, and vertexes 10, 11 and 12, respectively. The parameters of each vertex includes the 2D coordinates (x, y) on the display screen, a Z value indicating the depth in the display screen, texture coordinates (Tx, Ty) indicative of the texture that is given to the associated polygon, normal vectors (Nx, Ny, Nz) in the 3D space, an a value indicating the degree of transparency, and color data. A process associated with the light source is carried out based on the normal vectors, and a blending process for a translucent polygon is carried out based on the transparency-degree indicating a value.

The polygon data further indicates fill type data which indicates the attribute of each polygon. The fill type data indicates, for example, an opaque polygon, a translucent polygon or a shadow polygon which constitutes a shadow volume. In this embodiment, different processes are executed in accordance with the attributes of those polygons.

For one to understand a drawing process for opaque polygons, a drawing process for translucent polygons and a drawing process for shadow polygons, mask data to be stored in the mask registers and a fractal process for effectively generating the mask data should be explained. Literally speaking, a fractal process means the execution of a process in a self-similar manner. This process is employed in place of the raster scanning scheme that is used to compute data of the individual pixels in a polygon.

Figure 4A:
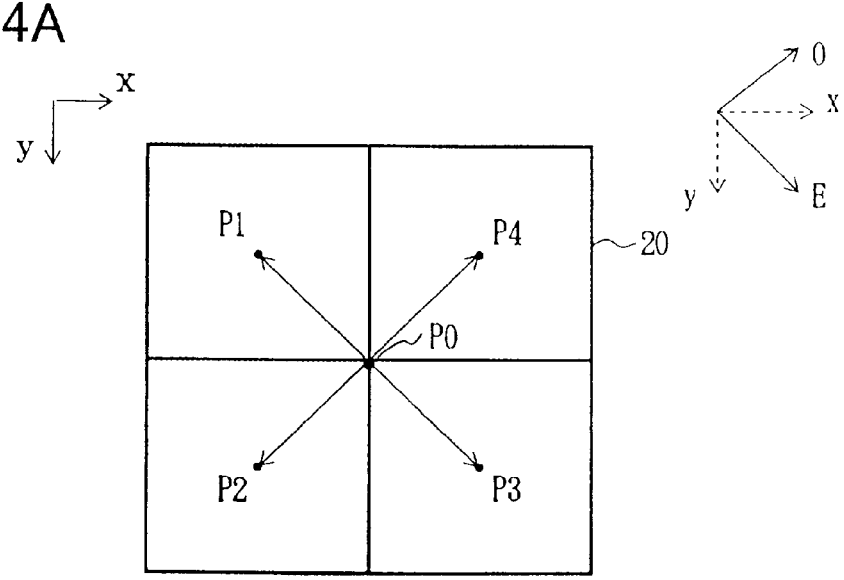
FIG. 4 is a diagram for explaining a fractal scheme.

FIG. 4 is a diagram for explaining a scheme of acquiring coordinate data of pixels obtained by segmenting an area into smaller similar figures in a fractal order (hereinafter simply called "fractal scheme"). This diagram shows how to acquire the coordinates of 8×8 pixels in a fragment area 20, a part of the display screen. FIG. 4A shows the fragment area 20 divided into four areas with centers $P_1$, $P_2$, $P_3$ and $P_4$ with respect to the center $P_0$, of the fragment area 20. Given that the length of one side of the fragment area 20 is simply set to "8", the coordinates of the centers $P_1$, $P_2$, $P_3$ and $P_4$ after division with respect to the coordinate $(x_0, y_0)$ of the center $P_0$ are acquired from the following equations.

$$P_1 = (x_0-2, y_0-2) = (x_1, y_1)$$

$$P_2 = (x_0-2, y_0+2) = (x_2, y_2)$$

$$P_3 = (x_0+2, y_0+2) = (x_3, y_3)$$

$$P_4 = (x_0+2, y_0-2) = (x_4, y_4)$$

This computation does not involve division, and consists only of addition and subtraction.

Figure 4B:
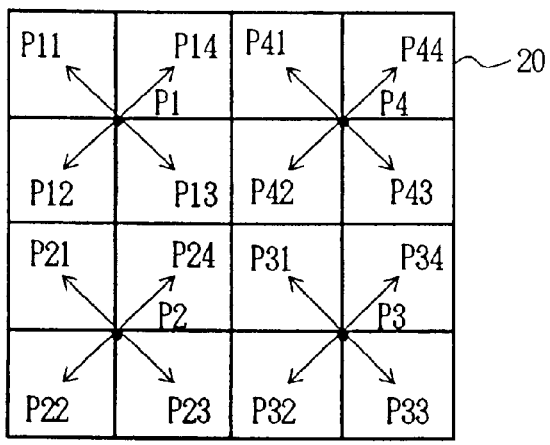

FIG. 4B shows the four areas with the centers $P_1$, $P_2$, $P_3$ and $P_4$, each divided into four smaller areas, so that the fragment area 20 is divided into 16 areas with centers $P_{11}$, $P_{12}$, $P_{13}$, $P_{14}$, $P_{21}$, $P_{22}$, ..., $P_{43}$ and $P_{44}$. The coordinates of the centers $P_{11}$ to $P_{44}$ after division are given by the following equations.

$$P_{11} = (x_1-1, y_1-1) = (x_{11}, y_{11})$$

$$P_{12} = (x_1-1, y_1+1) = (x_{12}, y_{12})$$

$$P_{43} = (x_4+1, y_4+1) = (x_{43}, y_{43})$$

$$P_{44} = (x_4+1, y_4-1) = (x_{44}, y_{44})$$

Figure 4C:
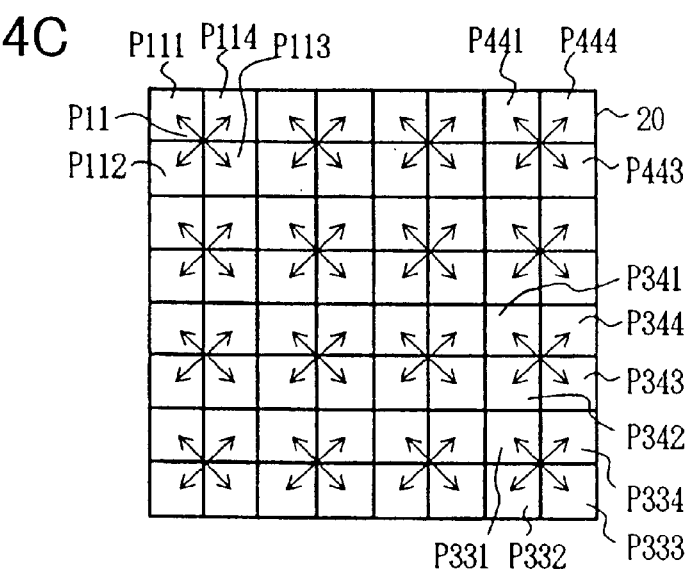

FIG. 4C shows the areas with the centers $P_{11}$, $P_{12}$, P13, ..., $P_{42}$, $P_{43}$ and $P_{44}$, each divided into four smaller areas, so that the fragment area 20 is divided into 64 areas with centers P111, $P_{112}, \ldots, P_{443}$ and $P_{444}$. The coordinates of the centers $P_{111}, P_{112}, P_{443}$ and $P_{444}$ after division are given by the following equations.

$$P_{111}=(x_{11}-0.5, y_{11}-0.5)=(x_{111}, y_{111})$$

$$P_{112}=(x_{11}-0.5, y_{11}+0.5)=(x_{112}, y_{112})$$

$$P_{443}=(x_{44}+0.5, y_{44}+0.5)=(x_{443}, y_{443})$$

$$P_{444}=(x_{44}+0.5, y_{44}-0.5)=(x_{444}, y_{444})$$

As shown in FIGS. 4A to 4C, according to the fractal scheme, the fragment area 20 is divided into 4 areas, then to 16 areas, and then to 64 areas, all of similar figures. This fractal scheme can permit the coordinates of the individual areas in the display screen to be obtained one after another by addition and subtraction alone, as mentioned above. What is more, according to this fractal process, as shown in FIG. 4C, the coordinates and attribute data, such as color related data, of 64 tiny areas which can correspond to the pixels in the fragment area 20 can be acquired simultaneously. As apparent from the above, the entire computations can be accomplished in three stages, and the individual computations in each stage can be carried out in parallel. This means that in designing this arithmetic circuit, parallel computing elements should be arranged in three stages. The structure of this arithmetic circuit will be discussed later.

The aforementioned fractal scheme can allow the coordinates of 64 pixels in the display screen to be easily acquired by addition and subtraction, starting with the center $P_0$ in the fragment area. For the rendering process, it is necessary to generate mask data that indicates which pixel should be colored with which polygon's color. In other words, the pixels that are positioned in polygon should be detected.

Figure 5:
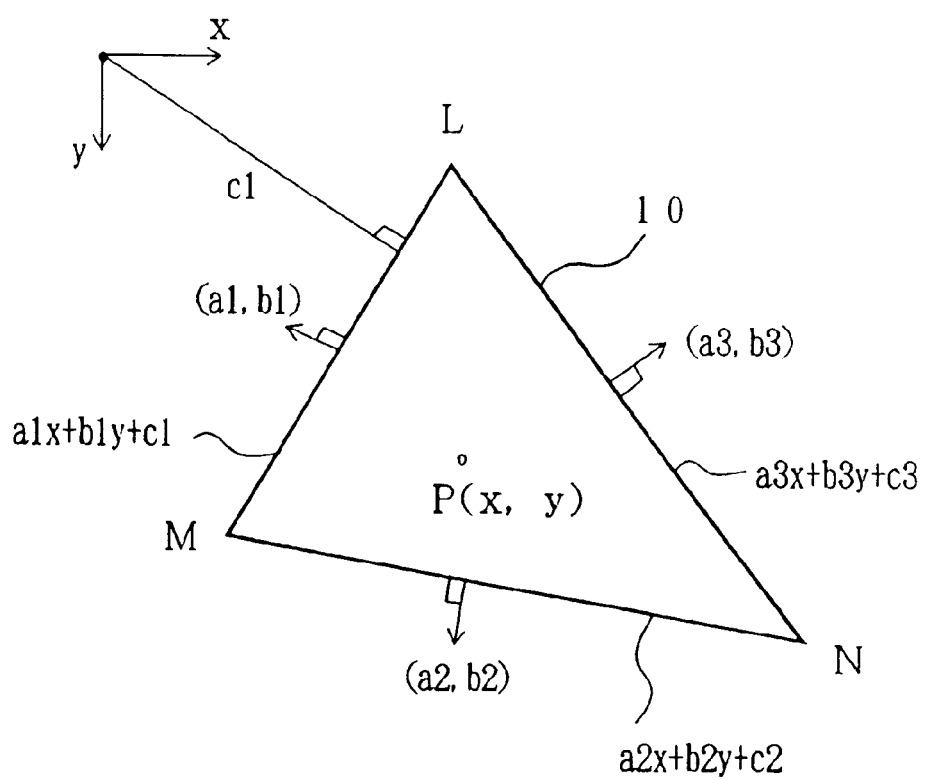
FIG. 5 is a diagram for explaining an algorithm for determining whether or not a given point $P(x, y)$ is located in a triangular polygon.

FIG. 5 is a diagram for explaining an algorithm for determining whether or not a given point $P(x, y)$ is located in a triangular polygon 10. For the individual sides LM, MN and NL of the triangle that has three vertexes L, M and N in the 2D coordinate system, let unit normal vectors of the triangle be $(a_1, b_1)$, $(a_2, b_2)$ and $(a_3, b_3)$, and let the distances of the perpendicular lines extending to the individual sides from the origin of the coordinates be $c_1$, $c_2$ and $c_3$. In this case, whether the given point $P(x, y)$ is positioned inside or outside the triangle can be determined by checking if the following values of d are negative or positive.

$$d_1=a_1x+b_1y+c_1$$

$$d_2=a_2x+b_2y+c_2$$

$$d_3=a_3x+b_3y+c_3$$

It is mathematically obvious that the point $P(x, y)$ lies inside the triangle when $d_1$, $d_2$ and $d_3$ are all negative. This algorithm is used to determine if a given point is positioned inside a given polygon.

According to the fractal scheme, therefore, computation can be performed to determine if 64 pixels lie in a given polygon. For the point $P_0(x_0, y_0)$, for example, $d_1$, $d_2$ and $d_3$ should be computed from the following equations and determination should be made as to whether or not $d_1$, $d_2$ and $d_3$ all become negative.

$$d_1=a_1x_0+b_1y_0+c_1$$

$$d_2=a_2x_0+b_2y_0+c_2$$

$$d_3=a_3x_0+b_3y_0+c_3$$

Further, computation to determine if the four segmented areas with the centers $P_1$, $P_2$, $P_3$ and $P_4$ lie inside a given polygon is carried out similarly. With respect to the point $P_1(x_1, y_1)$, for example, the computation is carried out as follows.

$$d_1=a_1x_1+b_1y_1+c_1=a_1(x_0-2)+b_1(y_0-2)+c_1$$

$$d_2=a_2x_1+b_2y_1+c_1=a_2(x_0-2)+b_2(y_0-2)+c_2$$

$$d_3=a_3x_1+b_3y_1+c_1=a_3(x_0-2)+b_3(y_0-2)+c_3$$

Eventually, $d_1$, $d_2$ and $d_3$ for the point $P_1$ can be acquired by executing simple subtractions on $d_1$, $d_2$ and $d_3$ that have been obtained for the point $P_0$ as follows.

$$d_1=d_1-2a_1-2b_1$$

$$d_2=d_2-2a_2-2b_2$$

$$d_3=d_3-2a_3-2b_3$$

Likewise, $d_1$, $d_3$ and $d_3$ for the 16 segmented areas $P_{11}$, $P_{12}$, $P_{13}$, $P_{14}$, $P_{21}$, $P_{22}$, ..., $P_{43}$ and $P_{44}$ can be acquired by executing simple subtractions on $d_1$, $d_2$ and $d_3$ that have been obtained for the points $P_1$, $P_2$, $P_3$ and $P_4$. For the center $P_{11}$, for example, the values of d can be acquired as follows.

$$d_1=d_1-a_1-b_1$$

$$d_2=d_2-a_2-b_2$$

$$d_3=d_3-a_3-b_3$$

Likewise, the calculation can be performed easily for the 64 segmented areas $P_{111}$, $P_{112}$, ..., $P_{443}$ and $P_{444}$. For the center $P_{111}$, for example, the values of d can be acquired as follows.

$$d_1=d_1-0.5a_1-0.5b_1$$

$$d_2=d_2-0.5a_2-0.5b_2$$

$$d_3=d_3-0.5a_3-0.5b_3$$

As apparent from the above, computation to determine if the center of each area lies inside a given polygon can be carried out very easily by using the fractal scheme.

Figure 6:
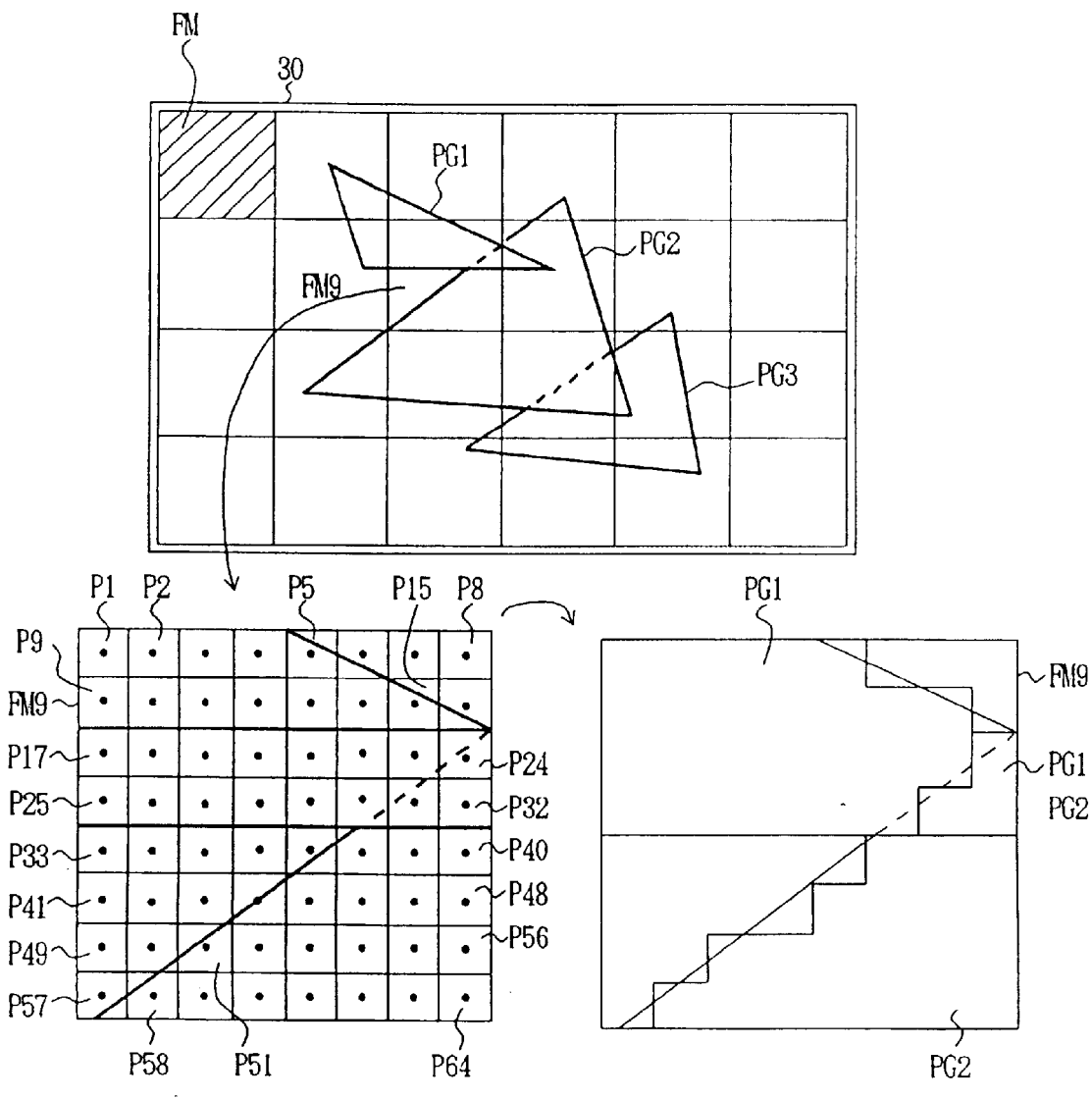
FIG. 6 is a diagram showing an example wherein three polygons PG1, PG2 and PG3 are displayed in a display screen 30.

FIG. 6 is a diagram showing an example wherein three polygons PG1, PG2 and PG3 are displayed in a display screen 30. As shown in FIG. 6, the display screen 30 is divided into a plurality of fragment areas FM. Parts of the polygons PG1 and PG2 are positioned in the fragment area FM9 near the center. This fragment area FM9, if enlarged, is shown in the lower left in FIG. 6. As illustrated, the fragment area FM9 is divided into 64 pixels $P_1$ to $P_{64}$. In this case, the pixels $P_1$ to $P_5$, $P_9$ to $P_{15}$, $P_{17}$ to $P_{24}$, $P_{25}$ to $P_{32}$ lie in the polygon PG1. Further, the pixels $P_{24}$, $P_{31}$, $P_{32}$, $P_{38}$ to $P_{40}$, $P_{45}$ to $P_{48}$, $P_{51}$ to $P_{56}$, and $P_{58}$ to $P_{64}$ lie in the polygon PG2.

Using the fractal scheme, computation to determine if the 64 pixels $P_1$–$P_{64}$ lie inside a given polygon can be carried out for all the polygons in the frame, so that the positions of the polygons in the fragment area 20 are checked. As shown in the lower right in FIG. 6, the positions of the polygons PG1 and PG2 are confirmed in the fragment area FM9. In the diagram, the two polygons PG1 and PG2 partially overlap each other.

The conventional scheme of raster-scanning the interior of a polygon determines which polygon's color should be given to which pixel by obtaining the coordinates of the pixels in polygons. By contrast, the above-described scheme can determine which polygon's color should be given to which pixel by obtaining the coordinate data of all the pixels in a fragment area and then determining from the coordinate data if each pixel lies in the polygon.

Another basic process in the rendering process is to determine which one of overlapping polygons should be displayed, pixel by pixel. For this purpose, an algorithm for comparing the Z values of the individual polygons with one another to select the polygon with the minimum Z value (the foreground polygon). Alternatively, at the time of rendering translucent polygons, color data of, for example, a background polygon is blended with color data of a foreground polygon, which overlaps the background polygon, in accordance with the transparency-degree indicating a value of the foreground polygon. In this case, the Z values are compared with each other too.

This comparison of Z values requires acquisition of Z values of a polygon at the individual pixels. The computation of Z values for each polygon can be performed very easily when the above-described fractal process is carried out.

Returning to FIGS. 4 and 5, for example, the Z value $Z_0$ of the pint $P_0$ can be acquired by the following equation.

$$Z_0 = (\partial z/\partial x)x_0 + (\partial z/\partial y)y_0 + cz$$

The $(\partial z/\partial x)$ and $(\partial z/\partial y)$ and $cz$ are unique constants that are determined from a plane of a polygon. Specifically, $(\partial z/\partial x)$ is the inclination of a plane of a polygon along the X axis, $(\partial z/\partial y)$ is the inclination of the plane of the polygon along the Y axis, and $cz$ is the Z value of the plane at the origin.

As understood from the equation, the Z value $Z_1$ of, for example, the center $P_1$ of one of the four segmented areas is given by:

$$Z_1 = Z_0 - 2(\partial z/\partial x) - 2(\partial z/\partial y).$$

Further, the Z value $Z_{11}$ of, for example, the center $P_{11}$ of one of the 16 segmented areas is given by:

$$Z_{11} = Z_1 - (\partial z/\partial x) - (\partial z/\partial y).$$

Furthermore, the Z value $Z_{111}$ of, for example, the center $P_{111}$ of one of the 64 segmented areas is given by:

$$Z_{111} = Z_{11} - 0.5(\partial z/\partial x) - 0.5(\partial z/\partial y).$$

As in the case of coordinates, therefore, the Z values of a polygon at 64 pixels can be obtained easily by addition and subtraction.

Thus, the fractal scheme can determine if each pixel lies in a polygon and at the same time can compute the Z value of the polygon at the pixel. This computation is repeated by the number of polygons in the target fragment area. When the computation is carried out for all the polygons in the frame, the polygon that should be displayed by the individual pixels and the Z values of that polygon in the fragment area are acquired.

According to the raster scanning in the rasterizing scheme, the interior of each polygon is scanned to compute the coordinates and Z values thereof, and a polygon which should be displayed by the individual pixels and the Z values of that polygon are obtained. As mentioned earlier, however, this computation involves division which makes longer the arithmetic operation time of the arithmetic unit comprised of a computer. With the use of the fractal scheme, by way of contrast, the computation basically involves only addition and subtraction, so that the computation time becomes significantly shorter. According to the fractal scheme, as will be discussed later, in a case of 64 pixels, the coordinates of the 64 pixels, polygons at each pixel and the Z value of a polygon can be acquired by implementing parallel computation for three stages. In this respect too, the time needed in the computation can be shortened.

Figure 7:
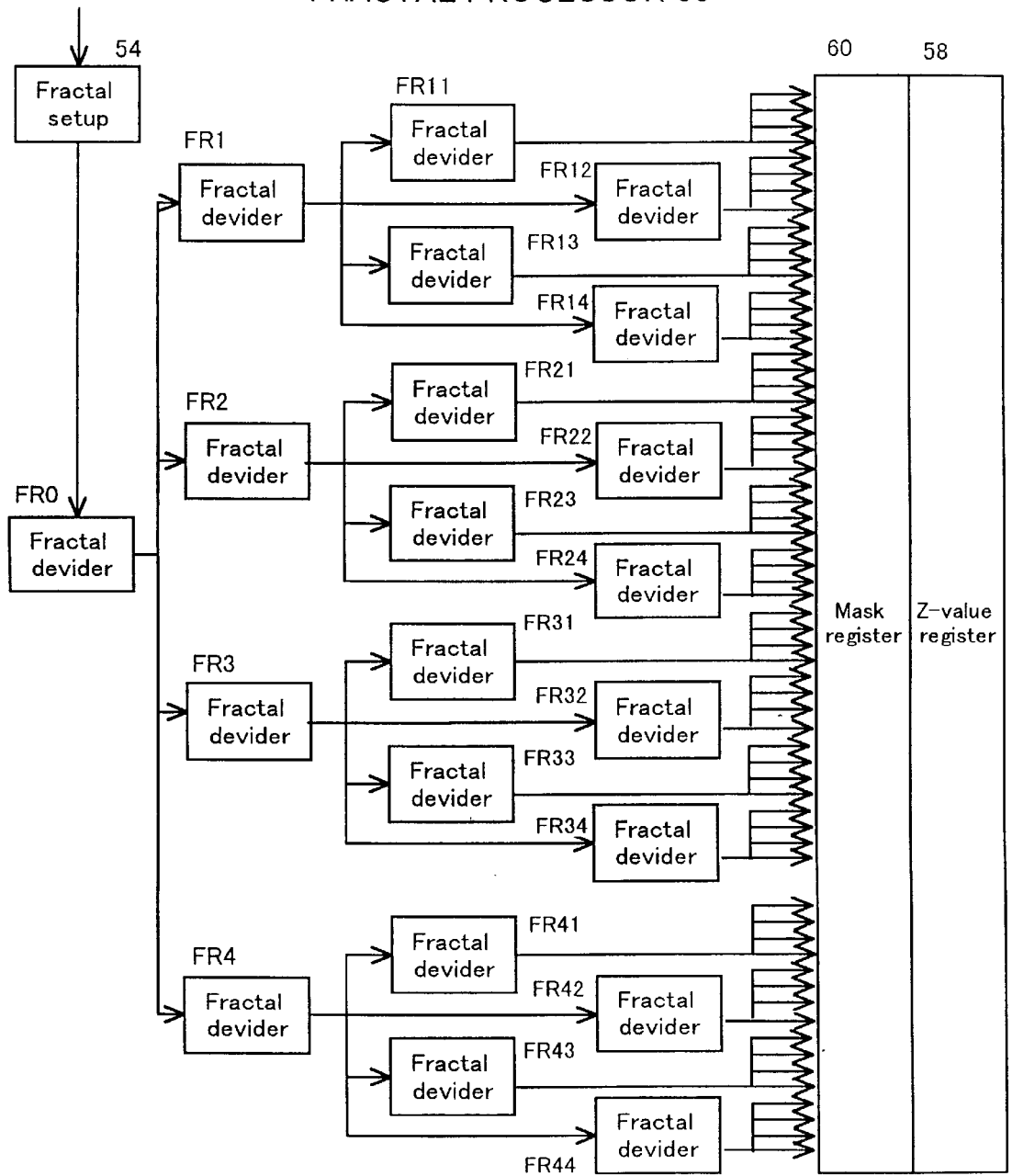
FIG. 7 is a diagram exemplifying the specific structure of a fractal processor.

FIG. 7 is a diagram exemplifying the specific structure of the fractal processor 55. In the diagram, the fractal setup section 54, which obtains the initial values needed in a fractal process, supplies the initial values for the center point of a fragment area being currently processed to the first fractal divider $FR_0$ in the fractal processor 55. The initial values are the 2D coordinates $(x_0, y_0)$ of the center point $P_0$ of the fragment area, determination values $d_1$, $d_2$ and $d_3$ by which it is determined whether the coordinates lie inside or outside the polygon that is currently processed, and the Z value $Z_0$. In the fractal divider $FR_0$, the 2D coordinates $(x_1, y_1)$ to $(x_4, y_4)$ of the center points $P_1$, $P_2$, $P_3$ and $P_4$ of the four segmented areas, determination values $d_1$, $d_2$ and $d_3$ (four sets) by which it is determined whether the individual coordinates lie inside or outside the polygon that is currently processed, and the Z values $Z_1$ to $Z_2$ are acquired from the initial values for the point $P_0$. As described earlier, this computation involves only addition and subtraction on the initial values.

In fractal dividers $FR_1$ to $FR_4$, initial values for the four divided points $P_{11}$, $P_{12}$, $P_{14}$, ..., $P_{43}$ and $P_{44}$ are similarly computed from the 2D coordinates $(x_1, y_1)$ to $(x_4, y_4)$ of the four points $P_1$, $P_2$, $P_3$ and $P_4$, determination values $d_1$, $d_2$ and $d_3$ (four sets) by which it is determined whether the individual coordinates lie inside or outside the polygon that is currently processed, and the Z values $Z_1$ to $Z_4$.

Likewise, as the computation in the third stage, in fractal dividers $FR_{11}$ to $FR_{14}$, initial values for the further divided points $P_{111}$, $P_{112}$, ..., $P_{143}$ and $P_{144}$ are similarly computed from the 2D coordinates $(x_{11}, y_{11})$ to $(x_{14}, y_{14})$ of the points $P_{11}$ to $P_{14}$, determination values $d_1$, $d_2$ and $d_3$ (four sets) by which it is determined whether the individual coordinates lie inside or outside the polygon that is currently processed, and the Z values $Z_{11}$ to $Z_{14}$.

In fractal dividers $FR_{21}$ to $FR_{24}$, similar initial values for the further divided points $P_{211}$, $P_{212}$, ..., $P_{243}$ and $P_{244}$ are acquired from the similar initial values of the points $P_{21}$ to $P_{24}$. Similar computation is also carried out in fractal dividers $FR_{31}$ to $FR_{34}$ and $FR_{41}$ to $FR_{44}$.

In the fractal dividers $FR_{11}$ to $FR_{44}$ in the third stage, it is determined whether or not $d_1$, $d_2$ and $d_3$ provided for each pixel are negative. When the values d are all negative, the associated pixel lies in the polygon that is currently processed. Then, the Z value of that pixel is compared with the Z value in the Z-value register 561. Alternatively, the Z value of that pixel is compared with the Z value in the trans Z-value register 562 or is compared with the ID of the associated shadow volume. When the Z value of the pixel in an opaque polygon is smaller than the Z value in the Z-value register 561, for example, it means that the polygon is positioned in the foreground in the display screen, so that the Z value of the pixel is recorded in the Z-value register 561. At the same time, data is written in the associated one of the mask registers 533–537 of a mask register 60.

In a case of employing the fractal process, simple computations involving addition and subtraction can be performed in parallel as already discussed in the foregoing description of the fractal processor illustrated in FIG. 7. For a single fragment area, computation to acquire a polygon to be drawn for each pixel can be completed through the three-stage computation after the initial values have been given in this example. This means that the latency in the pipeline process can be shortened. As compared with a case where computation is simply carried out pixel by pixel that involves the execution of the same calculation 64 times, the use of the fractal process can dramatically shorten the computation time.

Figure 8:
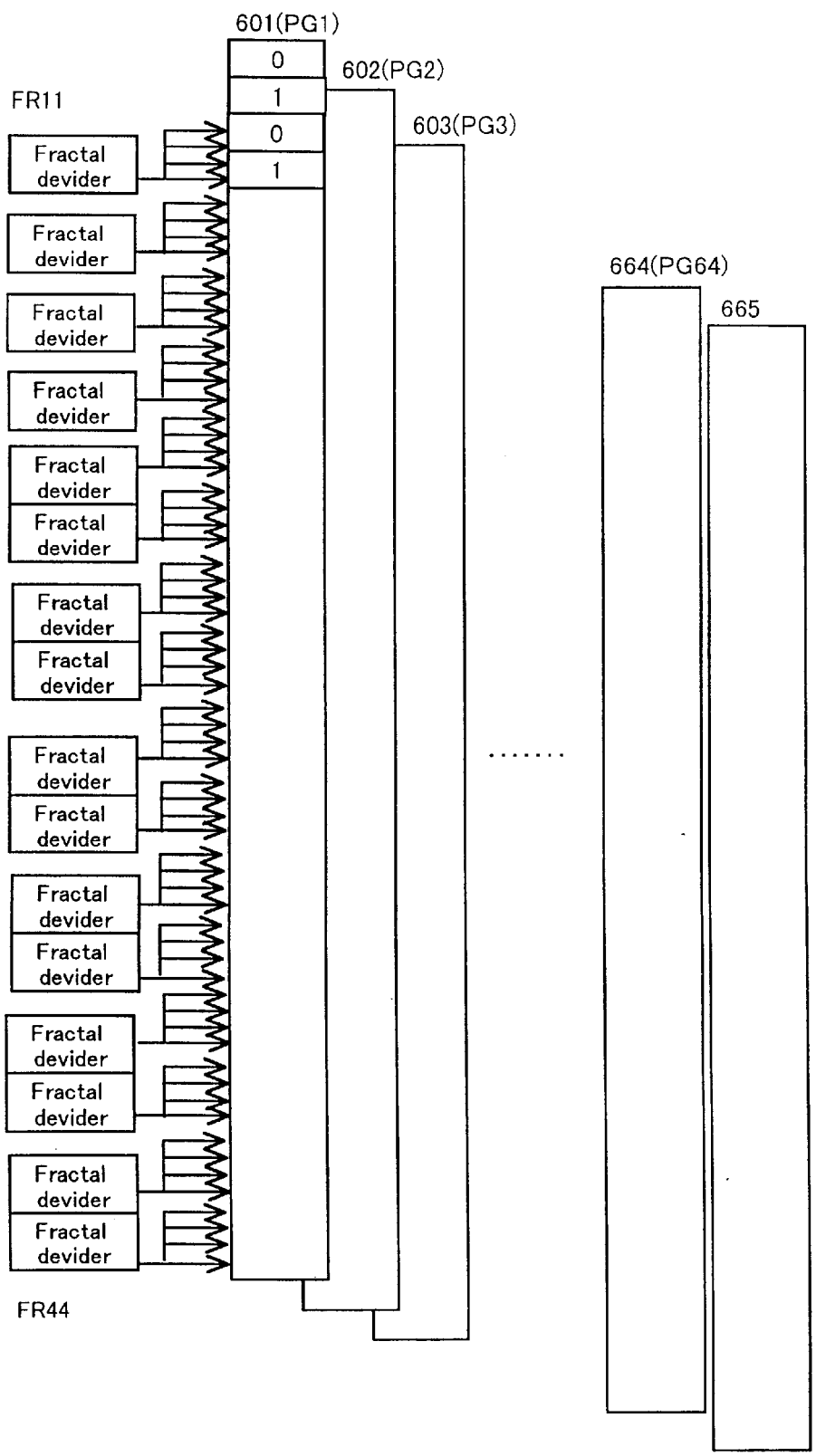
FIG. 8 is a diagram exemplifying the detailed structure of a mask register.

FIG. 8 is a diagram exemplifying the detailed structure of the mask register 60. FIG. 8 shows the fractal dividers $FR_{11}$–$FR_{44}$ in the lowermost stage. This mask register 60 is comprised of registers in which 64-bit flag bits are stored. When a fragment area consists of 64 pixels, 64+1 registers 601–655 are provided. A polygon is assigned to each register.

When polygon data of the polygon PG1 is supplied to the fractal setup section 54, for example, the fractal processor 55 determines if 64 pixels lie in the polygon PG1. When it is determined that the 64 pixels lie in the polygon PG1, the flag bit of the associated pixel in a mask register 601 to which the polygon PG1 is assigned is set to "1." Or when the Z value of a pixel is smaller than (in the foreground of) the Z value in the associated Z-value register, the flag bit of the associated pixel in the mask register 601 (PG1) to which the polygon PG1 is assigned is set to "1." As a result, it is recorded that the pixel belongs to the polygon PG1 or the pixel lies in the polygon PG1 to be displayed. That is, the pixel with the flag bit of "1" means the effective pixel area of that polygon.

As the fragment area has 64 pixels, a maximum of 64 mask registers are necessary. Another mask register which is used during computation is added so that a total of 65 mask registers 601–655 are provided.

Figure 9:
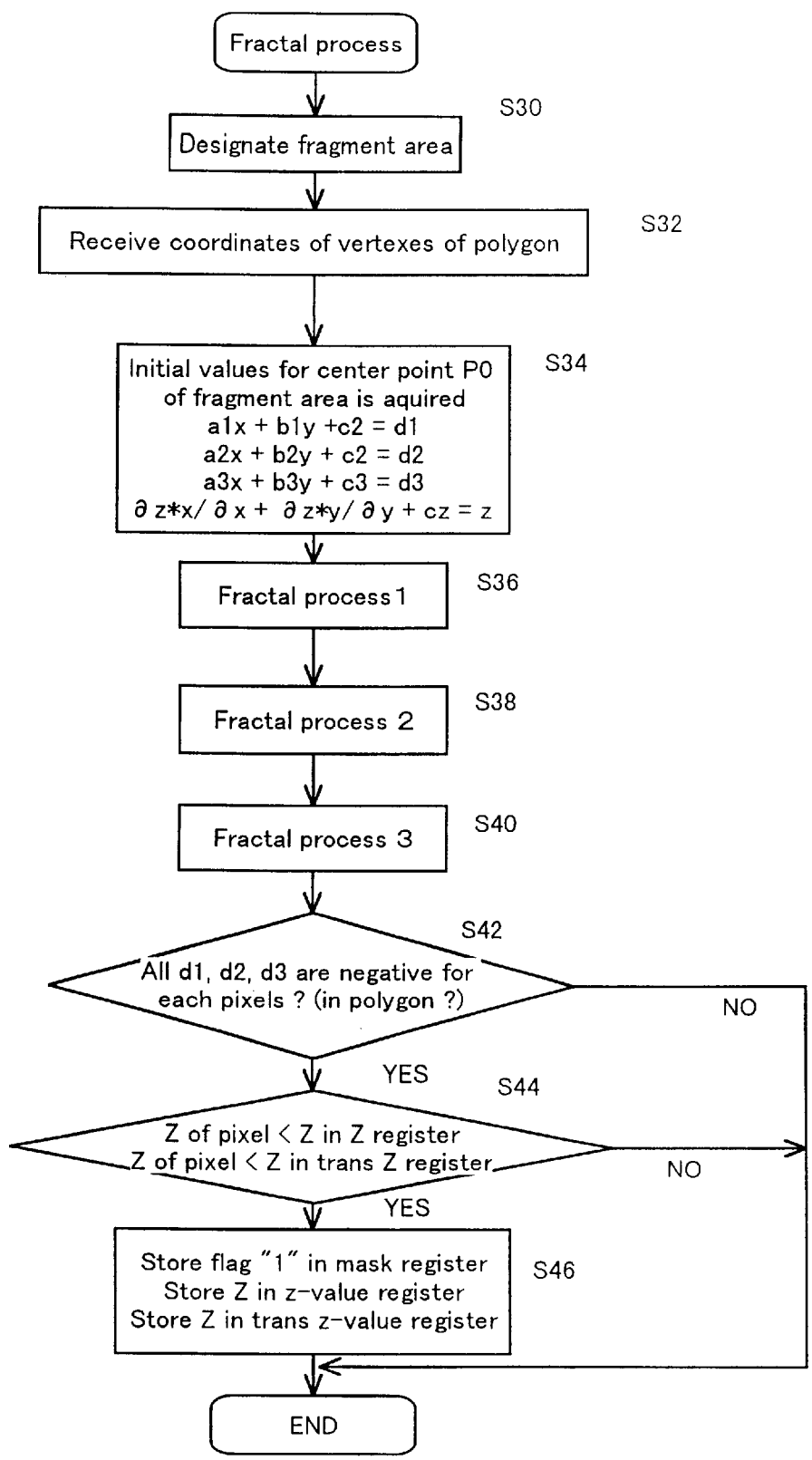
FIG. 9 is a flowchart of a fractal process.

FIG. 9 is a flowchart of the above-described fractal process. This fractal process is to be understood more clearly by reference to the flowchart in FIG. 9. A fragment area is designated in step S30, and data of polygon in the frame is supplied to the primitive buffer 52 from the geometry processor 48 (S32). In this case, the coordinates of vertexes and their Z values, for example, are given. This polygon data is supplied from the mask controller 53 to the fractal setup section 54 where the initial values of d and Z for the center point $P_0$ of the fragment area are acquired (S34). The equations for the computation have already been discussed.

Then, the mask controller 53 sends mask data, which shows, for example, that all the pixels become effective areas, to the fractal processor 55. Based on the initial values of d and Z for the center point $P_0$, a fractal process of yielding four segmented areas (S36), a fractal process of yielding 16 segmented areas (S38) and a fractal process of yielding 64 segmented areas (S40) are executed. Consequently, $d_1$, $d_2$, $d_3$ and the Z value for each pixel in the fragment area are acquired. It is then determined whether or not that pixel lies inside the polygon which is currently processed by determining if the values of $d_1$, $d_2$ and $d_3$ are all negative (S42). When the values of $d_1$, $d_2$ and $d_3$ are all negative, the pixel lies in the polygon. Thus, the pixel whose values of d do not all become negative is deleted (change into data "0") from the effective areas of the mask data.

Further, the Z value of that pixel is compared with the Z value in the Z-value register 561 (S44). When the Z value is smaller than (in the foreground of) the Z value in the Z-value register, the Z value is stored in the Z-value register 561 and the flag "1" is stored in the associated register of the mask register (S46).

Alternatively, in another process, the Z value of that pixel is compared with the Z value in the trans Z-value register 562 (S44). When the Z value is greater than (in the background of) the Z value in the trans Z-value register, the Z value is stored in the trans Z-value register 562 and the flag "1" is stored in the associated register of the mask register (S46).

Whether executing the former process or the latter one varies depending on the intended processing. The steps S44 and S46 are executed by the comparison section 56 in FIG. 2.

The mask register with the above-described structure records which pixel in each polygon should be drawn or should be set valid by means of the flag bits. The mask register is thus capable of masking the drawing area of a polygon or masking the effective area of a polygon. As each flag bit is data of either "1" or "0," logic gate circuits, such as AND, OR, NAND and NOR, can simply be used in performing a predetermined logical computation on plural pieces of mask data. Therefore, an exclusion operation, an exclusive OR operation and an OR operation on such mask data can be efficiently carried out in a short period of time by simple logic gate circuits.

We believe that the foregoing description has helped readers understand more clearly the fractal process and mask data in a fragment area which is generated by the fractal process. A description will now be given of a drawing process on an opaque mask, a translucent mask and a shadow volume included in a frame.

General Flow Of Drawing Process

Figure 10:
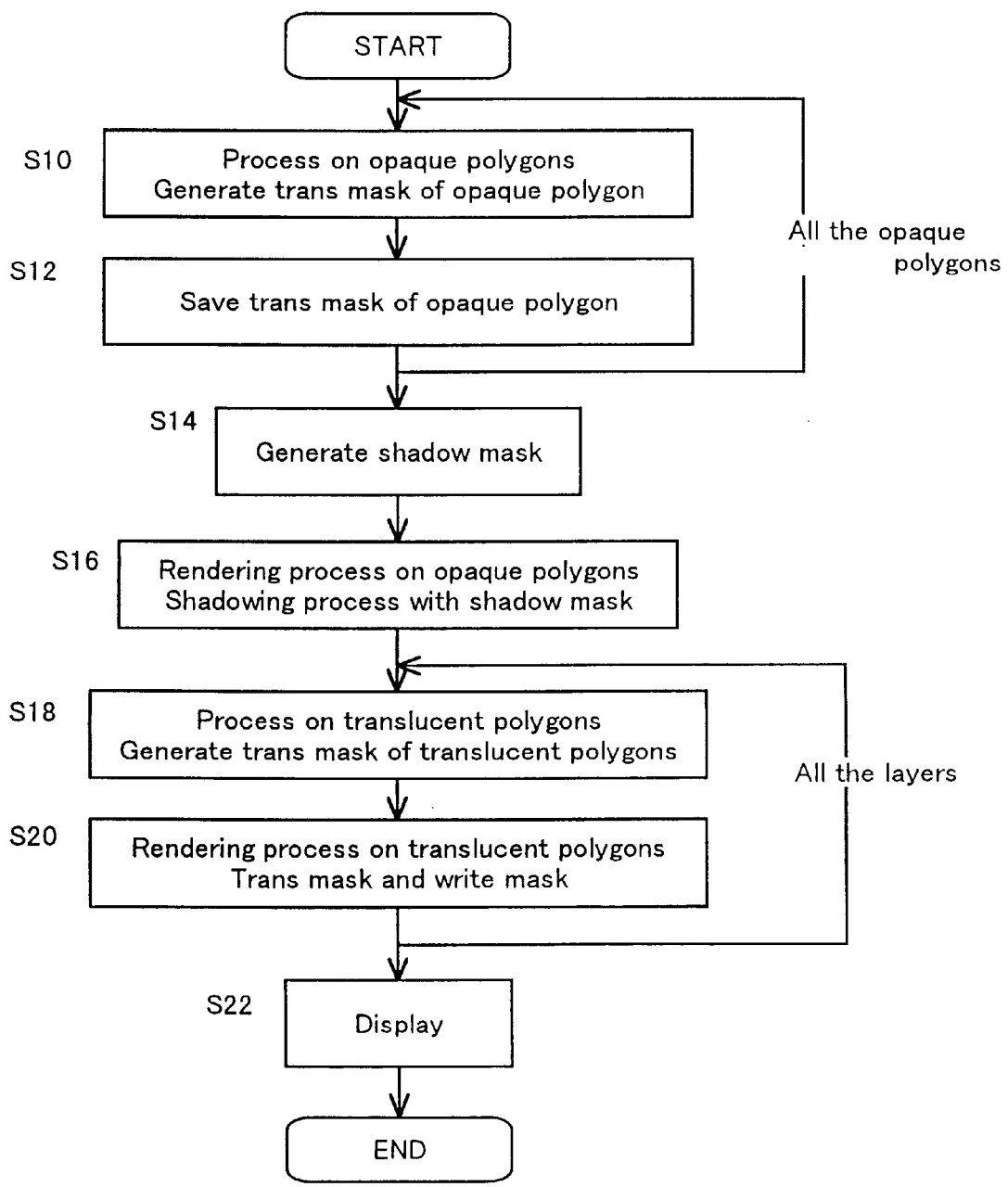
FIG. 10 is a flowchart illustrating the general flow of a drawing process.

FIG. 10 is a flowchart illustrating the general flow of a drawing process. In this example, opaque polygons and translucent polygons exist within a frame, and when shadowing with a light source is carried out, mask data is appropriately generated by using the above-described fractal process and a drawing process is carried out efficiently.

The mask generator 50 sequentially receives data of opaque polygons from the geometry processor 48 and performs a process on the opaque polygons (S10 and S12). This is discussed briefly as follows. In a case of an opaque polygon, a pixel with the smallest Z value (located in the most foreground) is to be drawn finally. By using the fractal process, therefore, an effective pixel area in an opaque polygon is detected and its Z value is acquired at the same time. When the Z value is smaller than the Z value in the Z-value register 561, trans mask data for that polygon is set to "1" and the Z value in the Z-value register is rewritten. Consequently, data of a pixel to be drawn is generated as trans mask data for each polygon (S10). This trans mask data is subjected to an exclusion operation with the trans mask data of another opaque polygon which has already been generated, and is saved (S12).

When the steps S10 and S12 are performed on all the opaque polygons, the geometry processor 48 supplies the mask generator 50 with data of shadow polygons which define a shadow volume, shadow space where rays of light from the light source are shielded. The mask generator 50 executes the shadowing process, generating shadow mask data which indicates a shadow area on the opaque polygon where the light from the light source is not irradiated (S14).

Then, rendering of the opaque polygon is carried out based on the trans mask data of the opaque polygon and the shadow mask data which has been acquired through the shadowing process and has been stored in the area mask (S16). Specifically, the trans mask data in the associated trans mask register 533 and the shadow mask data in the associated area mask register 534, both in the mask controller 53, are supplied to the rendering section 62. The rendering section 62 generates image data of a polygon corresponding to the effective pixel area indicated by the trans mask data, and records the image data in the frame buffer 66. In the generation of the image data, texture data in the texture buffer 64 is acquired from the texture coordinates of a pixel and color data is acquired from color related data, and a process involving the light source is carried out using the normal vectors. That is, the luminance value, for example, is increased for an area on which the light from the light source is irradiated. For an area on which the light from the light source according to shadow mask data is not irradiated, the process involving the light source is not performed.

Then, a process on a translucent polygon is executed (S18). The "translucent polygon" here means a polygon which is neither opaque nor transparent and includes a polygon with the maximum transparency α. In a case of a translucent polygon, its color should be blended with the color of a polygon which is located in the background, in accordance with the transparency. According to this embodiment, therefore, a trans mask indicative of an area of the translucent polygon which is located deepest in the display screen is generated first by an algorithm to be discussed later (S18). The mask controller 53 sends the trans mask data to the rendering section 52. The rendering section 52 blends the image data in the frame buffer 66 with the color data of the translucent polygon being processed (S20). The blended image data is stored again in the frame buffer 66.

The steps S18 and S20 are repeated for all the planes of the overlapping area of the translucent polygons. Finally, the image data in the frame buffer 66 is supplied to the display screen 68 to be displayed (S22).

Each of the above-described processes will be described in detail by reference to a specific example.

Process On Opaque Polygon (First Invention)

Figure 11B:
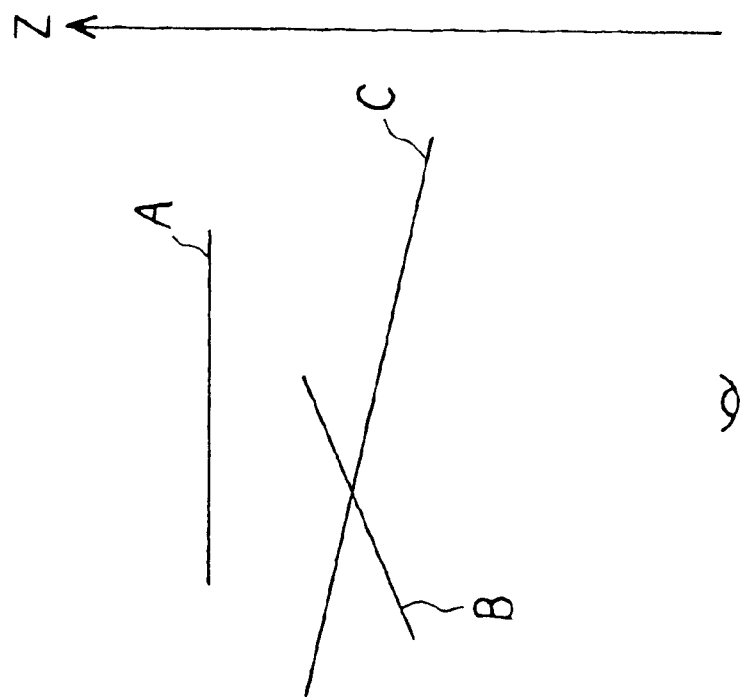
FIG. 11 is a diagram showing an example for explaining a process of opaque polygons.
Figure 11A:
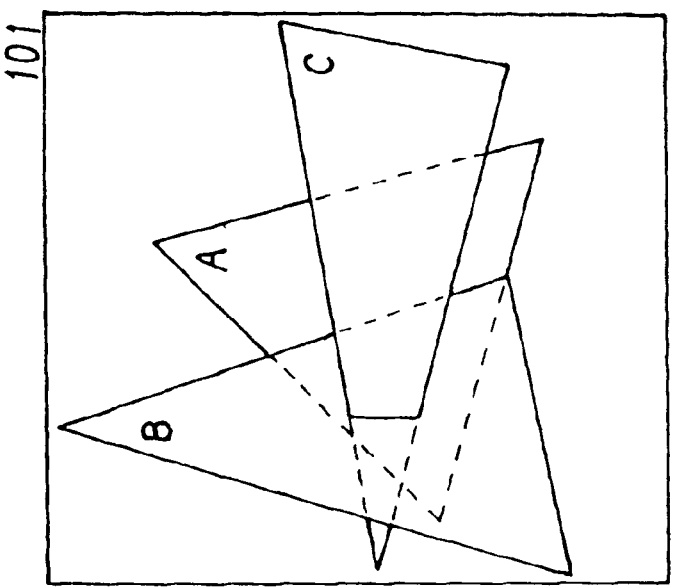

FIG. 11 is a diagram showing an example for explaining a process on opaque polygons. FIG. 11A exemplifies a display screen 101 in which a polygon A, polygon B and polygon C partially overlap one another as illustrated. FIG. 11b shows the relationship among the depths of the polygons along the central horizontal line of the display screen 101. Specifically, the polygon A is located deepest (maximum Z value), and the polygons B and C are located in the foreground of the polygon A but crosses each other.

For such opaque polygons, the area where the polygons overlap one another undergoes a hidden-surface deleting process to delete an area of the polygon that located in the background side. The most typical way for the process is a Z buffer scheme which acquires Z values of the pixels of individual polygons by raster scanning and compares the Z values with the Z value already written in the Z-value register.

Figure 12:
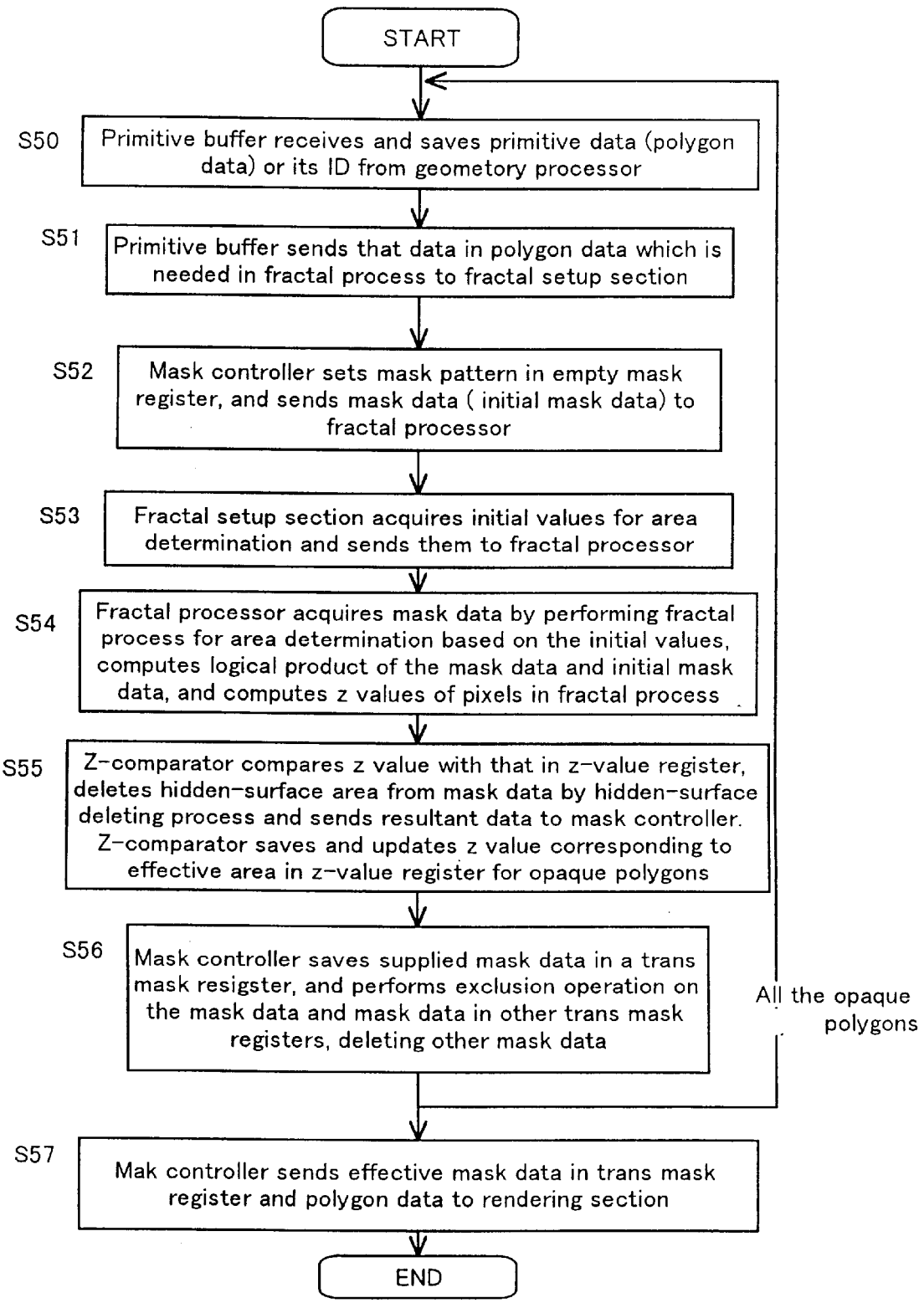
FIG. 12 is a flowchart of the process of opaque polygons according to one embodiment.

FIG. 12 is a flowchart of the process on opaque polygons according to one embodiment. The process on opaque polygons according to this embodiment employs a scheme of generating trans mask data using the fractal process. In the mask controller 53 shown in FIG. 2, the trans mask registers 533 and the exclusion section 531 are used, while in the comparison section 56, the Z-value register 561 for opaque polygons and the Z-comparator 564 are used. In accordance with data of opaque polygons, the fractal processor 55 generates mask data indicating polygon areas, the Z-comparator 564 performs the hidden-surface deleting process to erase the deeper area from the mask data, and the resultant data are stored in the associated trans mask registers 533. Further, the trans mask data of the individual opaque polygons are subjected to an exclusion operation in the exclusion section 531, and the resultant data are stored again in the associated trans mask registers 533. The above process is performed on all the opaque polygons. Then, mask data finally formed and stored in the trans mask registers are transferred to the rendering section 52.

Figure 34:
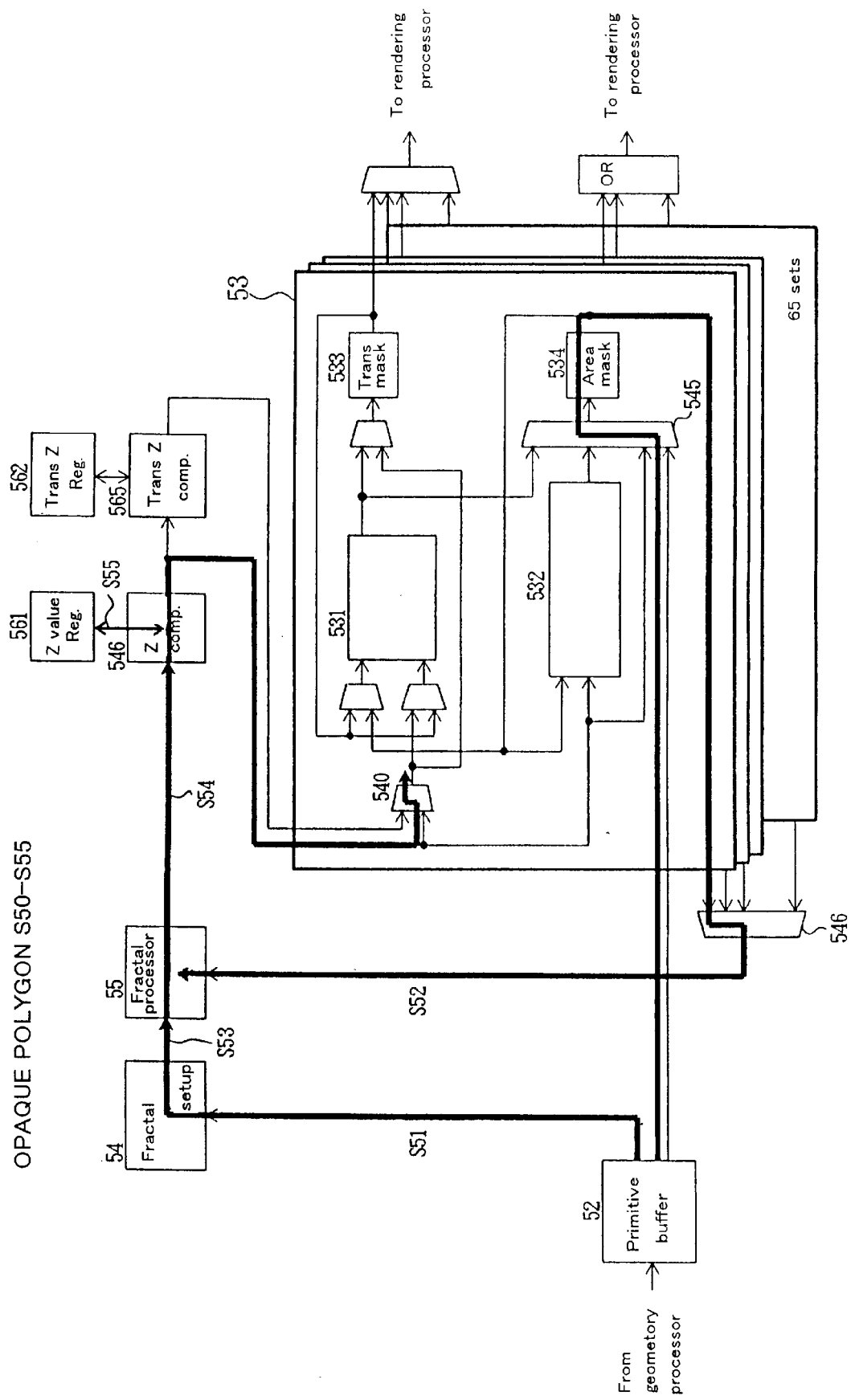
FIG. 34 is a diagram showing a data flow in a mask generator 50 in a case of processing opaque polygons.
Figure 35:
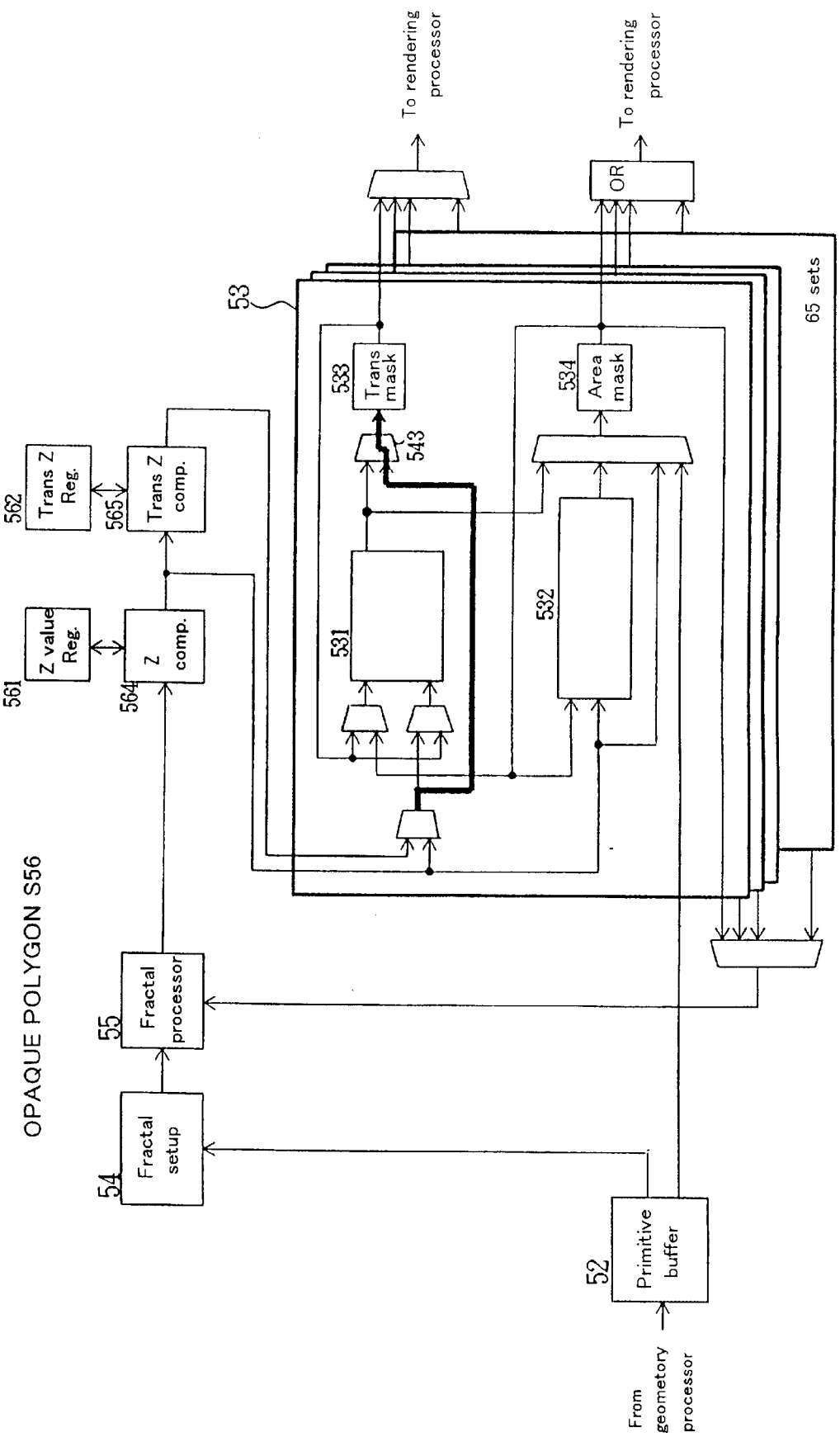
FIG. 35 is a diagram showing a data flow in the mask generator 50 in a case of processing opaque polygons.
Figure 36:
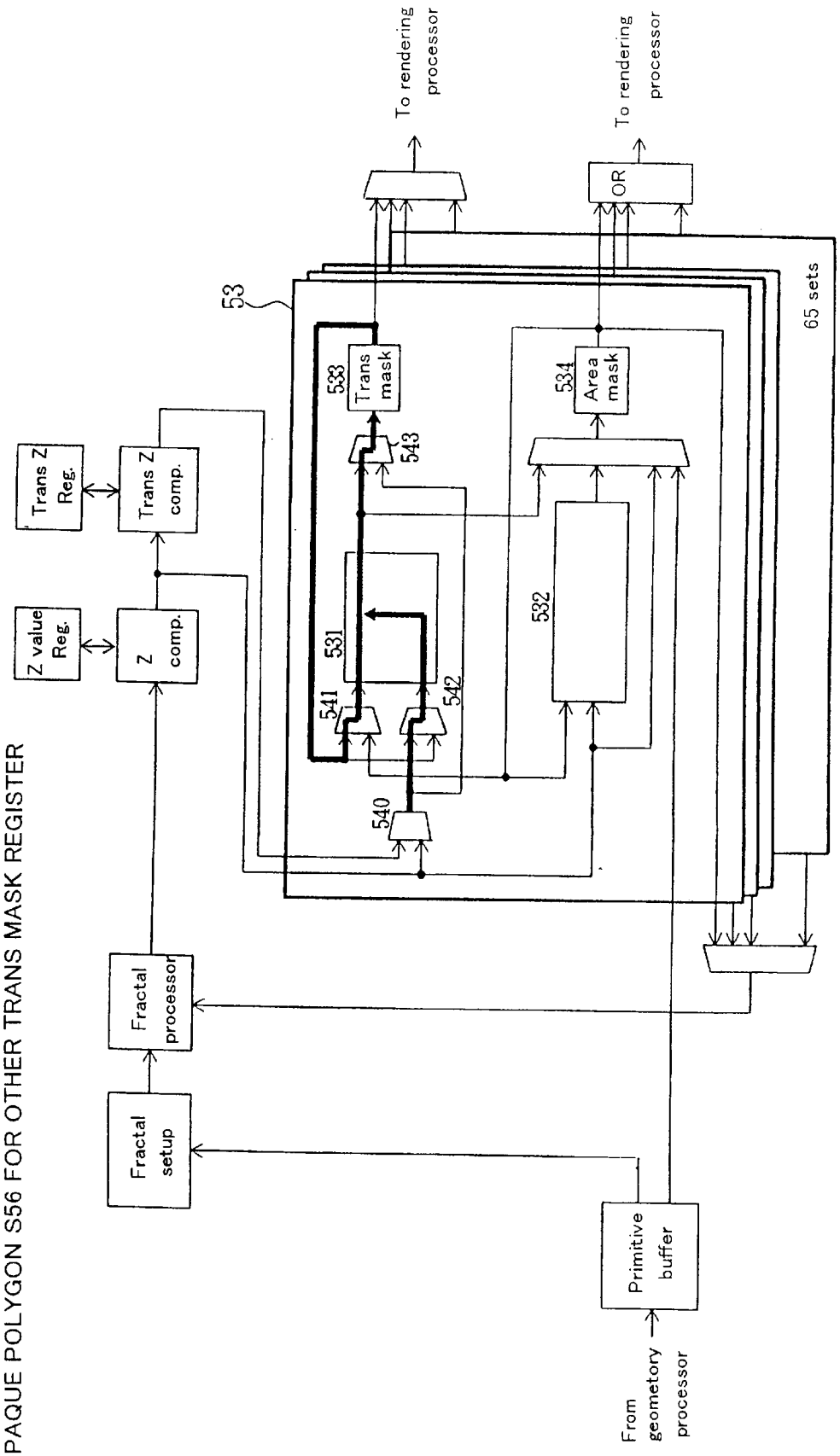
FIG. 36 is a diagram showing a data flow in the mask generator 50 in a case of processing opaque polygons.
Figure 37:
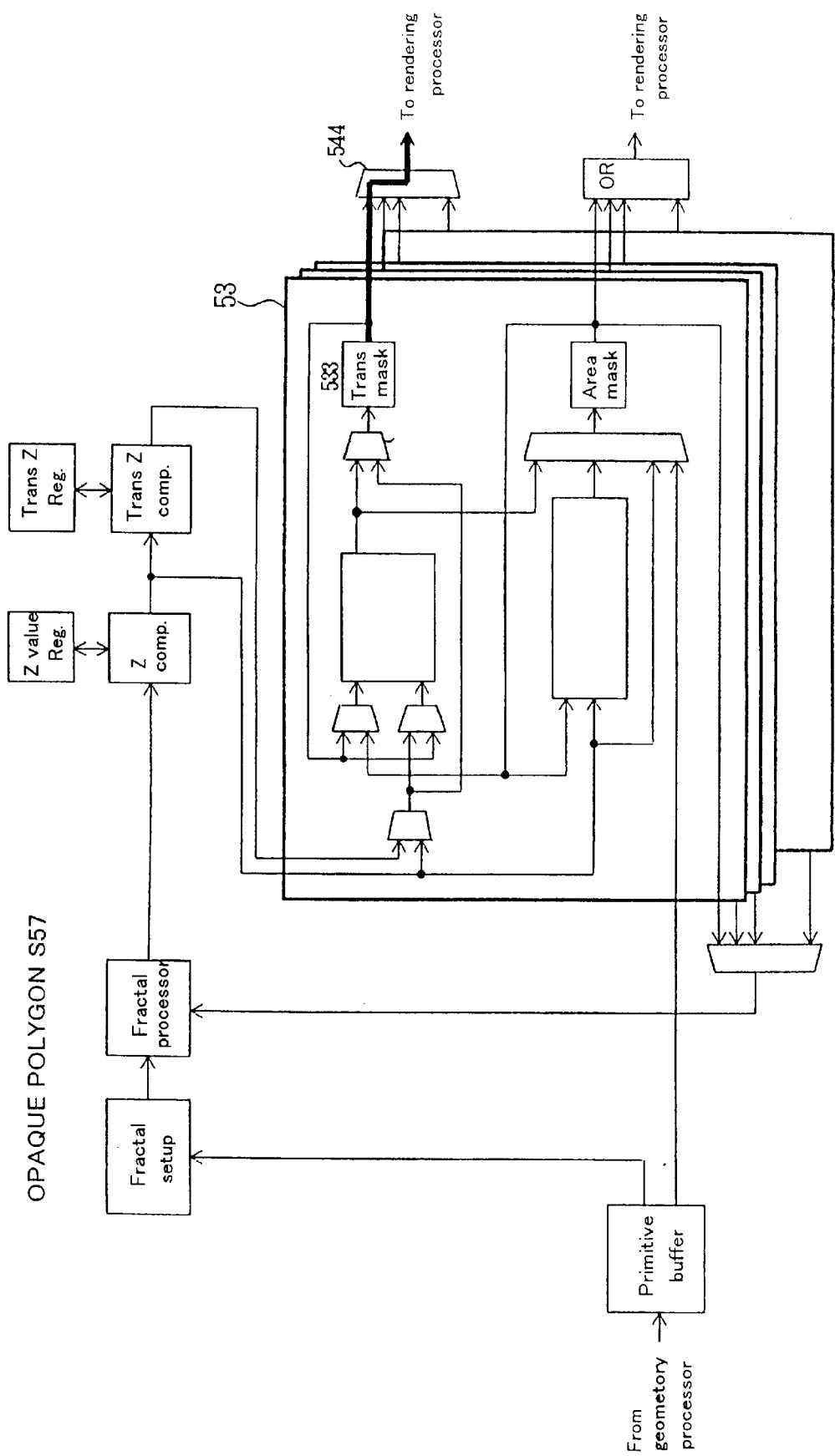
FIG. 37 is a diagram showing a data flow in the mask generator 50 in a case of processing opaque polygons.

FIGS. 13 through 16 are diagrams showing changes in trans mask data when the example in FIG. 11 is processed. FIGS. 34 through 37 are diagrams showing data flows in individual processes in the flowchart in FIG. 12. FIG. 34 shows a process of steps S50 to S55, FIGS. 35 and 36 show a process of step S56, and FIG. 37 shows a process of step S57. The process on opaque polygons will now be discussed referring to FIGS. 12–16 and 34–37.

The processing order of opaque polygons does not matter particularly. Suppose the polygons A, B and C in the example in FIG. 11 are processed in the named order. First, for the polygon A, the primitive buffer 52 receives primitive data, which is polygon data, or its ID from the geometry processor 48 and stores the data (S50). Then, the primitive buffer 52 supplies the fractal setup section 54 with that of the polygon data which is needed in the fractal process. The polygon data which is needed in the fractal process are, for example, the display coordinates (X, Y) and the Z value included in the vertex parameters (S51). The mask controller 53 sets a mask pattern in the area mask register 534 which is not used, and supplies the mask pattern as initial mask data to the fractal processor 55 (S52).

Figure 13:
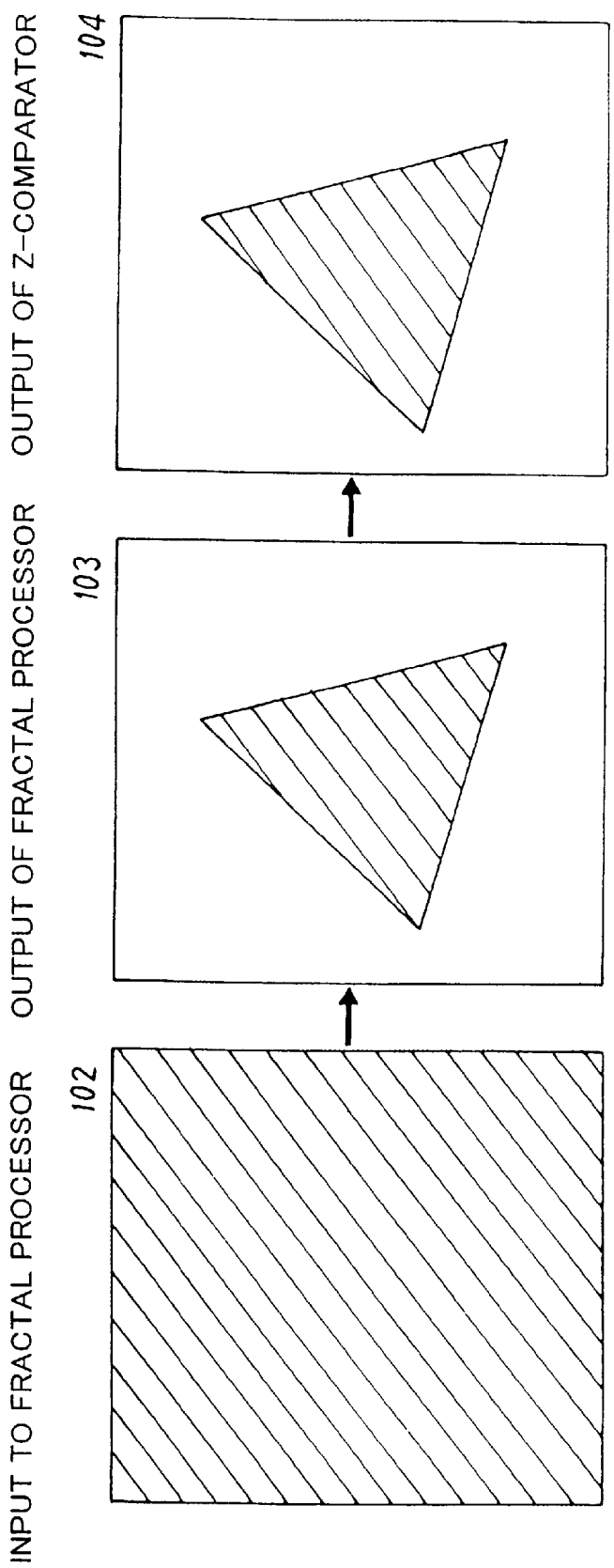
FIG. 13 is a diagram showing a change in a trans mask when the example in FIG. 11 is processed.

This initial mask data indicates a mask 102 in FIG. 13. In the first process, all the bits of the initial mask data are set to "1" which is valid or effective. In FIG. 13 and the subsequent diagrams, hatched portions indicate effective areas.

Next, the fractal setup section 54 obtains initial values for area determination and send the values to the fractal processor 55 (S53). The initial values include $d_1$, $d_2$, $d_3$, $(\partial z/\partial x)$, $(\partial z/\partial y)$ and cz, as shown in step S3 in FIG. 9. The fractal processor 55 executes a fractal process for area determination based on the initial values, acquiring mask data, and then performs a logical product of this mask data and initial mask data. The fractal processor 55 further obtains the Z values of pixels by a fractal process (S54). The fractal process for the area determination and the fractal process for the computation of the Z values have already explained.

The mask data generated by the fractal processor 55 is mask data 103 in FIG. 13. As the polygon A is the first polygon, its entire area is determined as an effective area. The mask data 103 and the Z values are supplied to the Z-comparator 564 of the comparison section 56.

The Z-comparator 564 compares the Z values obtained in the fractal process with the Z value in the Z-value register 561, erases a hidden area from the mask data 103 by the hidden-surface deleting process, and sends the resultant data to the mask controller 53. Further, any Z value corresponding to an effective area is saved and updated in the Z-value register 561 for opaque polygons (S55). In this case, since the polygon is also the first one, no area is deleted by the hidden-surface deleting process, and the mask data which comes from the Z-comparator 564 becomes a mask 104 in FIG. 13. This mask 104 is supplied to the mask controller 53.

Then, the mask controller 53 stores the supplied mask 104 in the associated trans mask register 533 (S56 and FIG. 35), and performs an exclusion operation with mask data in other trans mask registers, deleting the other mask data (S56 and FIG. 36). That is, the mask 104 is written in the trans mask register 533 corresponding to the polygon A. As other polygons have not been processed yet, there are no other trans mask registers. Accordingly, the trans mask of the polygon A does not undergo an exclusion operation with other trans masks.

Figure 14:
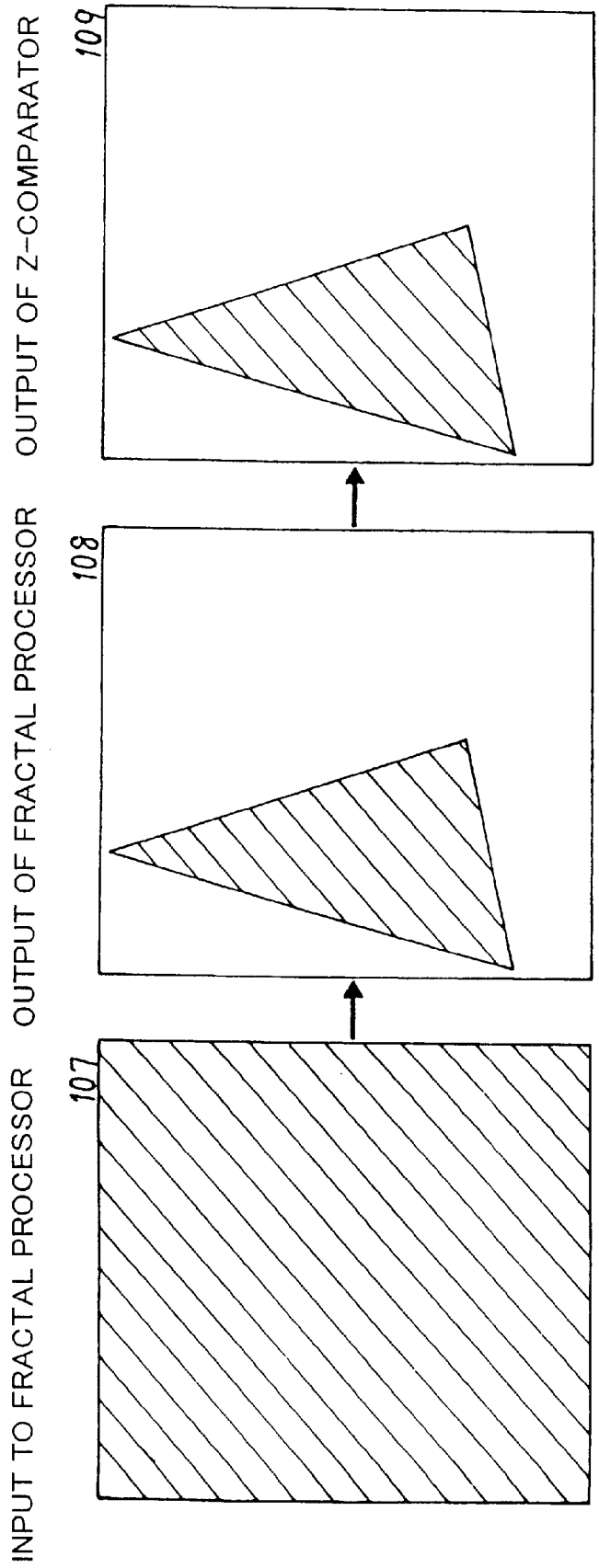
FIG. 14 is a diagram showing a change in the trans mask when the example in FIG. 11 is processed.

Then comes processing of the polygon B. For the polygon B, processes of steps S50 to S56 in FIG. 12 are performed as done for the polygon A. FIG. 14 shows an initial mask 107 in step S52, a mask 108 generated by the fractal processor 55 in step S54, and a mask 109 which has been generated by the Z-comparator 564 and stored in the trans mask register 533 in step S55, all for the polygon B. In step S56, the exclusion section 531 performs an exclusion operation on the trans mask 109 of the polygon B and the trans mask 104 of the polygon A in the trans mask register 533, deletes an overlapping area from the trans mask 104 of the polygon A, and generates new trans mask 105 shown in FIG. 16 and stores the mask 105 in the trans mask register 533 of the polygon A.

Figure 16:
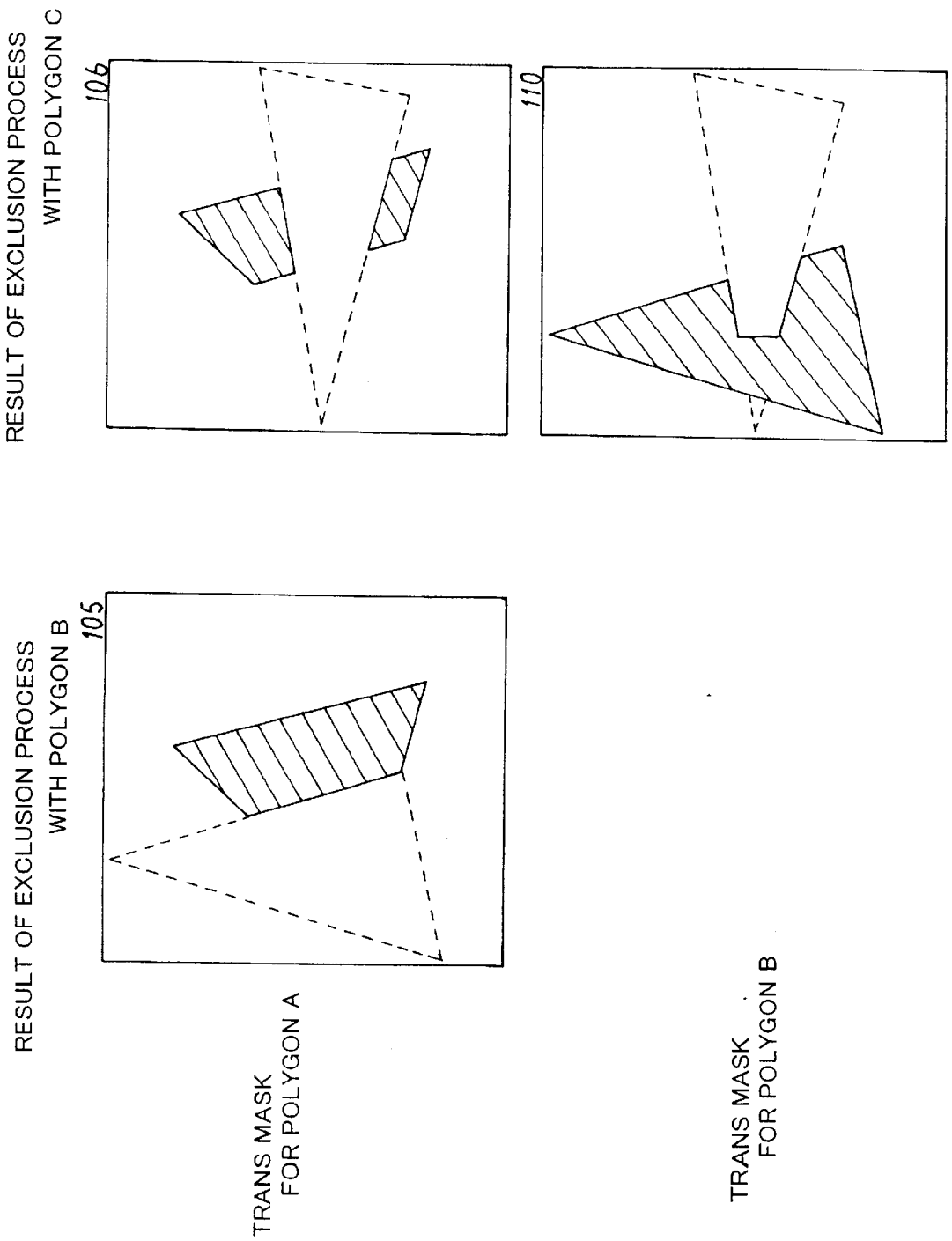
FIG. 16 is a diagram showing a change in the trans mask when the example in FIG. 11 is processed.

Because the trans mask 109 of the polygon B has an area which has become valid as a result of comparison of Z values, the area which overlaps the trans mask 104 of the polygon A processed previously is deleted from the trans mask 104 of the polygon A, yielding the new trans mask 105 (FIG. 16).

As shown in FIG. 36, this exclusion operation is performed on the trans mask data of the polygon B supplied from the comparison section 56 and the trans mask data in the trans mask register 533 for the polygon A. The trans mask data of the processed polygon A is stored again in the trans mask register 533. The trans mask data of the polygon B was stored in the trans mask register 533 in a different layer.

As obvious from the above description, given that data of an effective area is "1," the exclusion operation on the trans masks 109 and 104 is a logical operation, (109)·(!104), or a logical product of the trans mask 109 and inverted data of the trans mask 104. In this specification, "!" means inversion logic and (!104) thus means the inversion of (104) or negative bits thereof.

Figure 15:
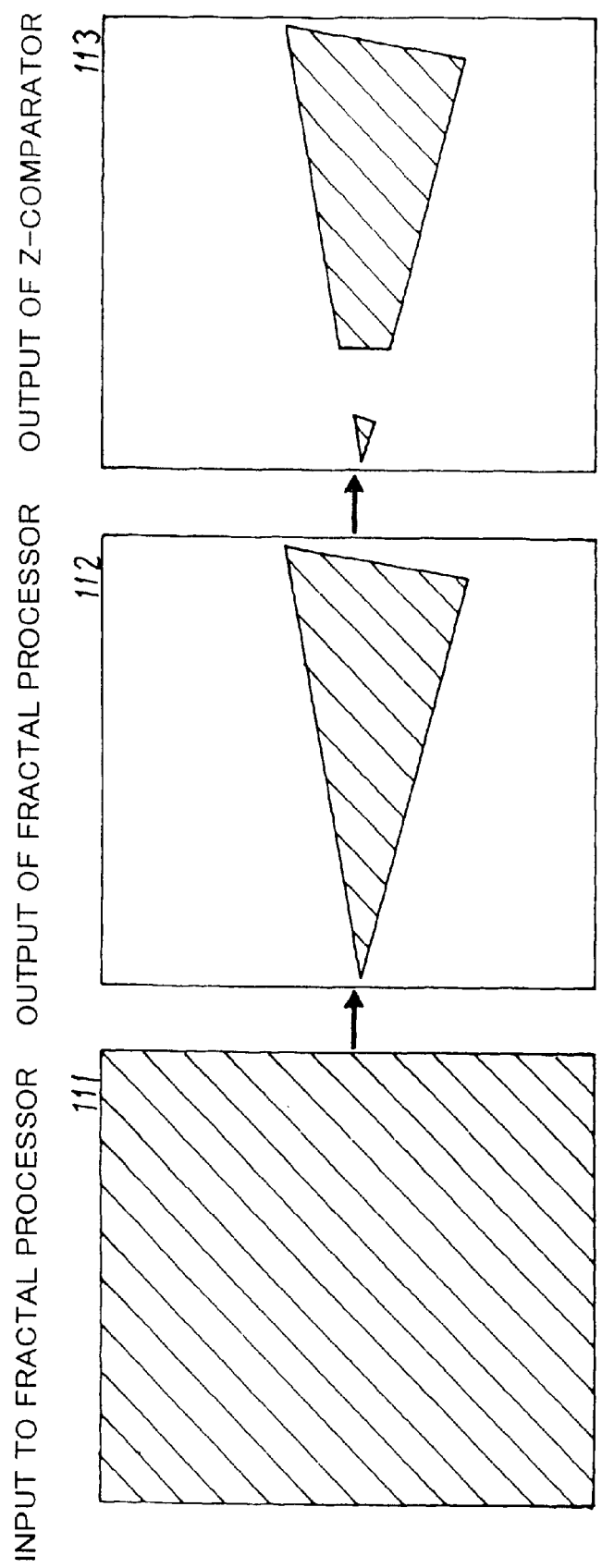
FIG. 15 is a diagram showing a change in the trans mask when the example in FIG. 11 is processed.

Then, processing of the polygon C is executed. For the polygon C, processes of steps S50 to S56 in FIG. 12 are performed as done for the polygon A. FIG. 15 shows an initial mask 111 in step S52, a mask 112 generated by the fractal processor 55 in step S54, and a mask 113 which has been generated by the Z-comparator 564 and stored in the trans mask register 533 in step S55, all for the polygon C. In the case of the polygon C, the background area of the processed polygon B is deleted in the hidden-surface deleting process involving comparison of Z values, generating the mask 113. In step S56, the exclusion section 531 performs an exclusion operation on the trans mask 113 of the polygon C and the mask 105 in the trans mask register for the polygon A, deletes an overlapping area from the trans mask 105 of the polygon A, generating a new trans mask 106 shown in FIG. 16, and stores the mask 106 in the trans mask register 533 for the polygon A. Likewise, the exclusion section 531 performs an exclusion operation on the trans mask 113 of the polygon C and the mask 109 in the trans mask register for the polygon B, deletes an overlapping area from the trans mask 109 of the polygon B, generating a new trans mask 110 shown in FIG. 16, and stores the mask 110 in the trans mask register 533 for the polygon B.

As processing of all the opaque polygons is completed, data of the trans mask 106 (polygon A), the trans mask 110 (polygon B) and the trans mask 113 (polygon C) in the respective trans mask registers 533 are finally sent together with their polygon data to the rendering section 62 (S57 and FIG. 37).

The rendering section 62 computes image data from the polygon data for an area to be rendered in accordance with the trans mask 106 of the polygon A, and writes the image data in the frame buffer 66. Likewise, the rendering section 62 computes image data of areas to be rendered, in accordance with the trans masks 110 and 113 of the polygons B and C, and writes the image data in the frame buffer 66. As the trans masks 106, 110 and 113 have already undergone the exclusion operation, there are no overlapping areas present. Thus, an arithmetic operation for acquiring image data in the rendering section 62 is carried out without waste.

When a fragment area consists of 64 pixels, the respective trans mask registers are comprised of 64-bit data. The exclusion section 531 therefore has 64 sets of arithmetic circuits for exclusive logic (A·!IN, B·!IN, C ·!IN). That is, the trans mask 105 is acquired by the logic operation A·!B, and the trans mask 106 by the logic operation A·!C. Further, the trans mask 110 is acquired by the logic operation B·!C. "A", "B" and "C" in the logic operations indicate the trans mask data of the respective polygons A, B and C, and "!B" and "!C" indicate inverted data of the trans mask data of the polygons B and C.

In the image processing of opaque polygons, as described above, mask data indicating an effective area of each polygon is generated by using the trans mask register, mask data indicative of an effective area located in the foreground is generated as a trans mask in the hidden-surface deleting process involving comparison of Z values, and that trans mask and the trans masks of other polygons are subjected to an exclusion operation. Particularly, the hidden-surface deleting process between the generated trans mask of polygon to be processed and the trans mask of a already processed polygon, which is necessary according to the processing order of polygons, can be implemented easily by using a logic circuit 531 for an exclusion operation. Further, determination of a polygon existing area and computation of Z values can be carried out quickly by using the fractal process.

Process On Translucent Polygon (Second Invention)

Figure 17B:
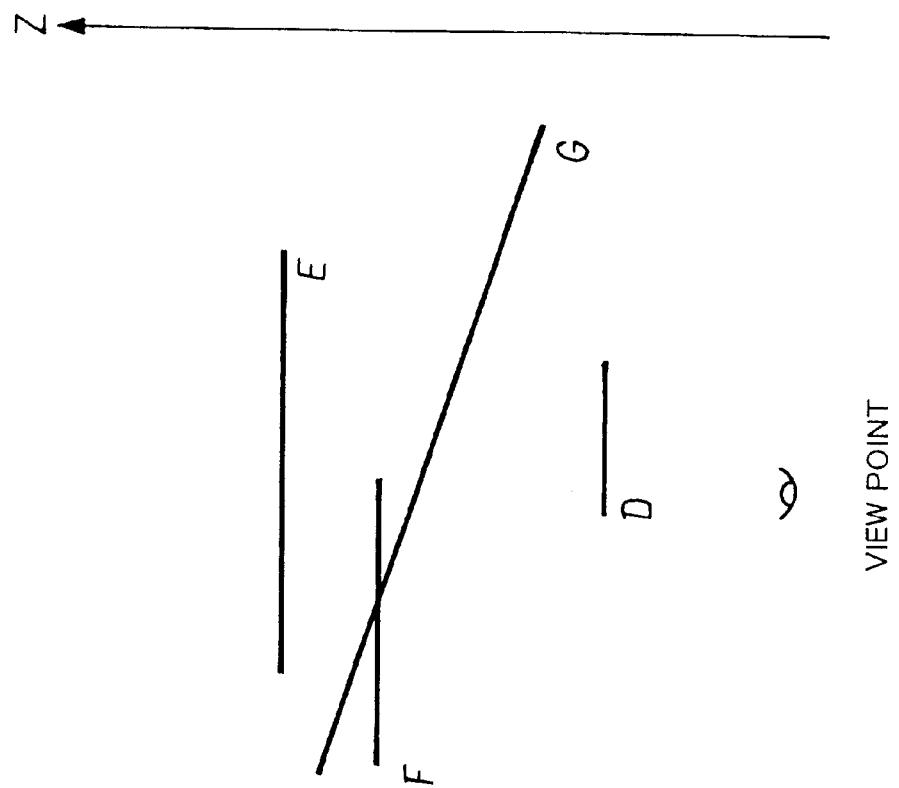
FIG. 17 is a diagram depicting an example for explaining a process of translucent polygons.
Figure 17A:
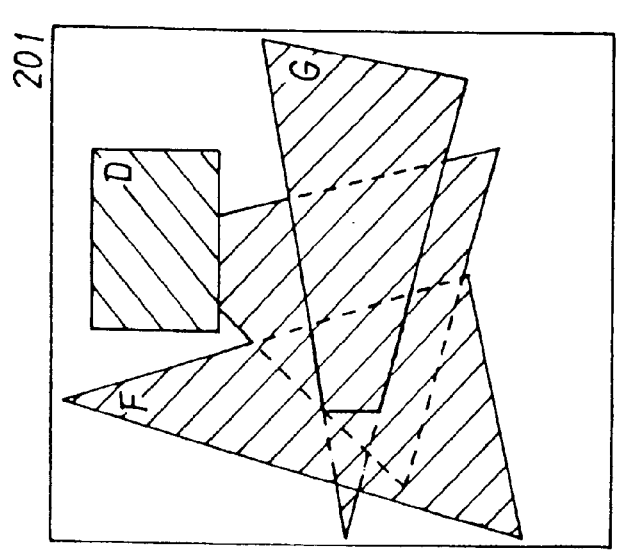

FIG. 17 is a diagram showing an example for explaining a process on translucent polygons. FIG. 17A exemplifies a display screen 201 in which a translucent polygon E, a translucent polygon F, a translucent polygon G and an opaque polygon D partially overlap one another as illustrated. FIG. 17B shows the relationship among the depths of the polygons along the central horizontal line of the display screen 201. Specifically, the polygon E is located deepest (maximum Z value), and the polygons F and G are located in the foreground of the polygon E but crosses each other. The opaque polygon D is positioned foremost (minimum Z value).

In the image processing of translucent polygons, first, a portion which is hidden by a translucent polygon is removed from subjects to be rendered. Secondary, color data of overlapping areas of translucent polygons should be subjected to a rendering process in accordance with the transparency value α of the translucent polygon in the foreground. What is more, computation on the color data of overlapping areas should be performed always in such a way that the color data X of a background polygon is blended into the color data Y of a foreground polygon in accordance with the transparency value α. That is, the color data YY of overlapping areas is computed from $YY=\alpha \cdot X+(1-\alpha) \cdot Y$. For the overlapping areas, therefore, image data including the color data of a background polygon should be generated first, followed by the generation of image data including the color data of a foreground polygon, and both image data should then be blended.

According to this embodiment, in executing the image processing of the opaque polygon D and translucent polygons E, F and G shown on the display screen 201 in FIG. 17, processing of the opaque polygon is performed first, followed by processing of the translucent polygons. With regard to the translucent polygons, the area of the first polygon located deepest in the display screen in the Z direction is subjected to the rendering process, followed by the rendering process of the area of the second polygon and the rendering process of the area of the third polygon in succession. Such rendering process is repeated until the areas of the entire polygons are processed.

A process of deleting an area of a translucent polygon which is hidden behind the opaque polygon can be implemented by the above-described hidden-surface deleting process that compares the Z value of the translucent polygon with the Z value stored in the Z-value register 561 for the opaque polygon. On the other hand, a background area of overlapping translucent polygons can be detected by an inverse hidden-surface deleting process which compares the Z value with the trans (transparent) Z value of the trans Z-value register 562 where the Z value of a translucent polygon is stored, and sets the area effective when the Z value is larger. Further, an effective area located deepest can be detected, regardless of the processing order, by executing an exclusion operation on a trans mask temporarily generated and the already generated trans mask of another translucent polygon, as done in the image processing of opaque polygons.

To carry out the above-described processes, the mask controller 53 uses the trans mask register 533, the area mask register 534 and the exclusion section 531. When a fragment area consists of 64 pixels, the trans mask register 533 and the area mask register 534 are each constituted of 65 (64+1) sets of 64-bit registers as in a case of opaque polygons. The comparison section 56 uses the Z-value register 561 for storing the Z value of the opaque polygon, the trans Z-value register 562 for storing the trans Z value of each translucent polygon, the Z-comparator 564 and the trans Z-comparator 565. An area mask is a mask (first mask) indicating an area of a translucent polygon which is to be drawn. In the first process, therefore, bit data "1" is recorded for all the areas excluding the one that is hidden behind the opaque polygon. A trans mask is a mask (second mask) which indicates an area to be rendered of a translucent polygon and is supplied to the rendering section 62. Every time rendering with a trans mask is performed, the area of the rendered trans mask is deleted from the area mask. Finally, when the entire area masks become invalid, drawing of the translucent polygons is completed. The computation to delete the area of a trans mask from an area mask is executed by the exclusion section 531. Two mask registers 533 and 534 are used simultaneously as such usage is required by the process.

Figure 18:
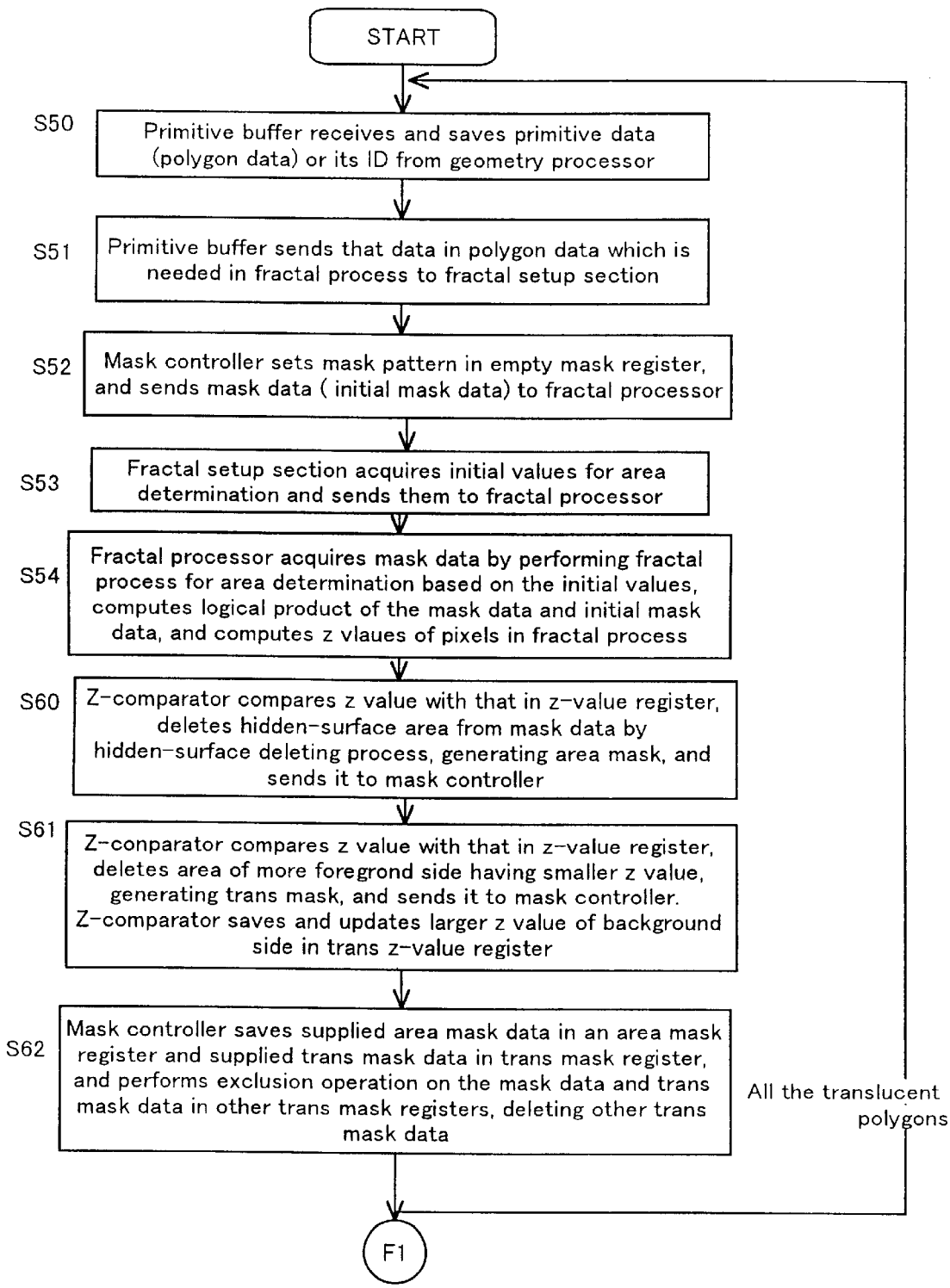
FIG. 18 is a flowchart (1) of the process of translucent polygons according to another embodiment.
Figure 19:
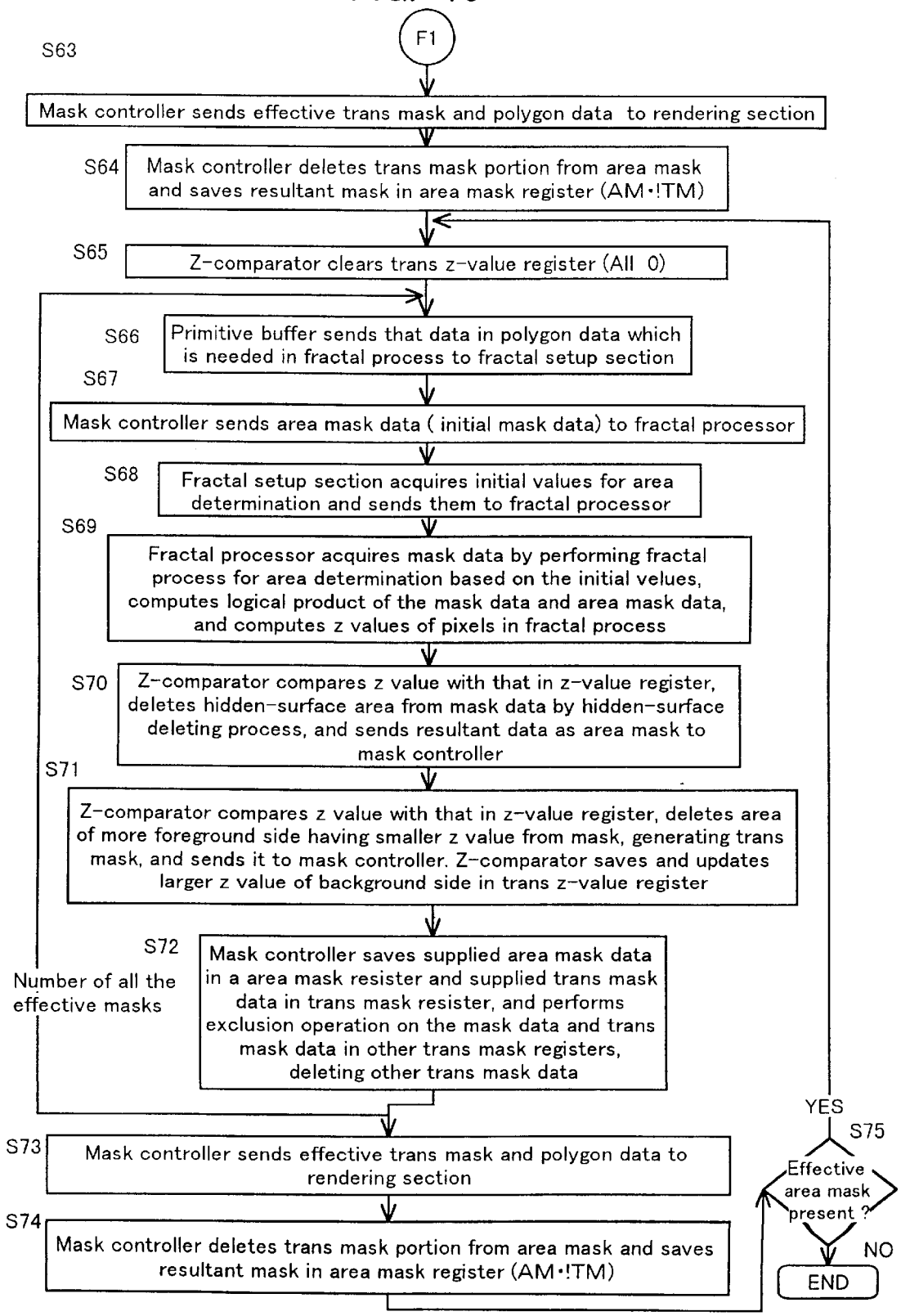
FIG. 19 is a flowchart (2) of the process of translucent polygons according to this embodiment.
Figure 20:
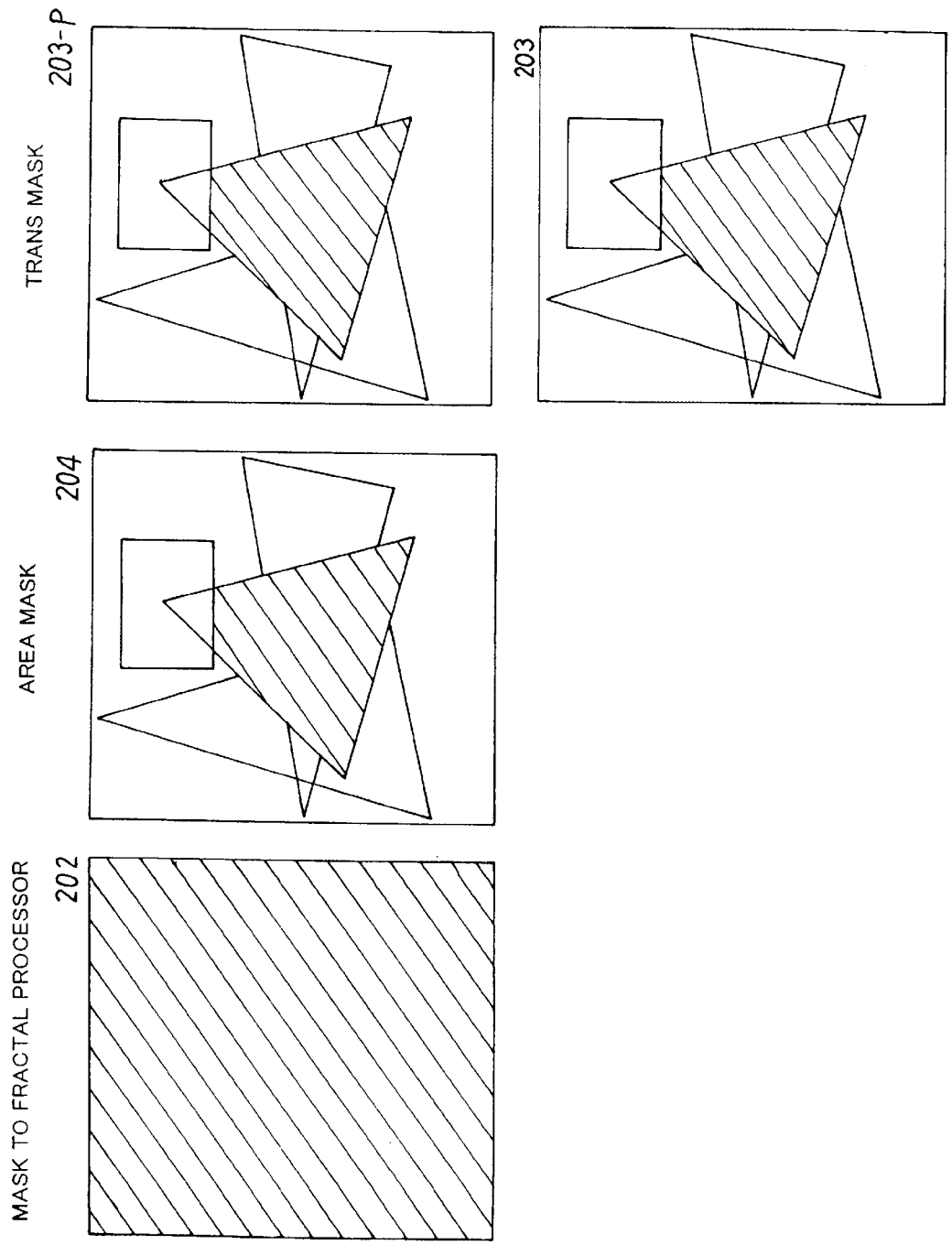
FIG. 20 is a diagram showing how an area mask and a trans mask change when the example in FIG. 17 is processed.
Figure 21:
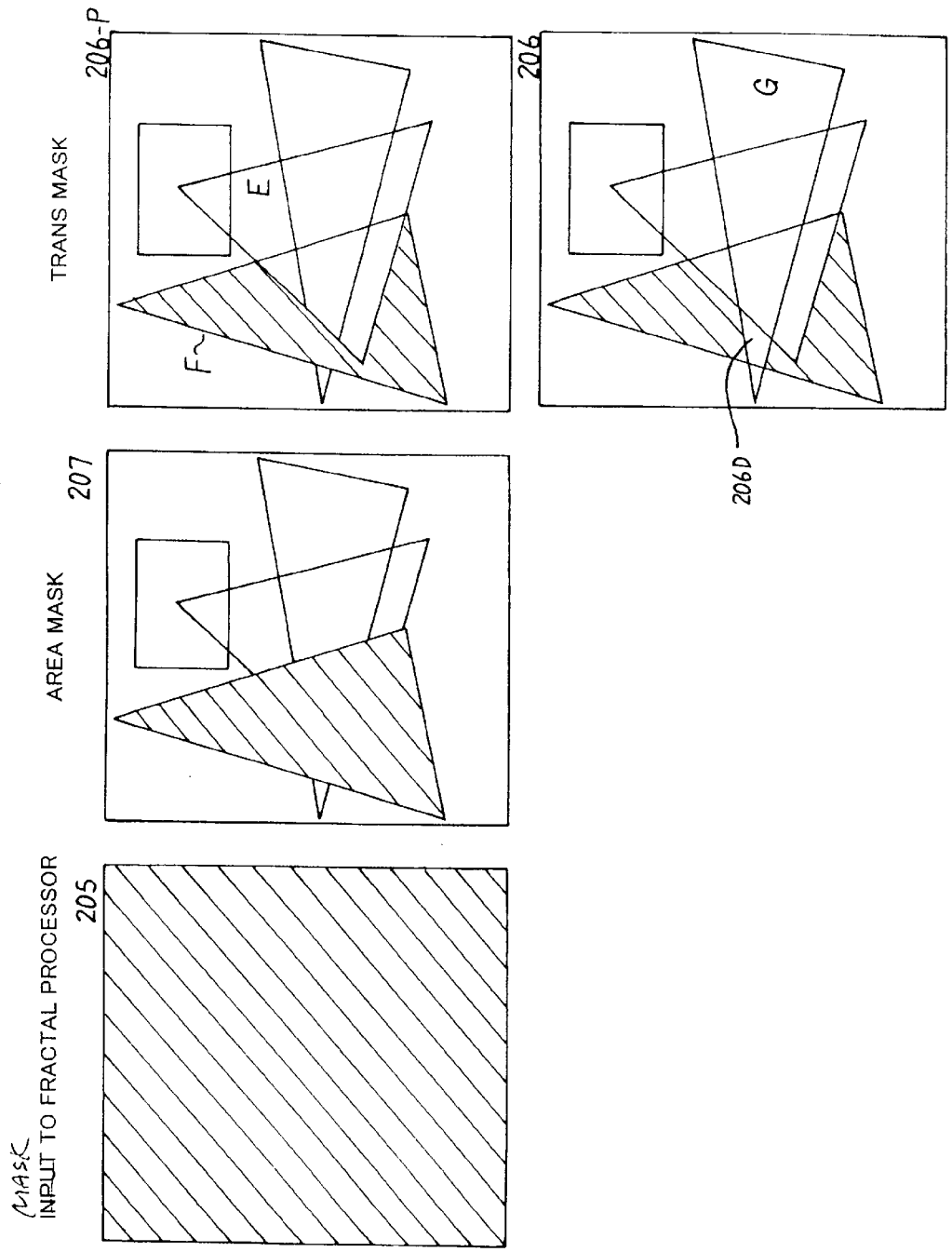
FIG. 21 is a diagram showing how the area mask and the trans mask change when the example in FIG. 17 is processed.
Figure 23:
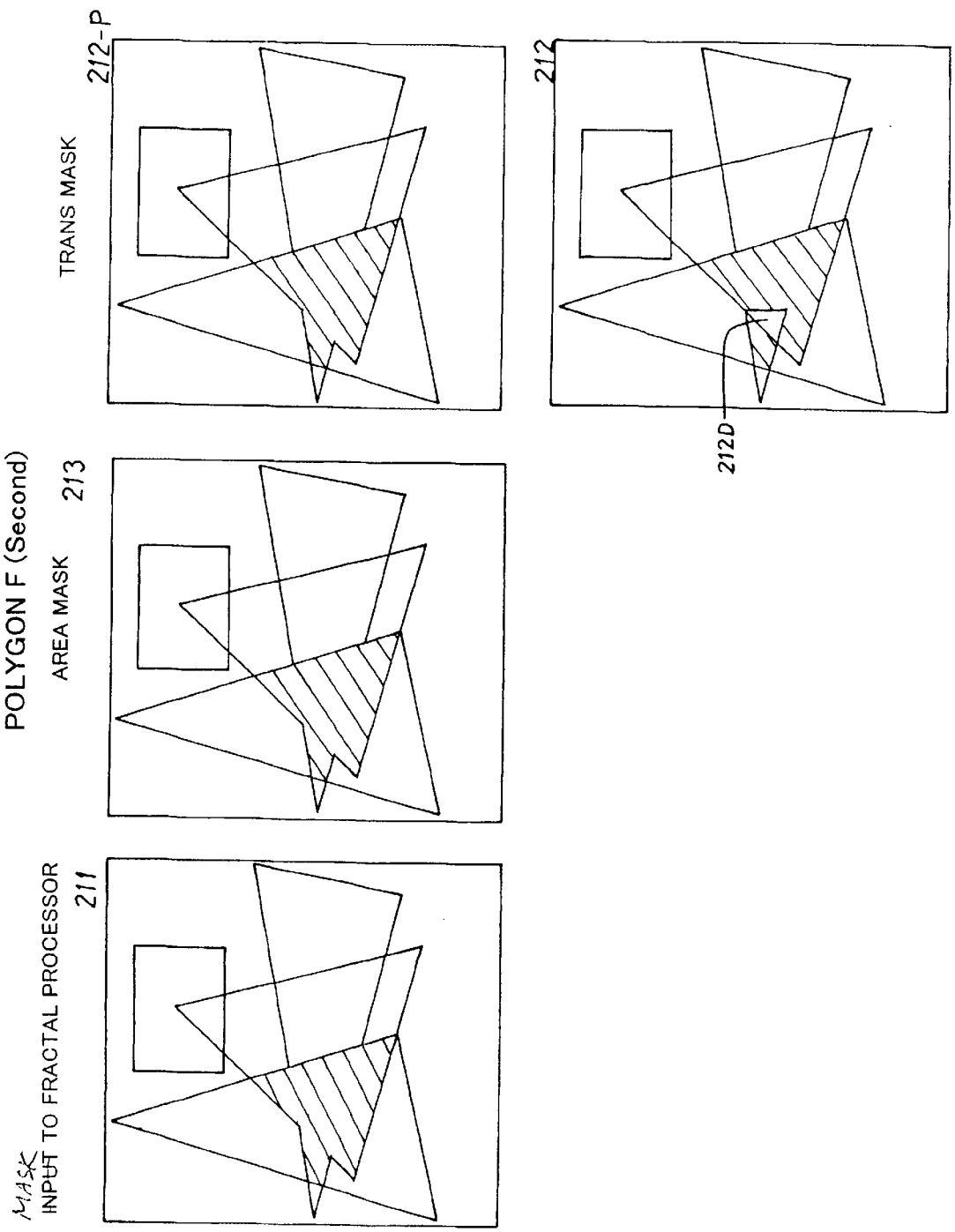
FIG. 23 is a diagram showing how the area mask and the trans mask change when the example in FIG. 17 is processed.
Figure 24:
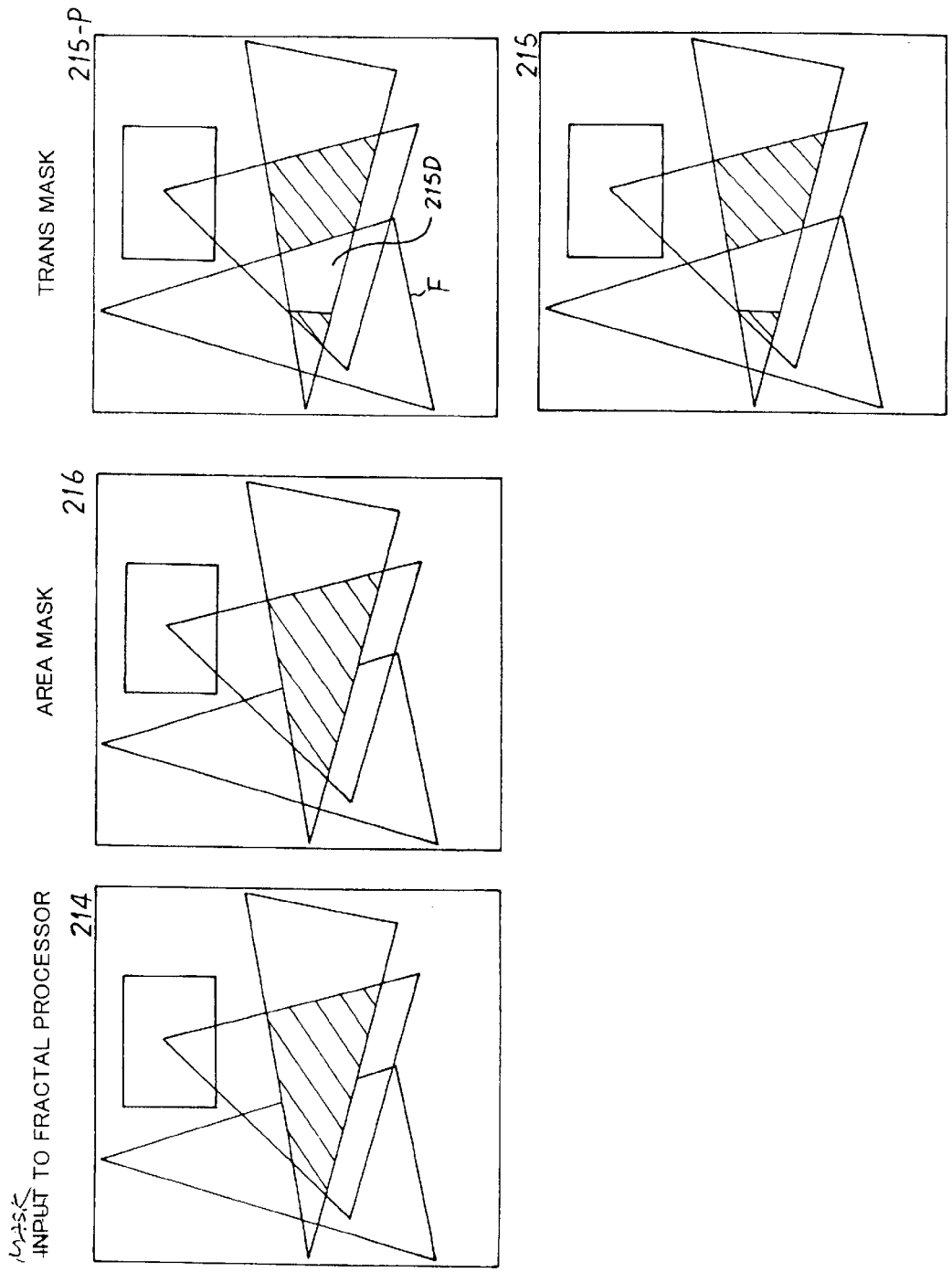
FIG. 24 is a diagram showing how the area mask and the trans mask change when the example in FIG. 17 is processed.

FIG. 18 illustrates a flowchart (1) of the image processing of translucent polygons. FIG. 19 illustrates a flowchart (2) of this image processing. FIGS. 20 to 22 are diagrams showing how the area mask and the trans mask change when generating the trans mask which has the area at the deepest position in the display screen as an effective area. FIGS. 23 and 24 are diagrams showing how the area mask and the trans mask change when generating the trans mask which has the area of the second deepest one in the display screen as an effective area. FIGS. 25 and 26 are diagrams showing how the area mask and the trans mask change when generating the trans mask which has the area of the third deepest one in the display screen as an effective area is carried out. FIG. 27 is a diagram illustrating all the changes in FIGS. 20–26. Properly referring to FIG. 27 will help understand the image processing. FIGS. 38 to 42 are diagrams illustrating data flows in the mask generator 50 in FIG. 2, which correspond to the flowcharts of the processing translucent polygons in FIGS. 18 and 19.

The image processing on translucent polygons will now be discussed referring to those figures. The premise for this image processing is that the image processing on the opaque polygon has already been completed. The processing order of translucent polygons does not matter particularly. Suppose the polygons E, F and G in the example in FIG. 17 are processed in the named order. First, for the polygon E, the primitive buffer 52 receives primitive data, which is translucent polygon data, or its ID from the geometry processor 48 and stores the data (S50). Then, the primitive buffer 52 supplies the fractal setup section 54 with that of the polygon data which is needed in the fractal process. The data which is needed in the fractal process are, for example, the display coordinates and the Z value included in the vertex parameters (S51). The mask controller 53 sets a mask pattern in the mask register 534 which is not used, and supplies the mask pattern as initial mask data to the fractal processor 55 (S52).

This initial mask data indicates a mask 202 in FIG. 20. In the first process, all the bits of the initial mask data are set to "1" which is valid.

Next, the fractal setup section 54 obtains initial values for area determination and send the values to the fractal processor 55 (S53). The initial values include $d_1, d_2, d_3, (\partial z/\partial x)$, $(\partial z/\partial y)$ and cz, as shown in step S3 in FIG. 9. The fractal processor 55 executes a fractal process for area determination based on the initial values, acquiring mask data, and then performs a logical product of this mask data and initial mask data. The fractal processor 55 further obtains the Z values of pixels by a fractal process (S54). The mask data and the Z values are supplied to the Z-comparator 564 of the comparison section 56.

The Z-comparator 564 compares the Z values of the pixels obtained in the fractal process with the Z value in the Z-value register 561 for the opaque polygon, erases a area hidden behind the opaque polygon D from the mask data by the hidden-surface deleting process, and sends the resultant data as an area mask to the mask controller 53. Specifically, the area is set valid when the Z value of a pixel is smaller than the Z value in the Z-value register 561 for the opaque polygon, and it is set invalid when the former Z value is greater than the latter. This is a condition 1 (S60). In this case, the area mask becomes a mask 204 in FIG. 20. This area mask 204 shows an area of the translucent polygon E to be rendered, which is obtained by deleting the foreground area of the opaque polygon D from the area of the polygon E. This mask 204 is supplied to the mask controller 53.

Figure 38:
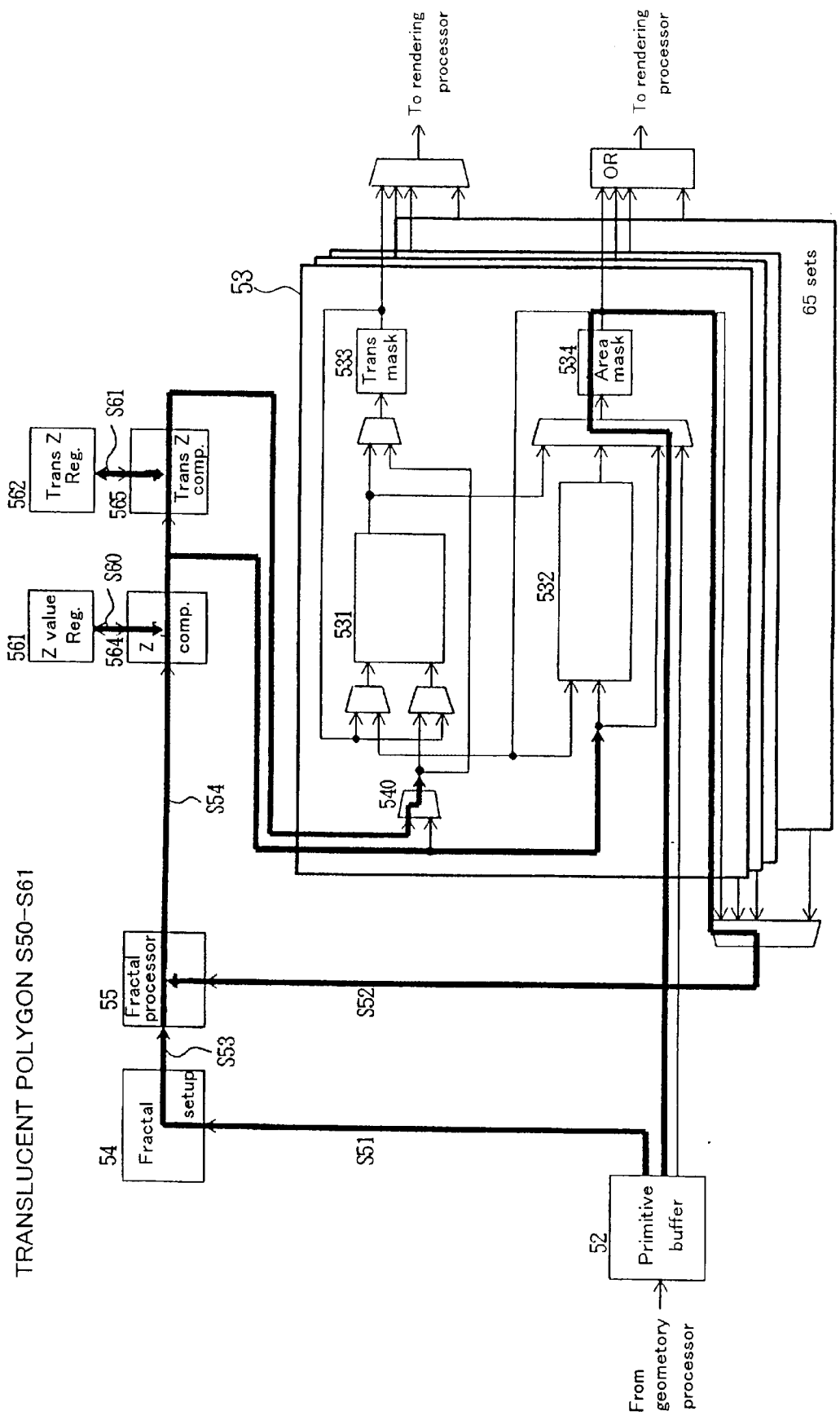
FIG. 38 is a diagram depicting a data flow in the mask generator 50 in a case of processing translucent polygons.

Next, the trans Z-comparator 565 compares the Z values of the pixels obtained in the fractal process, with the trans Z value in the trans Z-value register 562 for the translucent polygons, deletes the background areas of the other translucent polygons from the area mask according inverse hidden-surface deleting process, and sends the resultant data as a trans mask 203-P to the mask controller 53. Specifically, the area is set valid when the Z value of a pixel is greater than the Z value in the trans Z-value register 562, and it is set invalid when the former Z value is smaller than the latter. This is a condition 2. Further, the trans Z value corresponding to the effective area is saved and updated in the trans Z-value register 562 (S61). In this case, as the target polygon is the first translucent polygon E, the entire area of the area mask 204 becomes the area of the trans mask 203-P. The data flow in the above-described steps S50–S61 is illustrated in FIG. 38.

Figure 39:
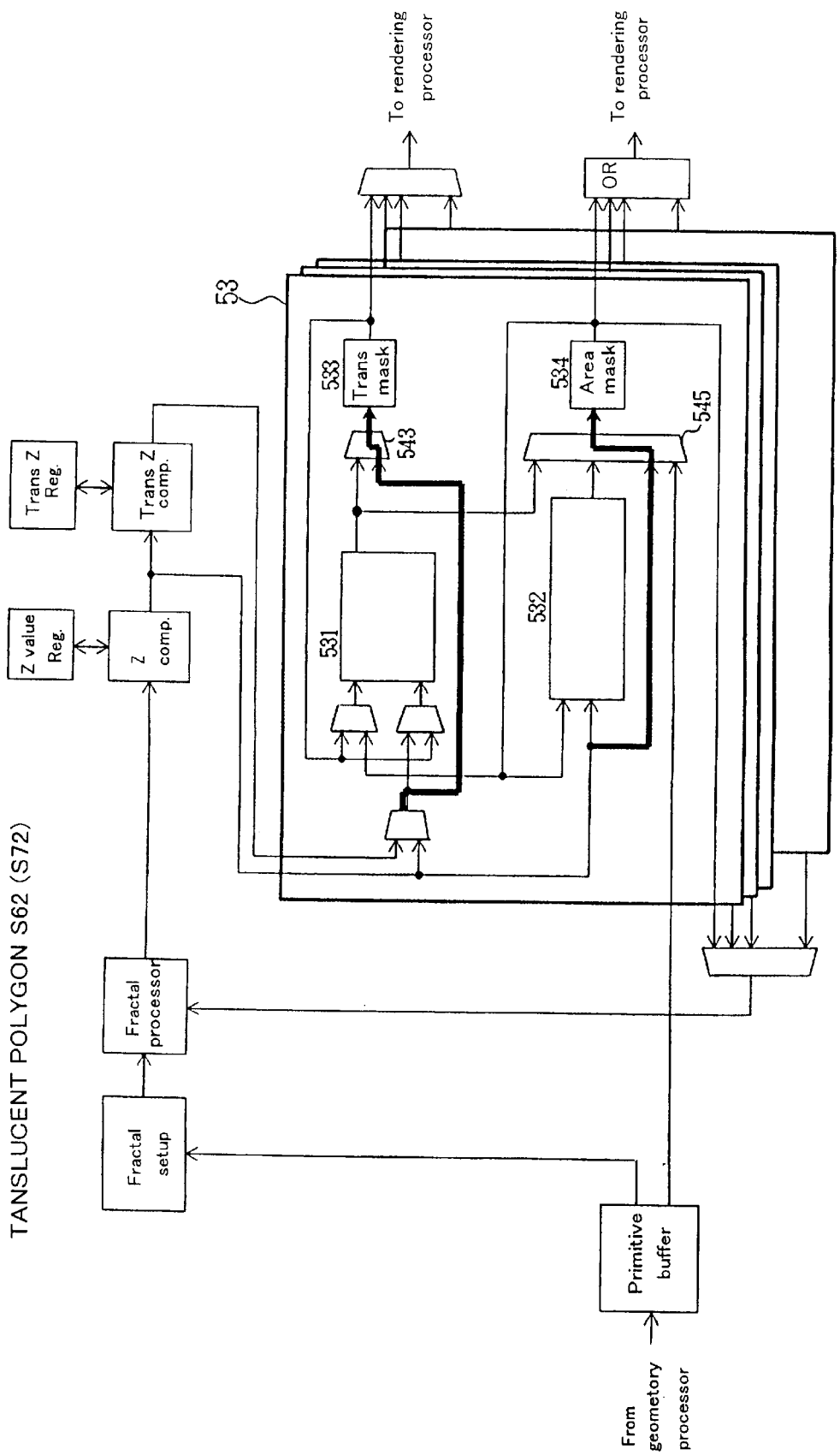
FIG. 39 is a diagram depicting a data flow in the mask generator 50 in a case of processing translucent polygons.

The mask controller 53 stores the supplied area mask data 204 in the area mask register 534, and the supplied trans mask data 203-P in the trans mask register 533 (S62 and FIG. 39). The mask controller 53 performs an exclusion operation on the trans mask 203-P with trans mask data in other trans mask registers, deleting the other trans masks. This exclusion operation is carried out by the exclusion section 531 (S62 and FIG. 40). Note that as the translucent polygon E is the first polygon, there are no other trans masks generated, so that the exclusion operation is not executed at this point of time.

Next, the image processing of the translucent polygon F is performed as illustrated in FIG. 21. Steps S50–S54 and S60–S62 in FIG. 18 are carried out for the translucent polygon F too. As a result, an area mask 207 which has undergone the hidden-surface deleting process with the opaque polygon and meets the condition 1 is generated (S60). Further, the inverse hidden-surface deleting process with the processed translucent polygon yields a trans mask 206-P which satisfies the condition 2 (S61). As can be seen from the trans mask 206-P, the area of the translucent polygon E which is located deeper than F has been erased. The mask controller 53 performs an exclusion operation on the trans mask 206-P of the polygon F and the trans mask 203-P of another polygon E which has already been generated (S62 and FIG. 40). Consequently, there is no overlapping area between both trans masks 203-P and 206-P, so that the trans mask 203-P of the polygon E will not be changed.

Finally, the image processing of the translucent polygon G is performed as illustrated in FIG. 22. Steps S50–S54 and S 60–S62 in FIG. 18 are likewise carried out for the translucent polygon G. As a result, an area mask 210 which has undergone the hidden-surface deleting process with the opaque polygon and meets the condition 1 is generated (S60). Further, the inverse hidden-surface deleting process with the processed translucent polygon yields a trans mask 209-P which satisfies the condition 2 (S61). As can be seen from the trans mask 209-P, the area of the translucent polygon E which is located deeper has been erased.

Figure 40:
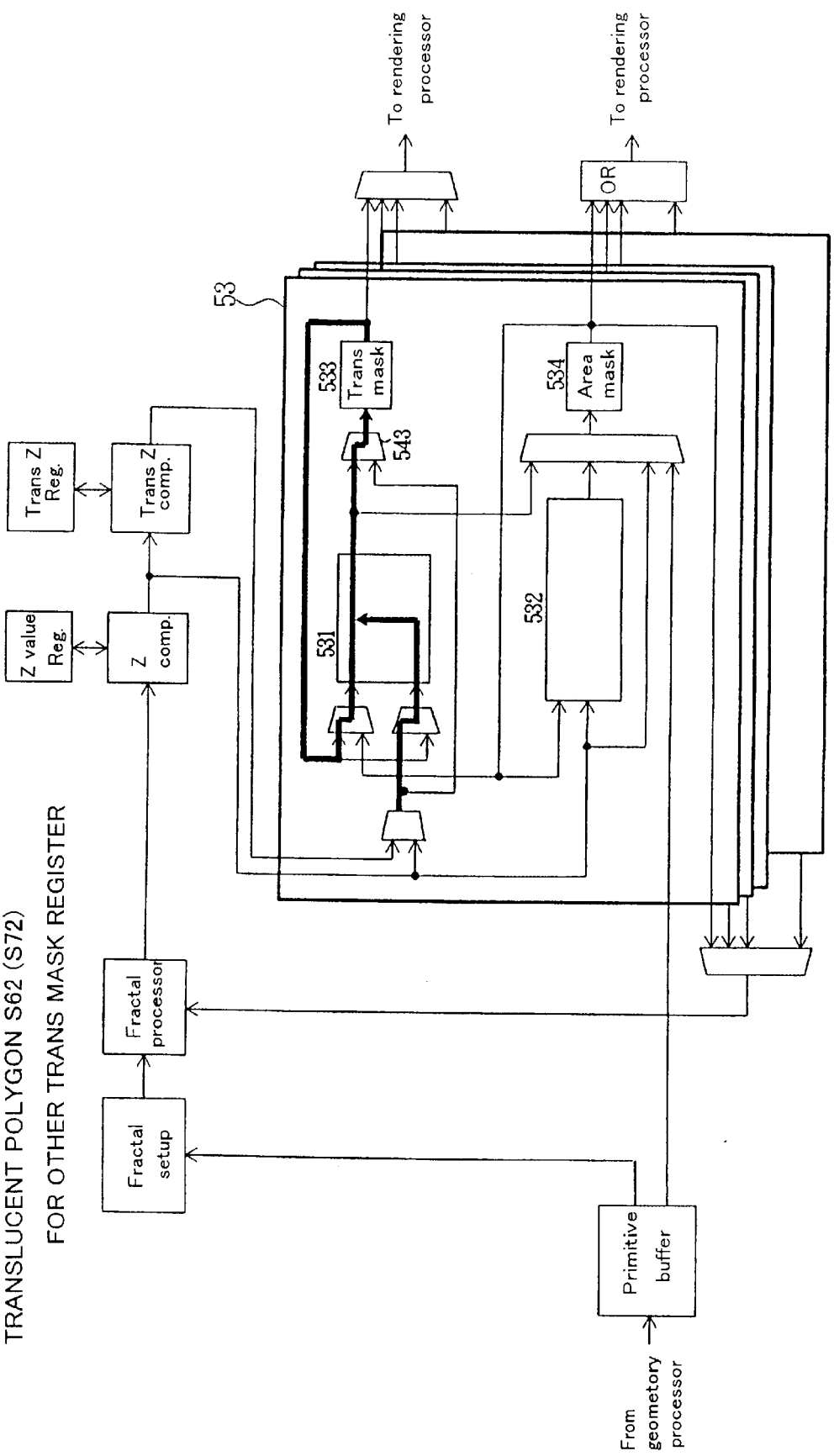
FIG. 40 is a diagram depicting a data flow in the mask generator 50 in a case of processing translucent polygons.

The mask controller 53 performs an exclusion operation on the trans mask 209-P of the polygon G and the trans mask 203-P of another polygon E which has already been generated (S62 and FIG. 40). Consequently, there is no overlapping area between both trans masks 203-P and 209-P, so that the final trans mask 203 (FIG. 20) of the polygon E will not be changed. Likewise, the mask controller 53 performs an exclusion operation on the trans mask 209-P of the polygon G and the trans mask 206-P of another polygon F which has already been generated (S62 and FIG. 40). As a result, the overlapping area between both trans masks 206-P and 209-P is deleted from the trans mask 206-P of the previously processed polygon F (area 206D in FIG. 21). The final trans mask 206 of the polygon F is generated as shown in FIG. 21. As the trans mask 209-P of the polygon G is the last translucent polygon, it becomes the last trans mask 209.

The areas of the polygons E, F and G which satisfy the condition 1 (the Z value smaller than that of the opaque polygon) and the condition 2 (the Z value greater than those of the other translucent polygons) are shown as the trans masks 203, 206 and 209. As apparent from FIG. 17, those areas 203, 206 and 209 indicate the most deepest area of the polygons in the display screen.

Figure 41:
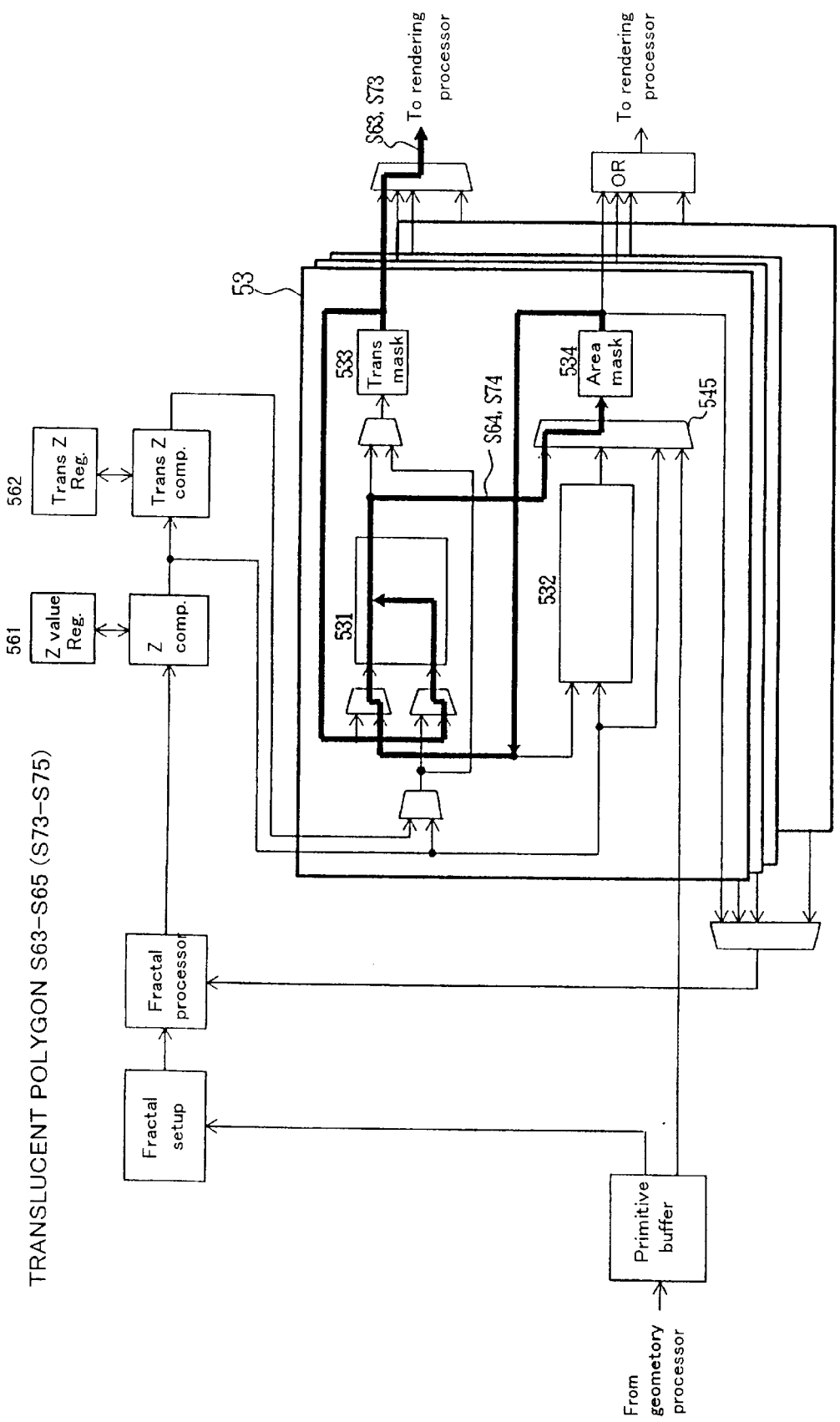
FIG. 41 is a diagram depicting a data flow in the mask generator 50 in a case of processing translucent polygons.

As illustrated in the flowchart in FIG. 19, the mask controller 53 sends the data of the effective trans masks 203, 206 and 209 saved in the respective trans mask registers 533, together with their polygon data, to the rendering section 62 (S63 and FIG. 41). The rendering section 62 computes image data including color data of the effective area of each trans mask and stores the image data in the frame buffer 66.

The color data of the image data will be blended later with the color data of the translucent polygon located on a more foreground side. The above completes the image processing of the most deepest area of the polygons.

Then, the image processing of the second deepest area and the subsequent deepest area is carried out in steps S64 to S75 in the flowchart in FIG. 19.

In detecting the area of the second deepest translucent polygon, the areas of the trans masks 203, 206 and 209 which have already been drawn as the area of the most deepest polygon are deleted from the area masks 204, 207 and 210 that indicate an area to be drawn. That is, the mask controller 53 causes the exclusion section 531 to perform an exclusive logic operation on the area mask data of each polygon in the area mask register 534 and the trans mask data of the associated polygon in the trans mask register 533 (AM·!TM where AM is area mask data and !TM is inverted data of the trans mask data), and stores the result in the area mask register 534 (S64 and FIG. 41).

The Z-comparator 564 clears the trans Z-value register 562. In other words, bit data of the register 562 is set all "0" (S65). Through this process, it is become ready to determine the second deepest area of the translucent polygons.

FIG. 23 shows the area mask and the trans mask of the translucent polygon F in the processing of the second deepest area of polygons, and FIG. 24 depicts the area mask and the trans mask of the translucent polygon G in the processing of the second deepest area of the polygons. Through the exclusion operation in the aforementioned step S64, the area mask 204 of the translucent polygon E located deepest in the display screen coincides with the trans mask 203 therefore is entirely deleted, thus eliminating the need for the image processing for the second and subsequent deepest area of polygons. The area of an area mask 211 of the polygon F and the area of an area mask 214 of the polygon G are undrawn areas.

Figure 42:
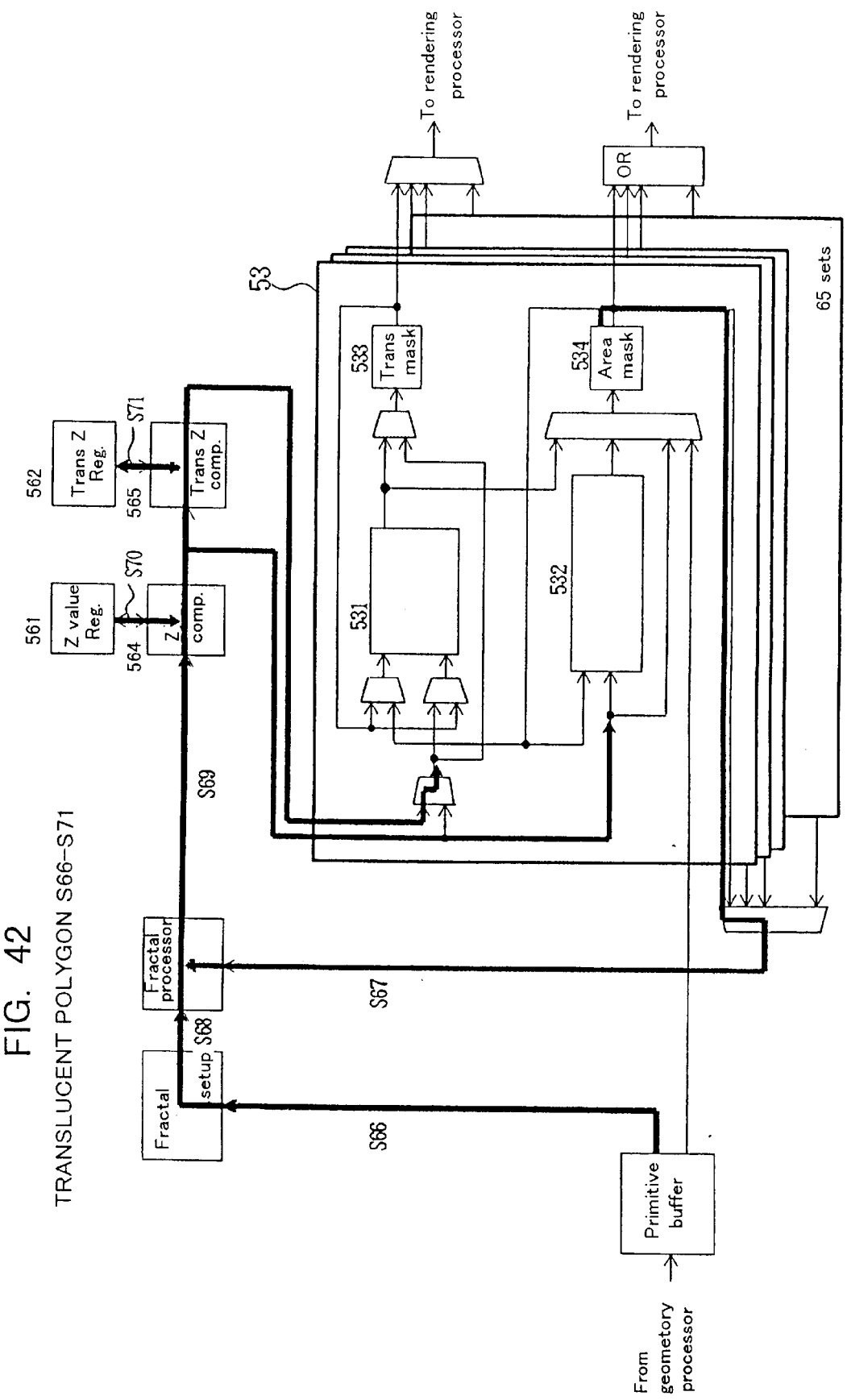
FIG. 42 is a diagram depicting a data flow in the mask generator 50 in a case of processing translucent polygons.

Referring to the flowchart in FIG. 19 and FIG. 42, the primitive buffer 52 supplies data in the polygon data, which is needed in the fractal process, to the fractal setup section 54 (S66). This process is the same as that in step S51. The mask controller 53 supplies the data of the area mask (initial mask data) in the area mask register 534 to the fractal processor 55 (S67). That is, the area mask is the area mask 211 in a case of the polygon F, or it is the area mask 214 in a case of the polygon G. The fractal setup section 54 acquires the initial values for area determination and supplies the initial values to the fractal processor 55 (S68). This process is the same as that in step S53.

Then, the fractal processor 55 carries out the fractal process for area determination based on the initial values, thereby acquiring mask data, computes a logic product of the mask data and the area mask data 211 or 214, and then computes the Z value of each pixel (S69). The Z-comparator 564 compares the Z value with the Z value in the Z-value register 561 for the opaque polygon, deletes a hidden area from the mask data in the hidden-surface deleting process, and sends the area mask 213 or 216 to the mask controller 53 (S70). The processing here is for determining an area which meets the condition 1.

Next, the Z-comparator 564 compares the Z value with the trans Z value in the trans Z-value register 562, and deletes a foreground area having a smaller Z value from the area mask 213 or 216, generating a trans mask 212 or 215 which is in turn sent to the mask controller 53. Further, a large Z value in the background side is saved and updated in the trans Z-value register 562 (S71). That is, an area which satisfies the condition 2 is detected. If processing has started with the polygon F, its trans mask 212-P is the same as the area mask 213. With regard to a trans mask 215-P of the polygon G which will be processed later, the area of the polygon F located deeper (area 215D in FIG. 24) is deleted from the trans mask 215-P in the inverse hidden-surface deleting process.

The mask controller 53 stores the supplied area mask data 213 or 216 in the area mask register 534, and the supplied trans mask data 212-P or 215-P in the trans mask register 533 (S72 and FIG. 39). The mask controller 53 then executes an exclusion operation on the trans mask data with trans mask data in other trans mask registers, deleting the overlapping area from the other trans masks (S72 and FIG. 40). Consequently, the area of the trans mask 212-P of the previously processed polygon F, which overlaps the trans mask 215-P of the polygon G, i.e., an area 212D in FIG. 23, is deleted from the trans mask 212-P, yielding the trans mask 212.

When processing of the polygon F and polygon G which have effective area masks is completed, it means that the final trans masks 212 and 215 of the second polygon have been fixed. Accordingly, the mask controller 53 sends the effective trans masks 212 and 215 in the trans mask register 533, and the polygon data to the rendering section 62 (S73 and FIG. 41).

The rendering section 62 computes color data of the second deepest area of polygons from the trans masks 212, 215 and polygon data, and performs a blending process on the color data of the image data already stored in the frame buffer 66, in accordance with the transparency value α of the second deepest polygon, as explained earlier. The resultant blended color data is saved again in the frame buffer 66.

As in step S64, the mask controller 53 causes the exclusion section 531 to execute an exclusion operation to delete the areas of the already drawn trans masks 212 and 215 from the area masks 213 and 216 (S74 and FIG. 41). As a result, as shown in FIGS. 25 and 26, area masks 217 and 220 indicative undrawn areas for the plygons F and G are generated. Thereafter, processing on the area of the third deepest area of the polygons will be carried out. The processing on area of the third deepest polygon, like the processing on the area of the second deepest polygon, is performed in such a manner that the trans Z-value register 562 is cleared (S65) after which steps S66 to S72 are carried out. Consequently, area masks 219 and 222 and trans masks 218 and 219 are generated and saved in the associated registers, as shown in FIGS. 25 and 26.

Then, the mask controller 53 sends the effective trans masks 218 and 221 and their polygon data to the rendering section 62 (S73 and FIG. 41). The rendering section 62 performs a blending process on the areas of the trans masks 218 and 221, and saves image data including color data again in the frame buffer 66.

Finally, the mask controller deletes the trans masks 218 and 221 which indicate the drawn areas from the area masks 219 and 222 (S74 and FIG. 41), so that the effective area masks disappear. It means that processing of all the areas to be drawn has been completed (S75).

In the above-described processing on translucent polygons, an area mask which meets the condition 1 is generated to execute the hidden-surface deleting process on the opaque polygon. If there are translucent polygons alone and no opaque polygons, however, the process associated with the condition 1 can be omitted.

As discussed above, the processing on translucent polygons generates the areas of polygons to be drawn in order from the deepest one in the trans mask register 533 by simultaneously using the area mask register 534 and the trans mask register 533, and supplies the areas to the rendering section 62. Then, the areas of polygons to be drawn are saved in the area mask register 534 and the areas subjected to the rendering process are deleted one after another. The above process is repeated until there is no effective area present in the area mask register 534. The processing on translucent polygons can be implemented efficiently by using two kinds of mask registers and the exclusion section alone.

Shadowing Process

The shadowing process will now be explained. In the shadowing process, an area shielded from the light from the light source by a polygon is detected, and the process involving the light source will not be performed on that detected area. Therefore, that area has the luminance left low and is displayed as a shadow area.

There has been proposed a shadow polygon scheme which can draw the shadow of an object by using some hardware that performs a process similar to the above-described hidden-surface deleting process which uses Z values in image processing. This scheme is disclosed in, for example, Japanese Patent KOKAI Publication No. Heisei 2-73479. The shadow polygon scheme uses a virtual object for the shadowing purpose, which is called a shadow volume. A "shadow volume" is shadow space produced by the light source and an object, and the interior of the shadow volume is an area which becomes the shadow of that object while outside the shadow volume is an area where the light from the light source is irradiated.

A shadow volume is a semi-infinite polyhedron consisting of a plurality of sides each of which is a semi-infinite polygon called a shadow polygon. In the actual computer-aided image processing, a shadow volume is processed as a finite polyhedron and a shadow polygon as a finite polygon. A shadow volume therefore consists of a plurality of shadow polygons which can be handled like ordinary polygons in implementing the shadowing process.

According to this embodiment, the aforementioned area mask register 534, exclusive OR section 532 and OR operation section 538 are used in the shadowing process. Before going into a description of this embodiment, the algorithm taught in Japanese Patent KOKAI Publication No. Heisei 2-73479 will be described briefly.

Figure 28:
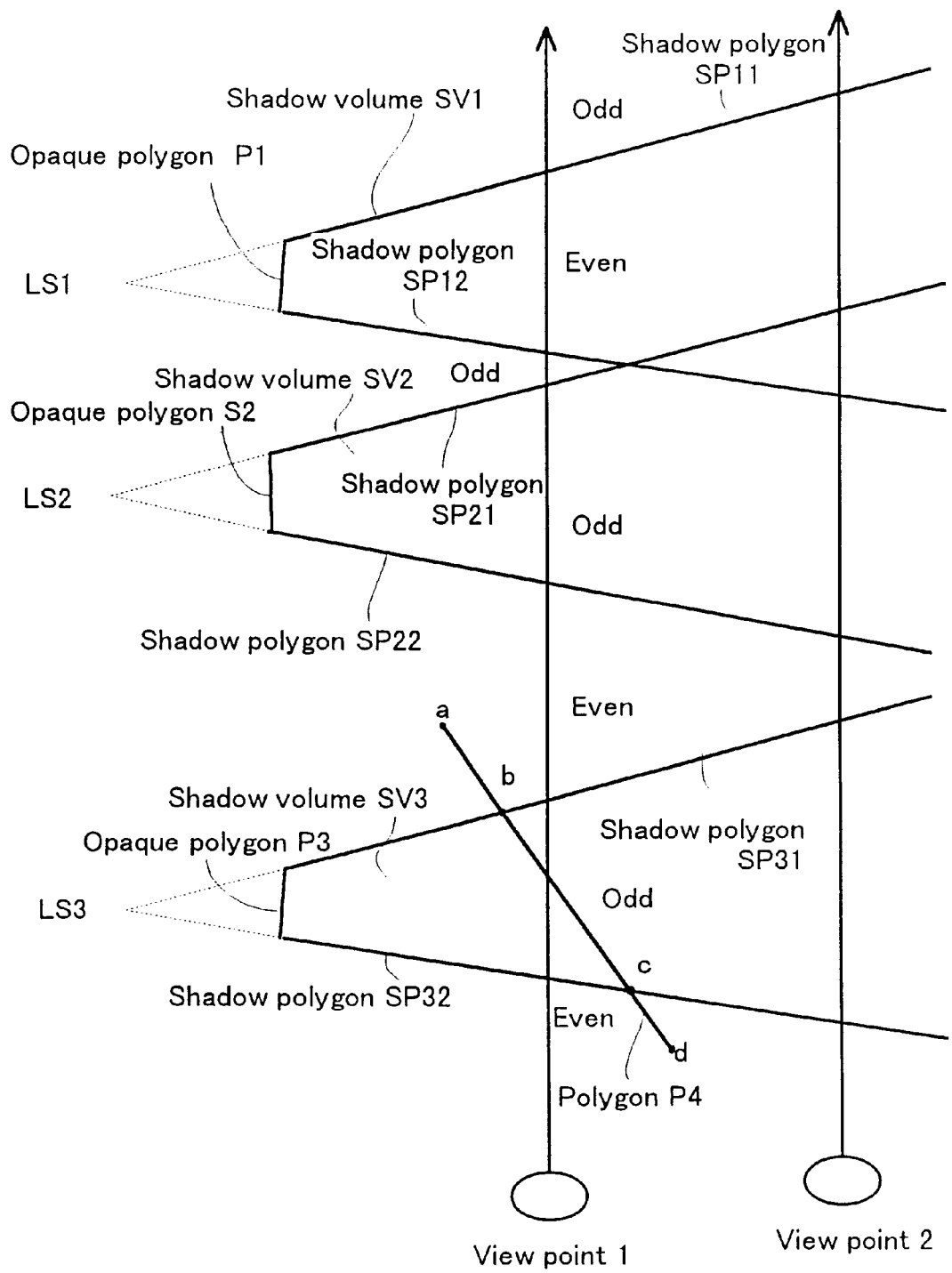
FIG. 28 is a diagram depicting a shading process using shadow volumes and shadow polygons which constitute the shadow volumes.

FIG. 28 is a diagram depicting a shading process using shadow volumes and shadow polygons which constitute the shadow volumes. In this example, shadow volumes SV1, SV2 and SV3, formed by light sources LS1, LS2 and LS3, are generated by opaque polygons P1, P2 and P3. In the diagram, as the light sources are located at infinite points on the left-hand side, the shadow volumes SV1, SV2 and SV3 are generated to the right of the opaque polygons P1, P2 and P3, respectively. In FIG. 28 showing the cross sections of the shadow volumes, therefore, the shadow volume SV1 is formed by shadow polygons SP11 and SP12, the shadow volume SV2 by shadow polygons SP21 and SP22, and the shadow volume SV3 by shadow polygons SP31 and SP32.

Assume that the view point is positioned at a view point 1 outside the shadow volumes. To detect whether a target area is a shadow area located inside a shadow volume or an area which is located outside a shadow volume and on which light is irradiated, one should count the number of shadow polygons that are to be passed along the Z axis (in the direction of arrows) from the view point 1 and should detect if the count value is an even number or an odd number.

When the view point 1 lies outside the shadow volumes, as shown in FIG. 28, it is understood that an even number indicates an area outside a shadow volume and an odd number indicates an area inside a shadow volume.

To determine if the surface of a given polygon is a shadow area, one should count the number of shadow polygons that lie in front of that given polygon, i.e., between the location of that given polygon and the view point, and should determine that the polygon's surface lies within a shadow area when the count value is an odd number, or lies outside a shadow area when the count value is an even number. When there is an overlapping area between shadow volumes, for example, between the shadow volumes SV1 and SV2 as viewed from a view point 2, the determination based on an even number and an odd number is no longer possible. In this case, it is necessary to make the determination with respect to one of the overlapping shadow volumes first, and then make the determination with respect to the other shadow volume.

If there is a polygon P4 which crosses the shadow volume SV3 shown in FIG. 28, as the shadow polygons SP31 and SP32 lie between an area a-b of the polygon P4 and the view point 1, the area a-b is determined as lying outside the shadow volume SV3. As one shadow polygon SP32 lies between an area b-c of the polygon P4 and the view point 1, the area b-c is determined as lying inside the shadow volume SV3. As there are no shadow polygons between an area c-d and the view point 1, the area c-d is determined as lying outside the shadow volume SV3.

As discussed above, the shadowing process using shadow volumes and shadow polygons can be carried out by using a scheme similar to the above-described hidden-surface deleting process using Z values and by, for example, counting the number of shadow polygons present between the target area and the view point.

When the view point is located in a shadow volume, the relation about the target area lying outside or inside a shadow area with respect to an odd count value and an even count value becomes opposite to the relation in the above-described case of the view point lying outside the shadow volumes.

From a similar point of view, a method similar to the inverse hidden-surface deleting process which detects a shadow polygon having a larger Z value can be used. That is, it is also possible to detect if the area of the polygon P4 lies within a shadow volume by counting the number of the shadow volumes that exist between the polygon P4 and an infinite point from the view point. In this case, therefore, the area of a shadow polygon having a larger Z value than that of the polygon P4 is a target to be subjected to odd-even transform.

Shadowing Process (Third Invention)

The shadowing scheme is based on a process of using the mask generator shown in FIG. 2 to generate the effective areas of shadow polygons in an area mask by the fractal process, and generate shadow mask data representing if the number of shadow polygons between a target area and the view point is odd or even and saves the shadow mask data in the area mask register. Alternatively, the shadowing scheme is based on a process of generating shadow mask data representing if the number of shadow polygons between a target area and an infinite point is odd or even and saves the shadow mask data in the area mask register. Further, the shadow mask data is generated for each shadow volume, and a logical sum of shadow mask data corresponding to all the shadow volumes is computed, yielding synthesized shadow mask data, which is in turn supplied to the rendering section. As an area where shadow volumes overlap one another becomes a shadow, the areas which become shadow cast by the shadow volumes are separately acquired as shadow mask data, and a logical sum of all the shadow mask data is computed last. The shadowing process is premised on that rendering of the opaque polygon has been completed prior to the shadowing process and the Z value of the opaque polygon is stored in the Z-value register 561 for the opaque polygon.

In the shadowing process, therefore, the exclusive OR section 532, the OR operation section 538 and the area mask registers 534, provided for the respective shadow volumes, of the mask controller 53 are used in the mask generator 50 in FIG. 2. In addition, the Z-value register 561 for the opaque polygon and the Z-comparator 564 of the comparison section 56 are used.

Figure 29B:
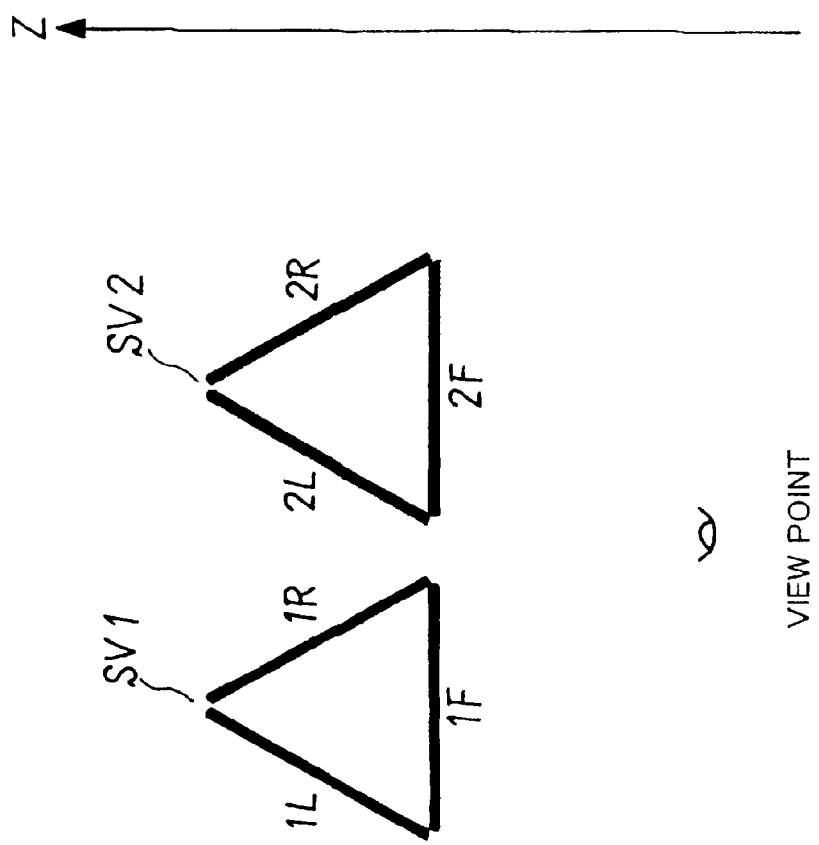
FIG. 29 is a diagram showing an example for explaining the shading process.
Figure 29A:
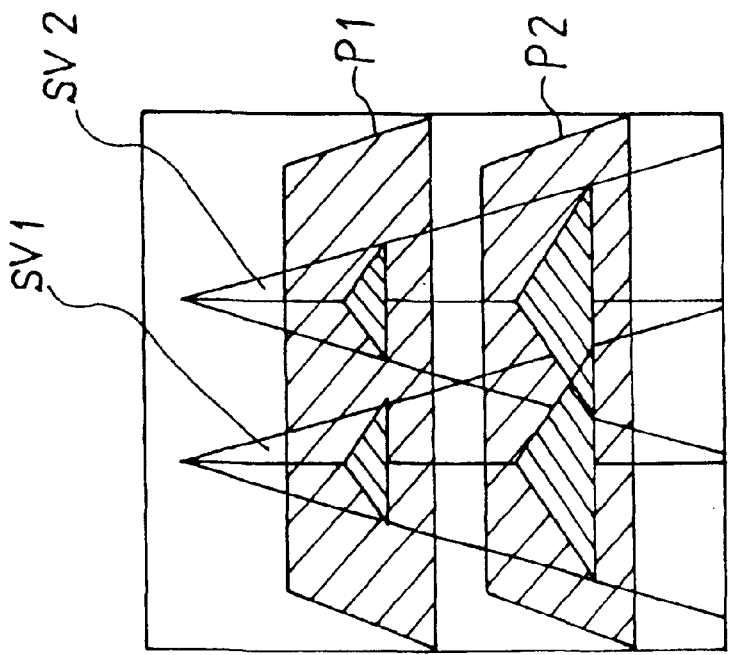

FIG. 29 is a diagram showing an example for explaining the shadowing process. FIG. 29A shows the shadow volumes SV1 and SV2 and ordinary polygons P1 and P2 in the display screen, and FIG. 29B shows the positional relationship in the Z direction between shadow polygons which constitute the shadow volumes SV1 and SV2. The shadow volumes SV1 and SV2, both triangular cones, respectively consist of shadow polygons 1F and 2F in the foreground of the screen and left and right shadow polygons 1L and 1R and 2L and 2R in the background of the screen.

Figure 31:
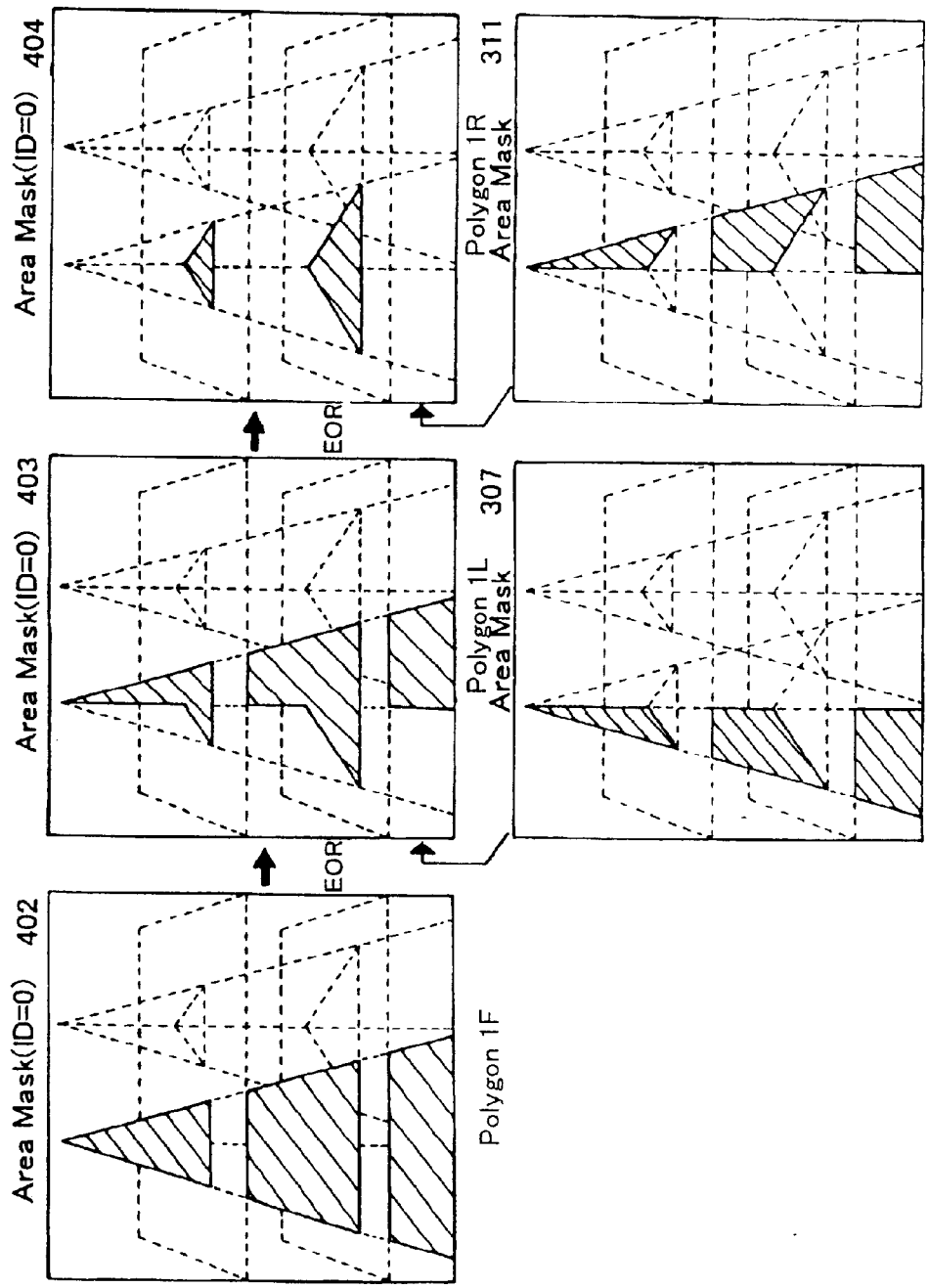
FIG. 31 is a diagram showing an area mask when the second shading process is executed.
Figure 32:
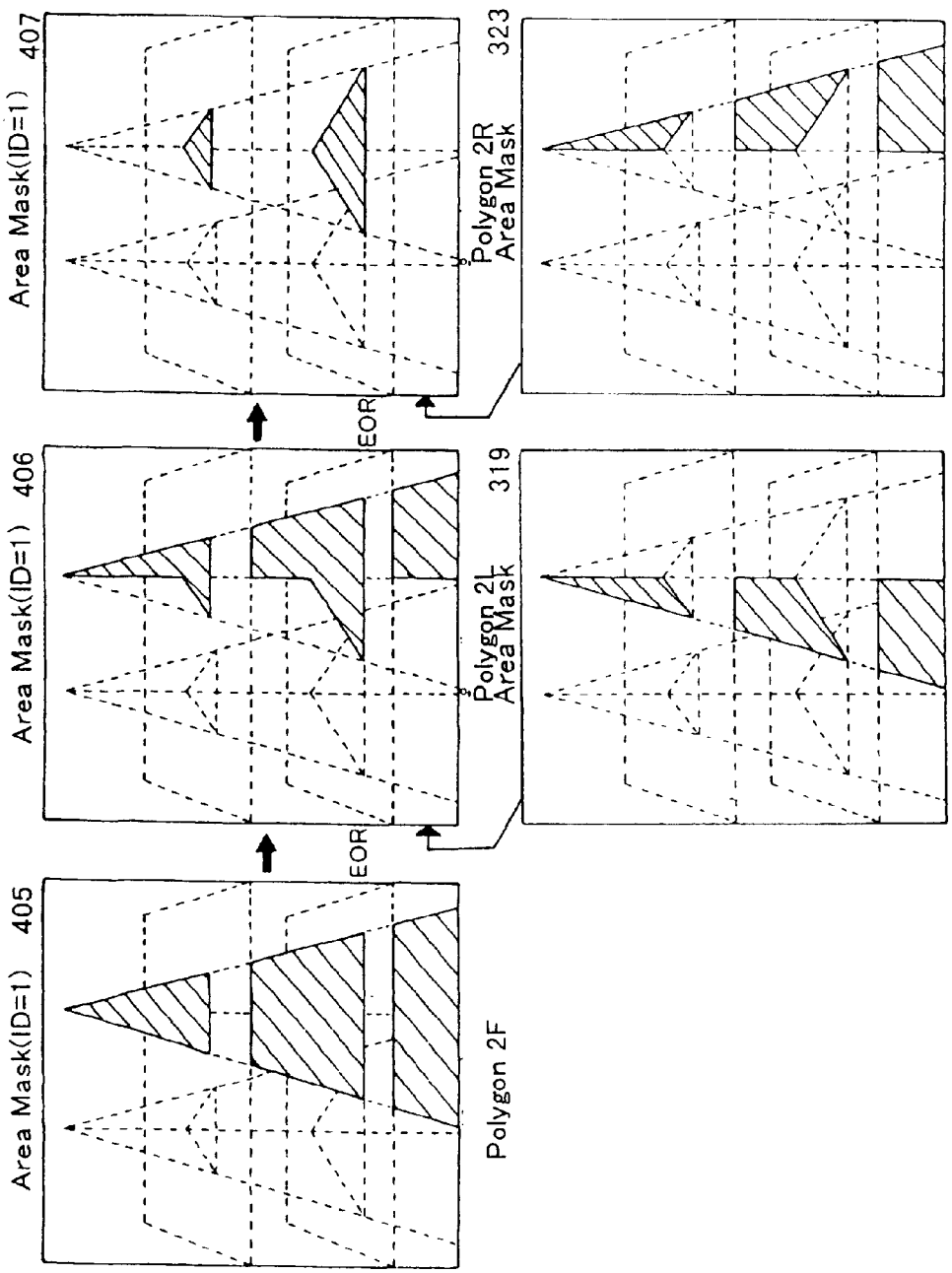
FIG. 32 is a diagram showing an area mask when the second shading process is executed.
Figure 33:
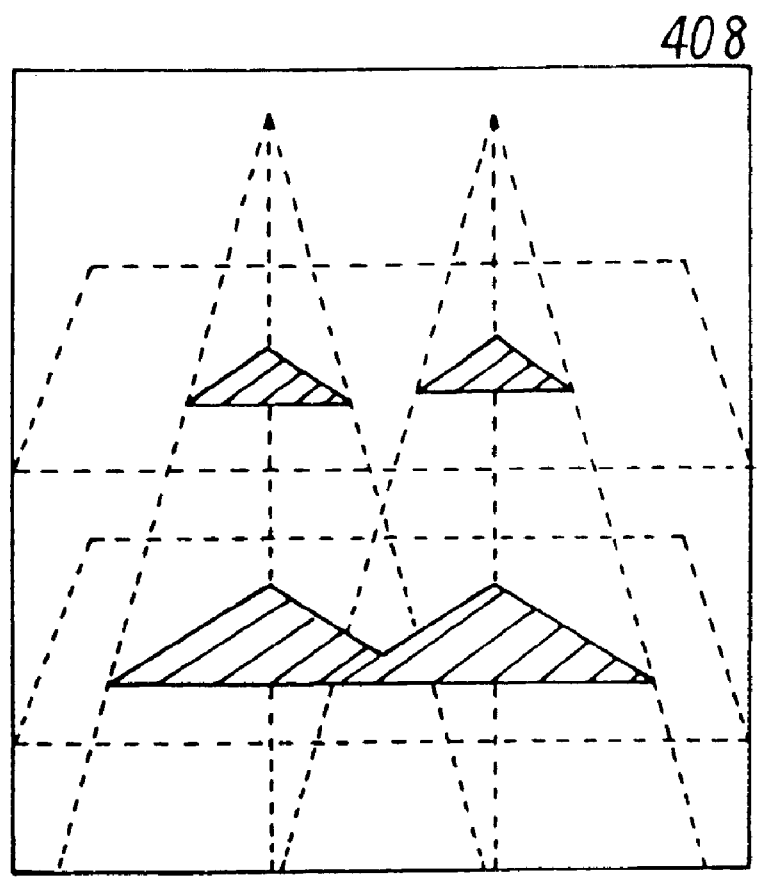
FIG. 33 is a diagram depicting a synthesized shadow mask which is generated in the second shading process.
Figure 43:
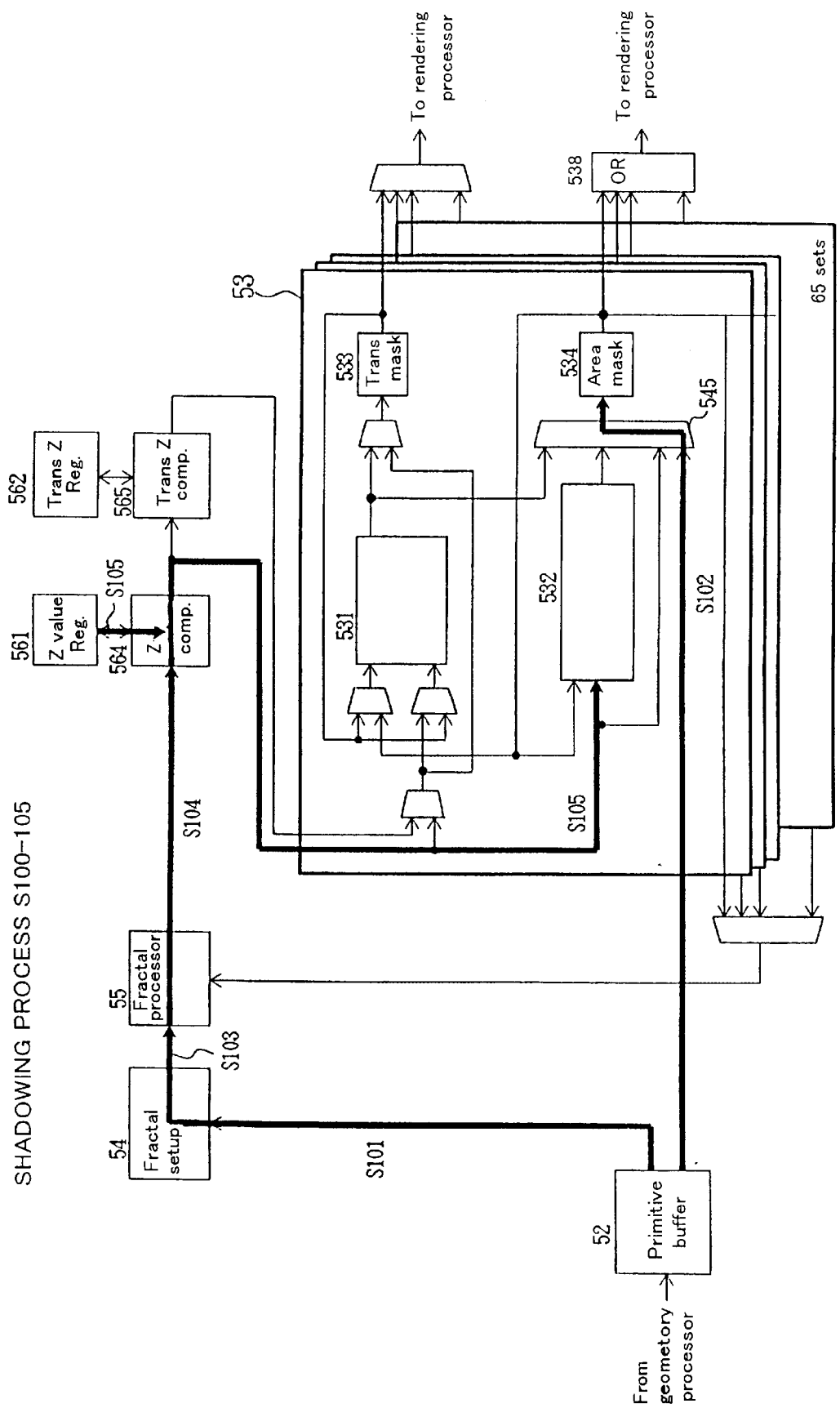
FIG. 43 is a diagram showing a data flow in the mask generator 50 in a case of performing a shadowing process.
Figure 44:
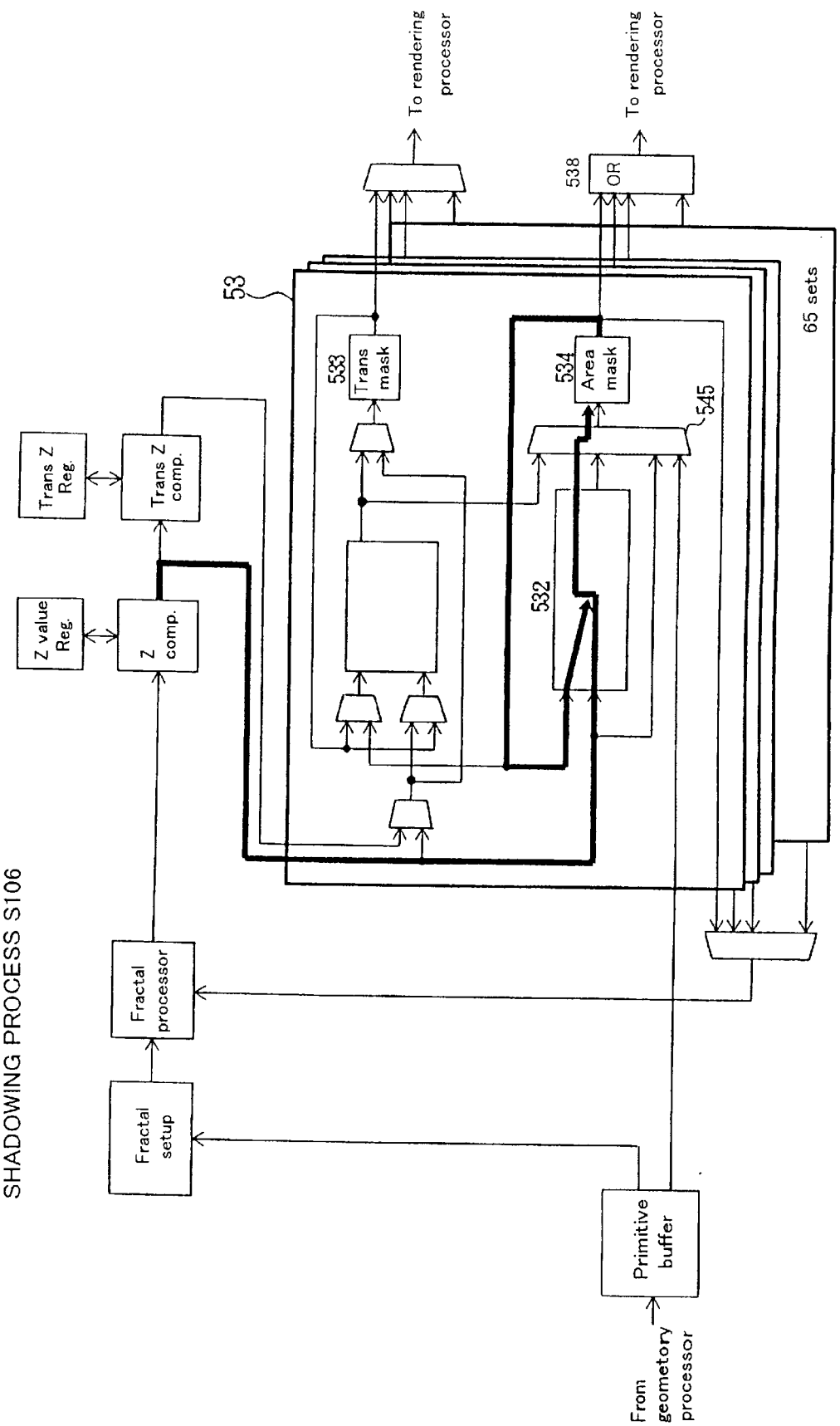
FIG. 44 is a diagram showing a data flow in the mask generator 50 in a case of performing the shadowing process.
Figure 45:
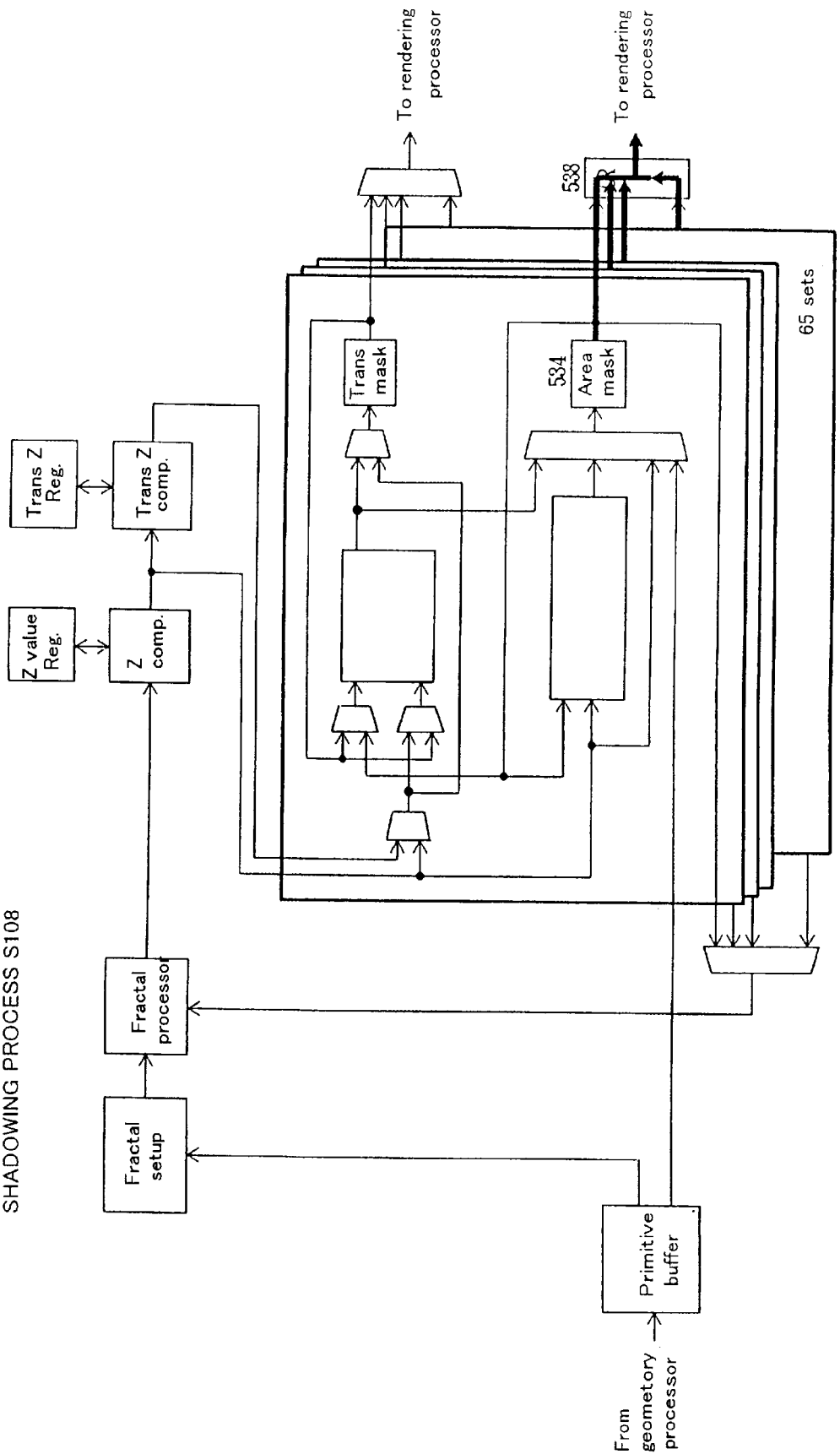
FIG. 45 is a diagram showing a data flow in the mask generator 50 in a case of performing the shadowing process.

FIG. 30 is a flowchart of a shadowing process. FIGS. 31 and 32 are diagrams showing area masks of shadow mask data when the example in FIG. 29 is processed by the shadowing process. FIG. 33 is a diagram depicting a final synthesized shadow mask. FIGS. 43 to 45 are diagrams showing individual data flows in the flowchart in FIG. 30.

The overall process of the flowchart in FIG. 30 detects shadow polygons positioned between an opaque polygon and the view point or an infinite point for each shadow volume and performs, when detected, through an exclusive OR operation, odd-even inversion of the odd number or even number of the shadow mask data (area mask data) which represents if the number of the detected shadow polygons is odd or even. This process is repeated for all the shadow volumes, and shadow mask data in the area mask register, generated for the respective shadow volumes, are processed in the OR operation section 538, yielding synthesized shadow mask data, which is in turn supplied to the rendering section. The shadowing process will be specifically described below according to the flowchart in FIG. 30 with reference to FIGS. 31–33 and FIGS. 43–45.

The premise is that the processing of the opaque polygons P1 and P2 has been completed. Steps S100 to S104 are substantially the same as the corresponding steps in the image processing of translucent polygons, but differ in that shadow polygons are targets in the shadowing process. First, with regard to the shadow polygon 1F, the primitive buffer 52 receives primitive data, which is shadow polygon data, or its ID from the geometry processor 48 and saves it (S100). The primitive buffer 52 stores polygon data and sends that data in the polygon data which is needed in the fractal process to the fractal setup section 54. The polygon data which is needed in the fractal process are, for example, the display coordinates and the Z value included in the vertex parameters (S100). The primitive buffer 52 sets a mask pattern in the area mask register which is not used, and supplies the mask pattern as initial mask data to the fractal processor 55 (S102). All the bits of the initial mask data are set to "1" which is valid or effective.

Next, the fractal setup section 54 obtains initial values for area determination and send the values to the fractal processor 55 (S103). The initial values include $d_1$, $d_2$, $d_3$, $(\partial z/\partial x)$, $(\partial z/\partial y)$ and cz, as shown in step S3 in FIG. 9. The fractal processor 55 executes a fractal process for area determination based on the initial values, acquiring mask data, and then performs a logical product of this mask data and initial mask data. The fractal processor 55 further obtains the Z values of pixels by a fractal process (S104). The mask data and the Z values are supplied to the Z-comparator 564 of the comparison section 56.

The Z-comparator 564 compares the Z values of the pixels obtained in the fractal process with the Z value in the Z-value register 561 for the opaque polygon, erases a area hidden behind the opaque polygons P1 and P2 from the mask data by the hidden-surface deleting process, and sends the resultant data as an area mask 402 in FIG. 31 to the mask controller 53 (S105 and FIG. 43). Specifically, the hidden-surface deleting process here is a process of making effective the area of a shadow polygon whose pixel's Z value is smaller than the Z value in the Z-value register. Alternatively, the inverse hidden-surface deleting process may be used to make effective the area whose pixel's Z value is greater than the Z value in the Z-value register. The former case involves the algorithm that makes the area of a shadow polygon lying between an opaque polygon and the view point as an effective area. The latter case involves the reverse algorithm that makes the area of a shadow polygon lying between an opaque polygon and an infinite point as an effective area.

In the former process of counting the number of shadow polygons lying between the view point and the opaque polygon, a polygon area is set valid when its pixel has a smaller Z value than that in the Z-value register, and is set invalid when its pixel has a greater Z value than the latter Z value, and the area mask becomes a mask 402 in FIG. 31. This area mask 402 indicates a shadow polygon area which is resulting from deletion of the areas of the opaque polygons P1 and P2 lying in front of the shadow polygon 1F from the area of the shadow polygon 1F and which is to be subjected to the shadowing process.

The mask controller 53 causes the exclusive OR section 532 to perform an exclusive OR operation on the area mask data 402, supplied from the comparison section 56, and the mask data in the area mask register 534, and saves the resultant data in the area mask register 534 (S106 and FIG. 44). The initial values for the area mask register 534 are all "0" indicating an even number, for example. The exclusive OR operation inverts the effective area of the area mask 402 supplied from the comparison section 56 to "1" indicating an odd number. The exclusive OR operation here inverts data indicating if the number of shadow polygons lying between the opaque polygon and the view point (or an infinite point) is odd or even. In this specification, this exclusive OR operation is called odd-even inversion. As a result of the process, the area mask 402 shown in FIG. 31 is generated. As the shadow polygon IF is the first polygon, the area mask 402 has the same shape as that of the shadow polygon 1F.

Next, the shadow polygon 1L of the same shadow volume SV1 is processed according to steps S100–S106 in the same way as described above. Through step S105, the mask data to be supplied to the mask controller 53 becomes mask data 307 as shown in FIG. 31. The area indicated by this mask data 307 is the partial area of the shadow polygon 1L that is located between the opaque polygons P1 and P2 and the view point. As a result of odd-even inversion that is accomplished by the exclusive OR operation (EOR) on the mask data 402 and 307, an area mask 403 shown in FIG. 31 is generated for the shadow volume SV1 (S106 and FIG. 44).

The shadow polygon 1R of the shadow volume SV1 is likewise processed according to steps S100–S106. A mask data 311 of the shadow polygon 1R is supplied to the mask controller 53, and an area mask 404 shown in FIG. 31 is generated as a result of odd-even inversion that is accomplished by the exclusive OR operation on the mask data 311 and 403. The above completes the processing of the shadow polygons which have the ID of the shadow volume SV1, the area mask 404 indicating a shadow area that is formed by the shadow volume SV1. Therefore, this area mask 404 is saved as a shadow mask in the area mask register 534 for the shadow volume SV1 (S106 and FIG. 44).

Next, the shadow polygons 2F, 2L and 2R which have the ID of the shadow volume SV2 are likewise processed according to steps S100–S106. In this shadowing process, the hidden-surface deleting process and odd-even inversion process are executed without considering any overlapping area of the shadow volumes, sequentially generating area masks 405, 406 and 407 as shown in FIG. 32. The area mask 407 indicates a shadow area that is formed by the shadow volume SV2. Therefore, this area mask 407 is saved as a shadow mask in the area mask register 534 corresponding to the shadow volume SV2.

As discussed above, area masks (shadow masks) are generated in association with the individual shadow volumes. When processing the polygons of all the shadow volumes is completed (S107), the mask controller 53 causes the OR operation section 538 to compute a logical sum of the mask data in the area mask register 534 for the IDs of the shadow volumes, generating a synthesized shadow mask 408, and sends the synthesized shadow mask 408 to the rendering section 62 (S108 and FIG. 45). As a result of the OR operation of the area mask 404 in FIG. 31 and the area mask 407 in FIG. 32, an area mask 408 in FIG. 33 is generated. A shadow area (effective area of the shadow mask) which is produced by different shadow volumes is also a shadow area even when it is an overlapping area.

The synthesized shadow mask 408 in FIG. 33 is supplied to the rendering section 62, and is used together with the trans masks of the opaque polygons in the rendering process. Consequently, shadow cast by the light source can be expressed effectively.

As described above, the shadowing process, has only to generate an area mask equivalent to a shadow mask for each shadow volume and compute a logical sum of all the final area masks, thus ensuring efficient processing.

Image Processing by General-purpose Computer

Figure 46:
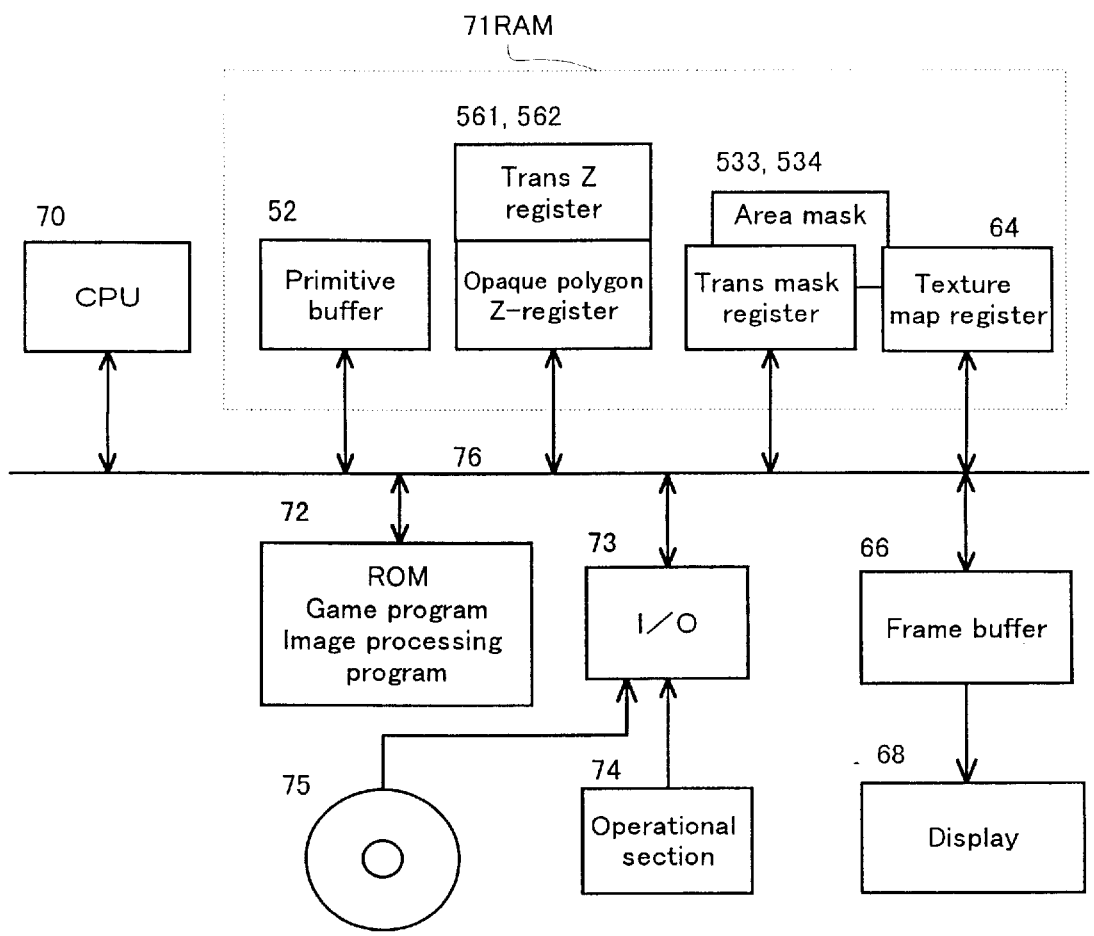
FIG. 46 is a diagram illustrating a structural example when image processing according to one embodiment is implemented by software using a general-purpose computer.

FIG. 46 shows a structural example in a case where image processing according to this embodiment is implemented by software using a general-purpose computer. In executing image processing using a general-purpose computer, computation for the image processing is carried out according to the program stored in a recording medium. As the image processing program is stored in a computer readable recording medium, the general-purpose computer operates as a computer specifically designed for image processing. The image processing program causes the computer to execute the individual procedures that have already been discussed by reference to the flowcharts and so forth. A logical product operation, an exclusion operation, an exclusive OR operation and an OR operation on individual mask data can be accomplished by using the functions of arithmetic operations of the computer.

In the example in FIG. 46, a CPU 70, a RAM 71 for arithmetic operations, and a ROM 72 having stored a game program or image processing program are connected to a bus 76. An input/output section 73 connected to the bus 76 is connected to an operational section 74 which is manipulated by an operator, and receives an operation signal. For the purpose of image processing, the RAM 71 is provided inside with a primitive buffer 52 for storing polygon data, a Z-value register 561 for opaque polygons, a trans Z-value register 562, individual mask registers 533 and 534, and a texture map memory 64. A frame buffer memory 66 is connected to the bus 76 as well as to an external display unit 68.

Although the image processing program is stored in the ROM 72 in this example, the image processing program may be loaded into the RAM 71 from a recording medium 75, such as an external CD-ROM or magnetic tape.

According to this invention, as described above, image processing can be carried out by relatively simple logical operations by executing an exclusion operation, an exclusive OR operation and an OR operation using a mask which indicates validness or invalidness for each pixel in a predetermined area and a mask indicating an odd number or even number.

This invention can efficiently generate an area mask indicative of the area of a polygon lying in a predetermined area by using the fractal process, and can then implement image processing through the aforementioned logical operations using the area mask.

According to the first invention, in the image processing of opaque polygons, a trans mask for each polygon having an effective area to be displayed can be efficiently formed by generating a trans mask indicative of an effective area for each polygon using the hidden-surface deleting process using Z values and then performing an exclusion operation between trans masks. The rendering process can be implemented using the trans mask.

According to the second invention, in the image processing of translucent polygons, an area mask from which an area hidden by an opaque polygon has been removed using the hidden-surface deleting process using Z values, the area of the translucent polygon located deeper in the display screen is extracted to generate a trans mask by the inverse hidden-surface deleting process that extracts area with larger Z value order, and an exclusion operation between trans masks can be executed so that an overlapping area can be processed properly. As the trans masks are generated in order from the deepest area among polygons, and are used in the rendering process, the blending process necessary for translucent polygons can be carried out efficiently.

According to the third invention, in the shadowing process, the positions of shadow polygons between a polygon to be drawn and the view point (or an infinite point) are acquired as mask data for each shadow volume by the hidden-surface deleting process, and shadow mask data indicating if the number of the shadow polygons is odd or even is acquired in an exclusive OR operation and is saved in the area mask register. Finally, an OR operation on the individual shadow mask data obtained for the respective shadow volumes is executed to generate synthesized shadow mask data that becomes shadow. It is therefore possible to efficiently execute the shade deleting process through simple logical operations.

Image Processing Using Fractal Scheme (Fourth Invention)

Figure 47:
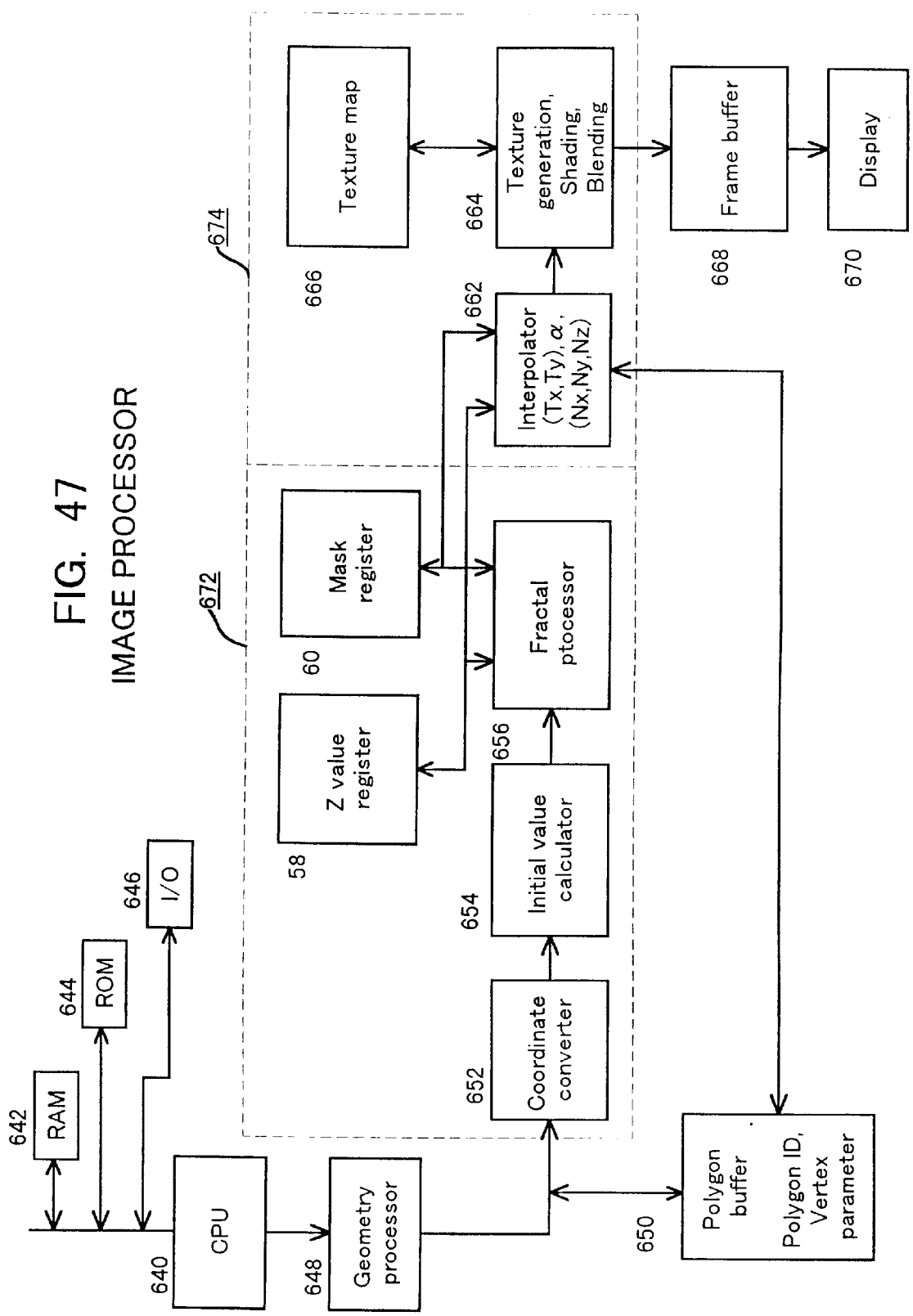
FIG. 47 is a general block diagram of an image processing apparatus which uses a fractal scheme.

FIG. 47 is a general block diagram of an image processing apparatus which uses the above-described fractal scheme. The image processing apparatus exemplified in FIG. 47 comprises a CPU 640, which generates polygon data and view point data according to a game program or simulation program, a geometry processor 648, which performs scan conversion to convert the 3D coordinates of each vertex included in the polygon data to 2D coordinates in a display screen of the associated polygon positioned inside the display screen, and a rendering section 674, which generates color data of pixels on the display screen. To perform a fractal process as a pre-process, the rendering section 674 is provided with a fractal processor 672 as described above.

One frame of polygon data generated by the geometry processor 648 is temporarily stored in a polygon buffer 650. The structure of the polygon data is illustrated in FIG. 3. As shown in FIG. 3, polygon data has parameters of the vertexes of that polygon for each polygon ID. The vertex parameters include, for example, the coordinates (x, y) in the display screen of each vertex, a Z value indicating the depth in the display screen, texture coordinates (Tx, Ty) associated with color data, normal vectors (Nx, Ny, Nz), and an alpha value indicating transparency. In addition, the vertex parameters may include a luminance value. FIG. 3 shows parameters of the vertexes 00, 01 and 02 of the polygon ID0 and the vertexes 10, 11 and 12 of the polygon ID1.

The fractal processor 672 generates, for each fragment area, polygon ID data to be displayed by pixels in that area, and their Z values, which are in turn stored in a mask register 60 and a Z-value register 58 (see FIG. 7), respectively, as has been explained in the foregoing description by reference to FIG. 6. To generate polygon ID data to be displayed and the Z values, the fractal processor 672 is supplied with data of the polygons in a frame in order. The fractal processor 672 includes a coordinate converter 652 for conversion to coordinates in the display screen, an initial value calculator 654 which acquires the coordinates of a center point of a fragment area, a Z value and so forth as initial values, and a fractal processing unit 656 which performs an arithmetic operation consisting of the aforementioned addition and subtraction based on the initial values. The Z value and polygon ID data which are generated by the fractal processing unit 656 are respectively stored in the Z-value register 58 and the mask register 60.

When the fractal processor 672 determines a polygon to be displayed for a pixel in the fragment area, the rendering section 674 generates image data including the specific color data of that pixel, and stores the image data in the frame buffer memory 668. In the example shown in FIG. 47, an interpolator 662, a color data generator 664 and a texture map 666 are provided in the rendering section 672. The interpolator 662 performs interpolation on the vertex parameters by referring to polygon data in the polygon buffer memory 650 based on the polygon ID data for each pixel stored in the mask register 60. As a result, the texture coordinates (Tx, Ty), the alpha value and the normal vectors (Nx, Ny, Nz) included in the individual parameters of the associated pixel are obtained. Texture data is read from the texture map 660 according to the texture coordinates, and a blending process using the alpha value representing transparency, a shading process with respect to the light source using the normal vectors, and the like are carried out in the color data generator 664. The generated color data is stored in the frame buffer memory 668. Finally, a display 670 displays the color data.

An example of the specific structure of the fractal processing unit 656 has already been explained with reference to FIG. 7. Another example of the mask register 60 has already been explained with reference to FIG. 8.

In FIG. 47, the coordinate converter 652 is provided in the fractal processor 672. While this coordinate converter 652 is not an essential component, the proper coordinate conversion of supplied polygon data can make the computation in the fractal processing unit 656 simpler.

As shown in FIG. 4, converting the X-Y coordinates in the display screen to E-O coordinates along the direction of the fractal process can further simplify the computation in the fractal processing unit. The E-O coordinates are the X-Y coordinates rotates by 45 degrees. As discussed earlier, with regard to fractal segmentation shown in FIG. 4A, computation to determine if the center point P, one of the center points $P_1$, $P_2$, $P_3$ and $P_4$ of four segmented areas, lies inside a polygon is carried out as follows.

$$d_1 = a_1x_1 + b_1y_1 + c_1 = a_1(x_0 - 2) + b_1(y_0 - 2) + c_1$$

$$d_2 = a_2x_1 + b_2y_1 + c_2 = a_2(x_0 - 2) + b_2(y_0 - 2) + c_2$$

$$d_3 = a_3x_1 + b_3y_1 + c_3 = a_3(x_0 - 2) + b_3(y_0 - 2) + c_3$$

For the E-O coordinates which are the X-Y coordinates rotated by 45 degrees, this computation becomes as follows.

$$\begin{aligned}
d_1 &= aa_1 e_1 + bb_1 o_1 + cc_1 \\
&= aa_1(e_0 - 2) + bb_1 o_0 + cc_1 \\
&= d_1 - 2aa_1 \\
d_2 &= aa_2 e_1 + bb_2 o_1 + cc_2 \\
&= aa_2(e_0 - 2) + bb_2 o_0 + cc_2 \\
&= d_2 - 2aa_2 \\
d_3 &= aa_3 e_1 + bb_3 o_1 + cc_3 \\
&= aa_3(e_0 - 2) + bb_3 o_0 + cc_3 \\
&= d_3 - 2aa_3
\end{aligned}$$

where $aa_1$, $bb_1$ and $cc_1$ are constant obtained by coordinate conversion of the constants in the linear LM of the polygon 20. That is, subtraction "−2aa" is merely carried out.

Similar simplification is likewise applied to the computation to obtain Z values. Thus, the coordinate conversion of the parameters of polygon data by the coordinate converter 652 in the first stage of the fractal processor 672 can simplify the structure of the arithmetic circuit of the fractal processing unit 656.

Figure 48:
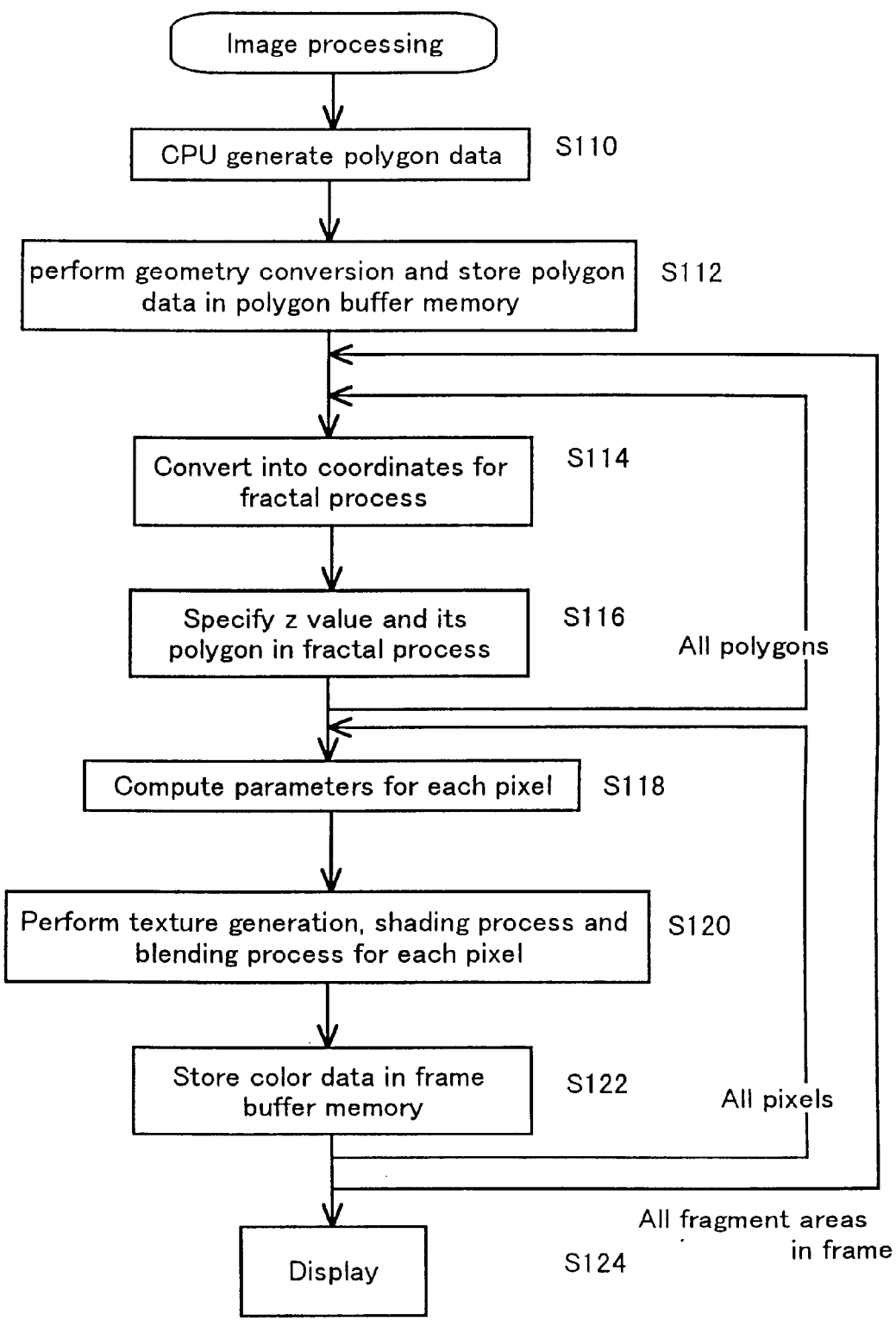
FIG. 48 is a general flowchart of the image processing.
Figure 49:
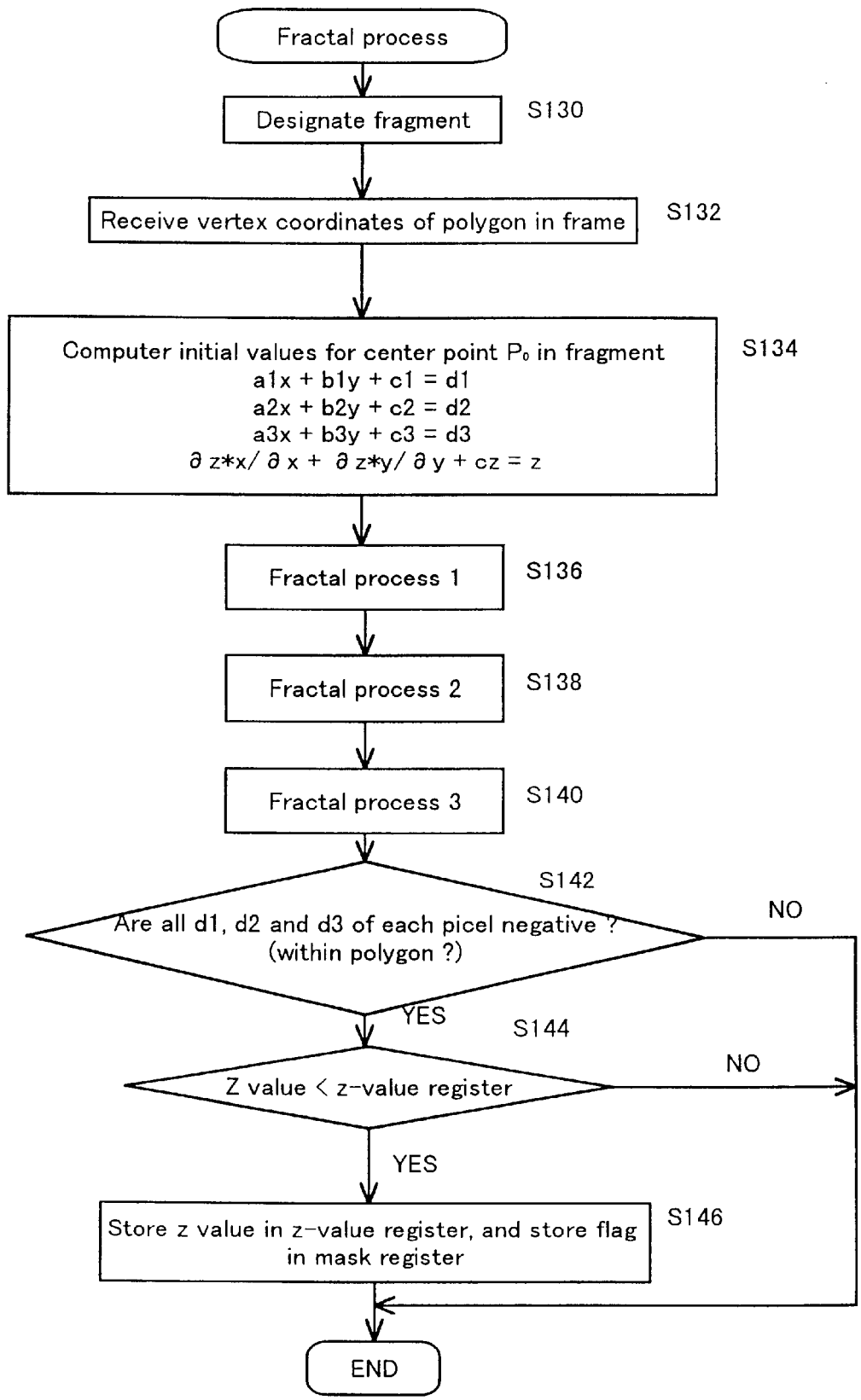
FIG. 49 is a detailed flowchart of a fractal step.

FIG. 48 is a general flowchart of the image processing. FIG. 49 illustrates the flowchart for the fractal process. The flow of image processing will now be discussed referring to those diagrams.

First, the CPU 640 executes the game program or simulation program, generating polygon data, and sends the polygon data to the geometry processor 648 (S110). The geometry processor 648 performs some conversion concerning the movement of a polygon in the 3D coordinate system, a clipping process, and scan conversion of the 3D coordinates to 2D coordinates in the display screen. Polygon data as shown in FIG. 3, generated as a result of those processes, is stored in the polygon buffer 650 (S112). Such polygon data of all the polygons in one frame are stored in the polygon buffer memory 650.

The fractal processor 672 sequentially reads polygon data from the polygon buffer 650, and detects polygons to be drawn for the pixels in the fragment area. This will be discussed with reference to single polygon data as an example. The coordinate converter 652 converts the vertex parameters of the polygon data read from the polygon buffer 650 to the coordinates for fractal processing (S114). The initial value calculator 654 and the fractal processing unit 656 determine a polygon to be drawn for each pixel in the fragment area, and stores its Z value in the Z-value register 58 (S116). The coordinate conversion S114 and the fractal process S116 are carried out for all the polygons in the frame in this embodiment.

When the above processing is completed for all the polygons, a polygon to be drawn for each pixel is determined and its ID data is stored in the mask register 60. Then, for each pixel, the rendering section 674 acquires the parameters of that pixel from the vertex parameters of a polygon first (S118). This computation is executed by the interpolator 662. The color data generator 664 reads texture data from the texture map memory 666 in accordance with the texture coordinates, or computes texture data of the pixel from the read texture data. Based on the normal vectors and alpha value, the shading process with respect to the light source and the blending process translucent polygons are executed (S120). The resultant color data is stored in the frame buffer memory 668 (S122). The steps S118, S120 and S122 are carried out for all the pixels in the fragment area.

Further, steps S114 to S122 are carried out for all the fragment areas in the frame, and rendering of all the pixels in the frame is completed. Thereafter, image data is displayed on the display 670 in accordance with the color data in the frame buffer memory 668. Color data here is RGB data, for example, and is luminance data in a case of monochromatic display.

The fractal processing step S116 is illustrated in detail in the flowchart in FIG. 49. A fragment area is designated in step S30, and polygon data in the frame is received from the polygon buffer 650 (S132). In this case, particularly, the vertex coordinates and the Z value of the vertex are given. This data has been converted to the proper coordinates by the coordinate converter 652 as mentioned above. Then, with respect to the center point $P_0$ of the fragment area, the initial values of d and the Z value are obtained (S134). The computation for this task has already been explained.

The fractal processing unit 656 performs a fractal process of yielding four segments (S136), a fractal process of yielding 16 segments (S138) and a fractal process of yielding 64 segments (S140) are executed. Consequently, $d_1$, $d_2$, $d_3$ and the Z value for each pixel in the fragment area are acquired. It is then determined whether or not that pixel lies inside the polygon which is currently processed by determining if the values of $d_1$, $d_2$ and $d_3$ are all negative (S142). When the values of $d_1$, $d_2$ and $d_3$ are all negative, the pixel lies in the polygon, so that its Z value is compared with the Z value in the Z-value register 58 (S144). When the former Z value is smaller than that in the Z-value register 58, the Z value is stored in the Z-value register 58 and a flag is set in the associated area in the mask register (S146).

Modification

Figure 50:
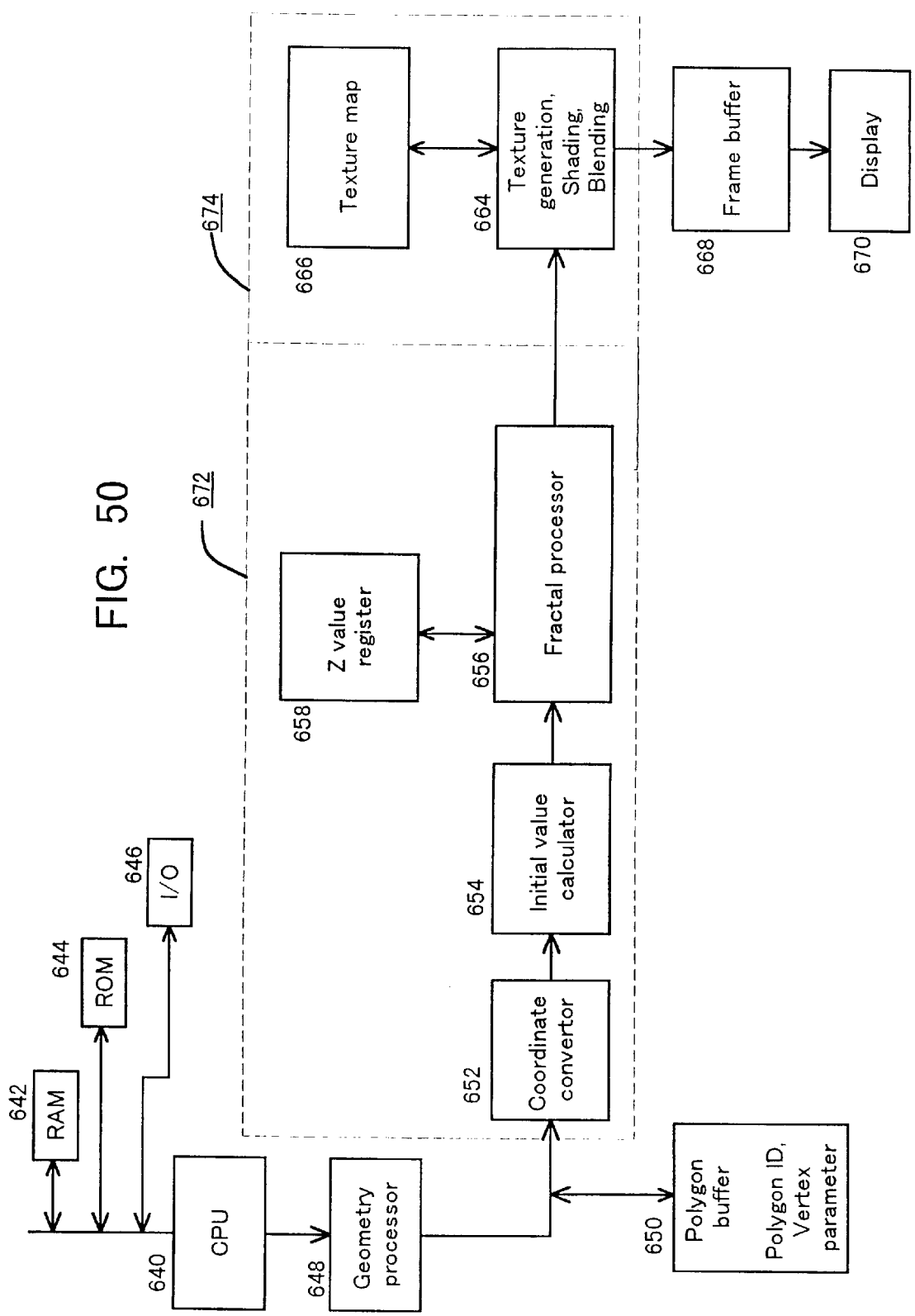
FIG. 50 is a block diagram of another example of the image processing apparatus.

FIG. 50 is a block diagram of another example of the image processing apparatus. Same reference numerals are given to those components of this image processing apparatus which are the same as the corresponding components of the image processing apparatus shown in FIG. 47. In this modification, the fractal processing unit 656 acquires the values of d and the Z value as well as other parameters, such as the normal vectors, the texture coordinates, the alpha value and color related data like luminance, by simple computations in the fractal scheme. Accordingly, the initial value calculator 654 also obtain the initial values of those other parameters at the center point $P_0$.

Figure 51:
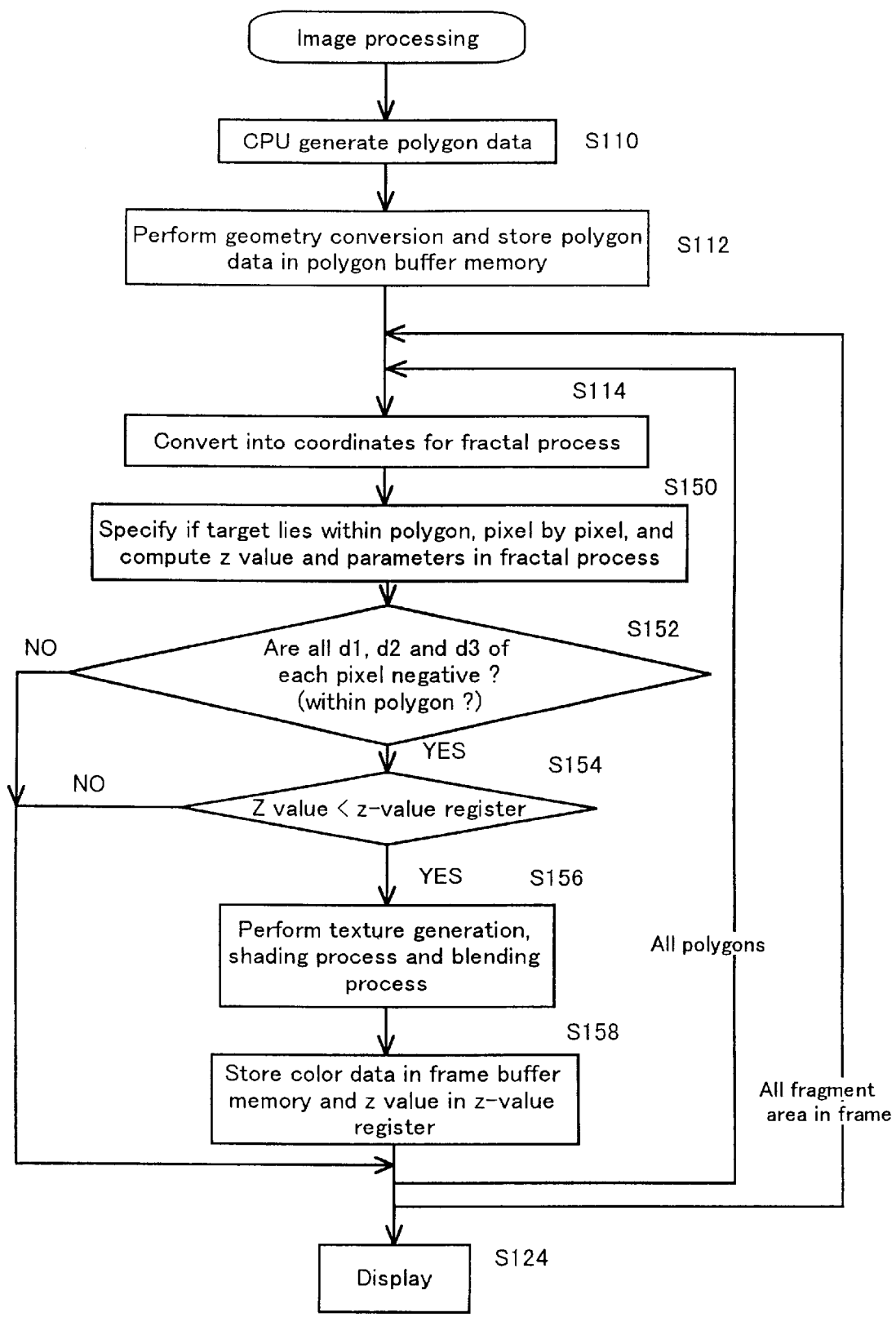
FIG. 51 is a flowchart illustrating the process of the image processing apparatus in FIG. 50.

FIG. 51 is a flowchart illustrating the process of the image processing apparatus in FIG. 50. Same reference numerals are likewise given to those steps in this flowchart which are the same as the corresponding steps in FIG. 48. In this modification, the fractal processing unit 656 computes the values of d and the Z value as well as other parameters, such as the normal vectors, the texture coordinates, the alpha value and luminance (S150). Accordingly, it is determined from the values d whether the pixel lies in a polygon (S152), and if the determination is affirmative, it is then determined if the Z value is smaller than the Z value in the Z-value register. When the Z value is smaller, which means that there is a polygon to be drawn, generation of texture data, a shading process, a blending process and so forth are executed (S156), the generated color data is stored in the frame buffer memory 668, and the Z value is stored in the Z-value register (S158).

Steps S114–S158 are executed for all the polygons in a frame, and further for all the fragment areas in the frame.

In the modification illustrated in FIGS. 50 and 51, all of the vertex parameters are acquired through simple computation by the fragmenting scheme. Therefore, the computation by the interpolator in FIG. 47 is implemented fast by the fragmenting scheme.

Example of General-purpose Computer

Figure 52:
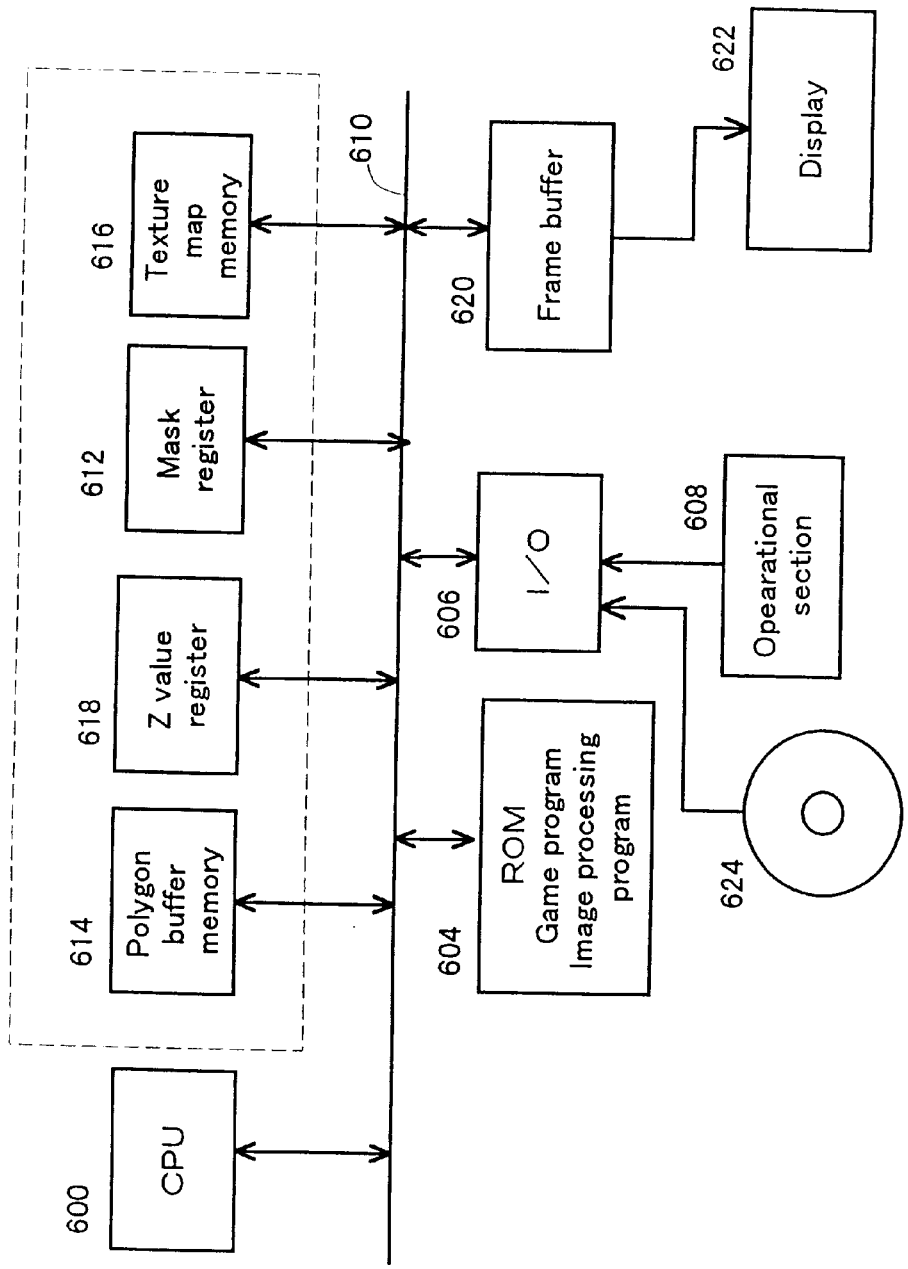
FIG. 52 is a structural diagram of an image processing apparatus in a case where image processing is implemented by a general-purpose computer.
Figure 53:
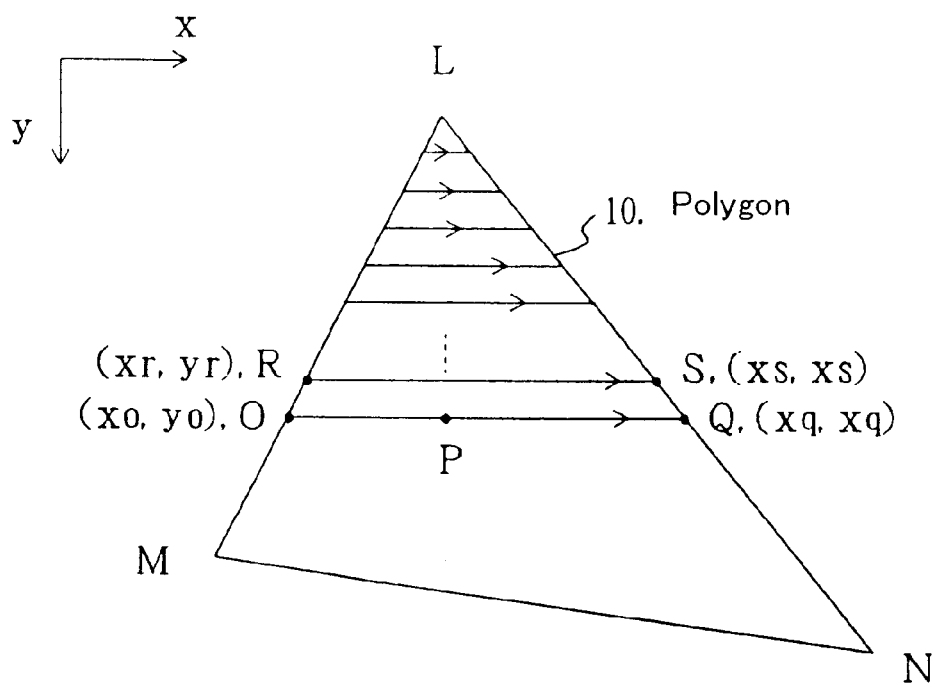
FIG. 53 is a diagram for explaining raster scanning of a polygon.

FIG. 52 shows the structure of an image processing apparatus in a case where the above-described image processing is implemented by using a general-purpose computer. In executing image processing using a general-purpose computer, computation for the image processing is carried out according to the program that is stored on a recording medium. As the image processing program is stored in a computer readable recording medium, the general-purpose computer operates as a computer specifically designed for image processing. The image processing program causes the computer to execute the individual procedures that have already been discussed by reference to the flowcharts and so forth.

In the example in FIG. 52, a CPU 600, a RAM 602 for arithmetic operations, and a ROM 604 having stored a game program or image processing program are connected to a bus 610. An input/output section 606 connected to the bus 610 is connected to an operational section 608 which is manipulated by an operator, and receives an operation signal. For the purpose of image processing, a polygon buffer memory 614, a texture map memory 616, a Z-value register 618, and a mask register 612 are provided and are all connected to the bus 610. A frame buffer memory 620 is connected to the bus 610 as well as to an external display unit 622.

Although the image processing program is stored in the ROM 604 in this example, the image processing program may be loaded into the RAM 602 from a recording medium 624, such as an external CD-ROM or magnetic tape.

According to the above-described embodiment, in a case of segmenting a fragment area into a plurality of similar figures step by step by the fractal scheme, a rectangular area is segmented to small similar rectangular areas. This invention is not however limited to such rectangular segmentation, and an area may be segmented to triangular areas or areas of other shapes. Although a fragment area is segmented to 64 pixels or tiny areas in the above-described described embodiment, a fragment area may further be segmented to 256 areas, 1024 areas and so forth. In this case, the last segment need not have a size corresponding to that of a pixel on the display screen.

As discussed above, the fourth invention can simplify the computation significantly by carrying out determination on whether or not a pixel lies in a polygon in a fractal order. What is more, the computation can be performed plural times in parallel, thus allowing the determination to be made for multiple pixels at a time. This can shorten the delay time (latency) needed in computation.

The Z values of the individual pixels can also be computed through simple addition and subtraction by using the fractal scheme. Further, the parameters of a polygon can likewise be computed through simple addition and subtraction by using the fractal scheme.

This invention can make computation simpler and faster as compared with the conventional method that performs computation pixel by pixel using raster scanning.

Furthermore, the rendering process can be executed without waste by comparing the Z values obtained by the fractal scheme with the Z value in the Z-value register in advance, and storing the pixel data of a polygon to be drawn in the mask register.

It is also possible to compute and draw a shadow area, formed by an object in virtual space, in real time by using the fractal process and the area mask that has been generated by the fractal process. This can significantly improve the image processing performance.

What is claimed is:

1. An image processing apparatus for generating image data for displaying a plurality of polygons, comprising:
   a mask generator for generating first mask data indicating effective pixel areas of said polygons in a display screen and Z values indicating depths in said display screen for the respective effective pixels from polygon data including position data of said polygons in said display screen, generating second mask data having, as an effective pixel area, a pixel area having a Z value in the foreground of a Z value of another processed polygon among said effective pixel areas of said first mask data, executing an exclusion operation to delete said effective pixel area of said generated second mask data from the effective pixel area of generated second mask data of another polygon to thereby generate new second mask data, and performing generation of said new second mask data polygon by polygon; and
   a rendering section for implementing a rendering process on each of said polygons, with respect to said effective pixel area indicated by said new second mask data supplied from said mask generator.

2. The image processing apparatus according to claim 1, wherein said mask generator includes a fractal processor for, while segmenting a predetermined display screen area into smaller similar areas in a fractal sense, sequentially detecting if said segmented similar areas are positioned inside said polygons in accordance with said position data, and generating said first mask data for those segmented similar areas which have been detected as positioned inside said polygons or not.

3. An image processing apparatus for generating image data for displaying a plurality of translucent polygons, comprising:
   a mask generator for generating first mask data indicating effective pixel areas of said translucent polygons in a display screen and translucent Z values indicating depths in said display screen for the respective effective pixels from polygon data including position data of said translucent polygons in said display screen, generating second mask data having, as an effective pixel area, a pixel area having a translucent Z value in the background of a translucent Z value of another processed translucent polygon among said effective pixel areas of said first mask data, executing an exclusion operation to delete said effective pixel area of said generated second mask data from the effective pixel area of generated second mask data of another translucent polygon to thereby generate new second mask data, and performing generation of said new second mask data, translucent polygon by translucent polygon; and a rendering section for implementing a rendering process on each of said polygons for generation of image data, with respect to said effective pixel area indicated by said new second mask data supplied from said mask generator, whereby said mask generator further executes an exclusion operation to delete said effective pixel area of said new second mask data from said effective pixel area of said first mask data to thereby generate new first mask data, and generates next new second mask data based on said new first mask data, and said rendering section carries out said rendering process in accordance with said next new second mask data.

4. The image processing apparatus according to claim 3, wherein said mask generator repeatedly performs said process of executing said exclusion operation to delete said effective pixel area of said new second mask data from said effective pixel area of said first mask data, to thereby generate new first mask data, and generating next new second mask data based on said new first mask data, until no effective pixel area becomes available from said new first mask data.

5. The image processing apparatus according to claim 3 or 4, wherein said rendering section performs a predetermined blending process on an overlapping area of the effective pixel area of previously supplied new second mask data and the effective pixel area of said next new second mask data, in said rendering process which is executed in accordance with said next new second mask data.

6. The image processing apparatus according to claim 3 or 4, wherein said mask generator generates said first mask data indicating said effective pixel areas of said translucent polygons in said display screen by setting a pixel area having a Z value in the foreground of a Z value of the effective pixel area of an opaque polygon, as an effective pixel area.

7. The image processing apparatus according to claim 3 or 4, wherein said mask generator includes a fractal processor for, while segmenting a predetermined display screen area into smaller similar areas in a fractal sense, sequentially detecting if said segmented similar areas are positioned inside said polygons in accordance with said position data, and generating said first mask data for those segmented similar areas which have been detected as positioned inside said polygons or not.

8. The image processing apparatus according to claim 3 or 4, wherein said mask generator and said rendering section carry out the mask data generation and the rendering process both recited in claim 1 before processing said translucent polygons.

9. An image processing apparatus for generating image data for displaying a shadow area on a target polygon to be drawn, comprising:

a mask generator for generating first mask data indicating effective pixel areas of shadow polygons defining a shadow volume in a display screen and Z values indicating depths in said display screen for respective effective pixels, from shadow polygon data including position data of said shadow polygons in said display screen, generating second mask data having, as an effective pixel area, a pixel area having a Z value in the foreground of (or in the background of) a Z value of said target polygon among said effective pixel areas of said first mask data, performing odd-even inversion on odd-even data of shadow mask data, which represents the number of shadow polygons positioned in a direction of a line of sight and between said target polygon and a view point (or an infinite point), with respect to said new effective pixel area of said second mask data, thereby generating new shadow mask data, and executing generation of said new shadow mask data for all shadow polygons that define said shadow volume; and a rendering section for implementing a rendering process in accordance with said new shadow mask data supplied from said mask generator.

10. The image processing apparatus according to claim 9, wherein there are a plurality of said shadow volumes; and said mask generator generates plural pieces of said shadow mask data for said plurality of shadow volumes, respectively, generates synthesized shadow mask data having an effective pixel area where the effective pixel areas of said plural pieces of shadow mask data overlap one another, and supplies said synthesized shadow mask data to said rendering section as said shadow mask data supplied from said mask generator.

11. The image processing apparatus according to claim 9 or 10, wherein said rendering section performs a rendering process for displaying a shadow area on said target polygon to be drawn, for an effective pixel area indicated by said supplied shadow mask data.

12. The image processing apparatus according to claim 9 or 10, wherein said mask generator includes a fractal processor for, while segmenting a predetermined display screen area into smaller similar areas in a fractal sense, sequentially detecting if said segmented similar areas are positioned inside said shadow polygons in accordance with said position data, and generating said first mask data for those segmented similar areas which have been detected as positioned inside said polygons or not.

13. The image processing apparatus according to claim 9 or 10, wherein said mask generator carries out the mask data generation recited in claim 1 before processing said shadow polygons.

14. The image processing apparatus according to claim 9 or 10, wherein said mask generator and said rendering section carry out the mask data generation and the rendering process for translucent polygons, both recited in claim 3, before processing said shadow polygons.

15. An image processing method of generating image data for displaying a plurality of polygons, comprising:

a mask generation step of generating first mask data indicating effective pixel areas of said polygons in a display screen and Z values indicating depths in said display screen for the respective effective pixels from polygon data including position data of said polygons in said display screen, generating second mask data having, as an effective pixel area, a pixel area having a Z value in the foreground of a Z value of another processed polygon among said effective pixel areas of said first mask data, executing an exclusion operation to delete said effective pixel area of said generated second mask data from the effective pixel area of generated second mask data of another polygon to thereby generate new second mask data, and performing generation of said new second mask data polygon by polygon; and a rendering step of implementing a rendering process on each of said polygons, with respect to said effective pixel area indicated by said new second mask data generated in said mask generation step.

16. An image processing method of generating image data for displaying a plurality of translucent polygons, comprising:

a mask generation step of generating first mask data indicating effective pixel areas of said translucent polygons in a display screen and translucent Z values indicating depths in said display screen for the respective effective pixels from polygon data including position data of said translucent polygons in said display screen, generating second mask data having, as an effective pixel area, a pixel area having a translucent Z value in the background of a translucent Z value of another processed translucent polygon among said effective pixel areas of said first mask data, executing an exclusion operation to delete said effective pixel area of said generated second mask data from the effective pixel area of generated second mask data of another translucent polygon to thereby generate new second mask data, and performing generation of said new second mask data, translucent polygon by translucent polygon; and a rendering step of implementing a rendering process on each of said polygons for generation of image data, with respect to said effective pixel area indicated by said new second mask data generated in said mask generation step, whereby said mask generation step further executes an exclusion operation to delete said effective pixel area of said new second mask data from said effective pixel area of said first mask data to thereby generate new first mask data, and generates next new second mask data based on said new first mask data, and said rendering step carries out said rendering process in accordance with said next new second mask data.

17. The image processing method according to claim 16, wherein said mask generation step repeatedly performs said process of executing said exclusion operation to delete said effective pixel area of said new second mask data from said effective pixel area of said first mask data to thereby generate new first mask data, and generating next new second mask data based on said new first mask data, until no effective pixel area becomes available from said new first mask data.

18. The image processing method according to claim 16 or 17, wherein said rendering step performs a predetermined blending process on an overlapping area of the effective pixel area of previously supplied new second mask data and the effective pixel area of said next new second mask data, in said rendering process which is executed in accordance with said next new second mask data.

19. An image processing method of generating image data for displaying a shadow area on a target polygon to be drawn, comprising:

a mask generation step for generating first mask data indicating effective pixel areas of shadow polygons defining a shadow volume in a display screen and Z values indicating depths in said display screen for respective effective pixels, from shadow polygon data including position data of said shadow polygons in said display screen, generating second mask data having, as an effective pixel area, a pixel area having a Z value in the foreground of (or in the background of) a Z value of said target polygon among said effective pixel areas of said first mask data, performing odd-even inversion on odd-even data of shadow mask data, which represents the number of shadow polygons positioned in a direction of a line of sight and between said target polygon and a view point (or an infinite point), with respect to said effective pixel area of said second mask data, thereby generating new shadow mask data, and executing generation of said new shadow mask data for all shadow polygons that define said shadow volume; and a rendering step of implementing a rendering process in accordance with said new shadow mask data generated in said mask generation step.

20. The image processing method according to claim 19, wherein there are a plurality of shadow volumes; and said mask generation step further generates plural pieces of said shadow mask data for said plurality of shadow volumes, respectively, and generates synthesized shadow mask data having an effective pixel area where the effective pixel areas of said plural pieces of shadow mask data overlap one another; and said rendering step performs said rendering process while treating said synthesized shadow mask data as said shadow mask data.

21. The image processing method according to claim 19 or 20, wherein said rendering step performs a rendering process for displaying a shadow area on said target polygon to be drawn, for an effective pixel area indicated by said shadow mask data.

22. A computer readable recording medium having recorded an image processing program for causing a computer to execute an image processing procedure of generating image data for displaying a plurality of polygons, said image processing procedure comprising:

a mask generation procedure of receiving polygon data including position data of said polygons in said display screen, generating first mask data indicating effective pixel areas of said polygons in a display screen and Z values indicating depths in said display screen for the respective effective pixels from said polygon data, generating second mask data having, as an effective pixel area, a pixel area having a Z value in the foreground of a Z value of another processed polygon among said effective pixel areas of said first mask data, executing an exclusion operation to delete said effective pixel area of said generated second mask data from the effective pixel area of generated second mask data of another polygon to thereby generate new second mask data, and performing generation of said new second mask data polygon by polygon; and a rendering procedure of implementing a rendering process on each of said polygons, with respect to said effective pixel area indicated by said new second mask data generated in said mask generation procedure.

23. A computer readable recording medium having recorded an image processing program for causing a computer to execute an image processing procedure of generating image data for displaying a plurality of translucent polygons, said image processing procedure comprising:

a mask generation procedure of generating first mask data indicating effective pixel areas of said translucent polygons in a display screen and translucent Z values indicating depths in said display screen for the respective effective pixels from polygon data including position data of said translucent polygons in said display screen, generating second mask data having, as an effective pixel area, a pixel area having a translucent Z value in the background of a translucent Z value of another processed translucent polygon among said effective pixel areas of said first mask data, executing an exclusion operation to delete said effective pixel area of said generated second mask data from the effective pixel area of generated second mask data of another translucent polygon to thereby generate new second mask data, and performing generation of said new second mask data, translucent polygon by translucent polygon; and a rendering procedure of implementing a rendering process on each of said polygons for generation of image data, with respect to said effective pixel area indicated by said new second mask data generated in said mask generation procedure, whereby said mask generation procedure further executes an exclusion operation to delete said effective pixel area of said new second mask data from said effective pixel area of said first mask data to thereby generate new first mask data, and generates next new second mask data based on said new first mask data, and said rendering procedure carries out said rendering process in accordance with said next new second mask data.

24. The recording medium according to claim 23, wherein said mask generation procedure repeatedly performs said process of executing said exclusion operation to delete said effective pixel area of said new second mask data from said effective pixel area of said first mask data to thereby generate new first mask data, and generating next new second mask data based on said new first mask data, until no effective pixel area becomes available from said new first mask data.

25. A computer readable recording medium having recorded an image processing program for causing a computer to execute an image processing procedure of generating image data for displaying a shadow area on a target polygon to be drawn, said image processing procedure comprising:

a mask generation procedure of generating first mask data indicating effective pixel areas of shadow polygons defining a shadow volume in a display screen and Z values indicating depths in said display screen for respective effective pixels, from shadow polygon data including position data of said shadow polygons in said display screen, generating second mask data having, as an effective pixel area, a pixel area having a Z value in the foreground of (or in the background of) a Z value of said target polygon among said effective pixel areas of said first mask data, performing odd-even inversion on odd-even data of shadow mask data, which represents the number of shadow polygons positioned in a direction of a line of sight and between said target polygon and a view point (or an infinite point), with respect to said effective pixel area of said second mask data, thereby generating new shadow mask data, and executing generation of said new shadow mask data for all shadow polygons that define said shadow volume; and a rendering procedure of implementing a rendering process in accordance with said new shadow mask data generated in said mask generation procedure.

26. The recording medium according to claim 25, wherein there are a plurality of shadow volumes; and said mask generation procedure further generates plural pieces of said shadow mask data for said plurality of shadow volumes, respectively, and generates synthesized shadow mask data having an effective pixel area where the effective pixel areas of said plural pieces of shadow mask data overlap one another; and said rendering procedure performs said rendering process while treating said synthesized shadow mask data as said shadow mask data.

27. An image processing apparatus for generating image data by performing a rendering process on polygons, comprising:

a fractal processor for receiving polygon data including position data of said polygons in a display screen, and, while segmenting a predetermined display screen area into smaller similar tiny areas in a fractal sense, sequentially detecting if said segmented tiny areas are positioned inside said polygons in accordance with said position data, and generating identification (ID) data of the detected displayed polygon for each of said segmented tiny areas; and a rendering section for generating image data of said segmented tiny areas in accordance with said ID data of said segmented tiny areas generated by said fractal processor.

28. The image processing apparatus according to claim 27, further comprising an area mask buffer memory for storing said ID data of said displayed polygon, detected by said fractal processor, for each of said tiny areas; and wherein said rendering section generates image data of said tiny areas by referring to said ID data of said displayed polygon stored in said area mask buffer memory.

29. The image processing apparatus according to claim 27, further comprising a Z-value buffer memory for storing a Z value indicating a depth of a polygon to be displayed for each of said tiny areas; and wherein said fractal processor receives plural pieces of polygon data, sequentially computes Z values of said segmented tiny areas, and compares said computed Z values of said tiny areas with said Z values stored in said Z-value buffer memory to thereby detect a polygon positioned on a more foreground side in said display screen.

30. The image processing apparatus according to claim 29, further comprising an area mask buffer memory for storing ID data of said polygon positioned on a more foreground side, detected by said fractal processor, as ID data of said displayed polygon, for each of said tiny areas; and wherein said rendering section generates image data of said tiny areas by referring to said ID data of said displayed polygon stored in said area mask buffer memory.

31. The image processing apparatus according to claim 27, wherein said polygon data further has color related data;

said fractal processor sequentially computes color related data of said segmented tiny areas; and said rendering section generates color data of said image data in accordance with said computed color related data of said tiny areas.

32. The image processing apparatus according to any one of claims 27 to 31, further comprising coordinate conversion means for converting said position data of said polygon data to a coordinate system which is aligned in a dividing direction of said fractal processor; and wherein said polygon data including said coordinate-converted position data is supplied to said fractal processor, which in turn performs an operation in accordance with said coordinate system after conversion.

33. The image processing apparatus according to any one of claims 27 to 32, wherein said predetermined display screen is an area obtained by dividing one frame.

34. An image processing method of generating image data by performing a rendering process on polygons, comprising:

a step of generating polygon data including position data of said polygons in a display screen;

a fractal step of, while segmenting a predetermined display screen area into smaller similar tiny areas in a fractal sense, sequentially detecting if said segmented tiny areas are positioned inside said polygons in accordance with said position data, and generating identification (ID) data of the detected displayed polygon for each of said segmented tiny areas; and a rendering step of generating image data of said segmented tiny areas in accordance with said ID data of said segmented tiny areas generated by said fractal step.

35. The image processing method according to claim 34, further comprising a step of storing said ID data of said displayed polygon, detected by said fractal processor, in an area mask buffer memory for each of said tiny areas; and wherein said rendering step generates image data of said tiny areas by referring to said ID data of said displayed polygon stored in said area mask buffer memory.

36. The image processing method according to claim 34, wherein said fractal step further sequentially computes Z values of said segmented tiny areas, indicating depths of polygons to be displayed, in accordance with plural pieces of polygon data, and compares said computed Z values of said tiny areas with Z values stored in a Z-value buffer memory to thereby detect a polygon positioned on a more foreground side in said display screen; and said method further comprises a step of storing a Z value of said polygon, positioned at a more foreground side, in said Z-value buffer memory for each of said tiny areas.

37. The image processing method according to claim 36, further comprising a step of storing ID data of said polygon positioned on a more foreground side, detected by said fractal step, as ID data of said displayed polygon, in an area mask buffer memory for each of said tiny areas; and wherein said rendering step generates image data of said tiny areas by referring to said ID data of said displayed polygon stored in said area mask buffer memory.

38. The image processing method according to any one of claims 34 to 37, further comprising a coordinate conversion step of converting said position data of said polygon data to a coordinate system which is aligned in a dividing direction of said fractal step; and wherein said fractal step performs an operation in accordance with said coordinate system after conversion.

39. The image processing method according to any one of claims 34 to 38, wherein said predetermined display screen is an area obtained by dividing one frame.

40. A computer readable recording medium having recorded an image processing program for causing a computer to execute an image processing procedure of generating image data by performing a rendering process on polygons, said image processing procedure comprising:

a procedure of generating polygon data including position data of said polygons in a display screen;

a fractal procedure of, while segmenting a predetermined display screen area into smaller similar tiny areas in a fractal sense, sequentially detecting if said segmented tiny areas are positioned inside said polygons in accordance with said position data, and generating identification (ID) data of the detected displayed polygon for each of said segmented tiny areas; and a rendering procedure of generating image data of said segmented tiny areas in accordance with said ID data of said segmented tiny areas generated by said fractal procedure.

41. The recording medium according to claim 40, further comprising a procedure of storing said ID data of said displayed polygon, detected in said fractal procedure, in an area mask buffer memory for each of said tiny areas; and wherein said rendering procedure generates image data of said tiny areas by referring to said ID data of said displayed polygon stored in said area mask buffer memory.

42. The recording medium according to claim 40, wherein said fractal procedure further sequentially computes Z values of said segmented tiny areas, indicating depths of polygons to be displayed, in accordance with plural pieces of polygon data, and compares said computed Z values of said tiny areas with Z values stored in a Z-value buffer memory to thereby detect a polygon positioned on a more foreground side in said display screen; and said image processing procedure further comprises a procedure of storing a Z value of said polygon, positioned on a more foreground side, in said Z-value buffer memory for each of said tiny areas.

43. The recording medium according to claim 42, further comprising a procedure of storing ID data of said polygon positioned on a more foreground side, detected in said fractal procedure, as ID data of said displayed polygon, in an area mask buffer memory for each of said tiny areas; and wherein said rendering procedure generates image data of said tiny areas by referring to said ID data of said displayed polygon stored in said area mask buffer memory.

44. The recording medium according to any one of claims 40 to 43, further comprising a coordinate conversion procedure of converting said position data of said polygon data to a coordinate system which is aligned in a dividing direction of said fractal procedure; and wherein said fractal procedure has a procedure of performing an operation in accordance with said coordinate system after conversion.

45. The recording medium according to any one of claims 40 to 44, wherein said predetermined display screen is an area obtained by dividing one frame.

* * * * *